United States Patent [19]

Weinberger et al.

[11] Patent Number: 4,888,822
[45] Date of Patent: Dec. 19, 1989

[54] APPARATUS AND METHOD FOR DETERMINING COST OF TELEPHONE CALLS

[75] Inventors: Gerald J. Weinberger, Smithtown; Roger C. Lee, Wading River; Stanley F. Miller, Rocky Point, all of N.Y.

[73] Assignee: Rates Technology Inc., Smithtown, N.Y.

[21] Appl. No.: 293,741

[22] Filed: Jan. 5, 1989

[51] Int. Cl.⁴ .............................................. G06F 15/21
[52] U.S. Cl. ................................... 379/130; 235/91 E
[58] Field of Search ....................... 379/130, 115, 116; 235/91 F

[56] References Cited

U.S. PATENT DOCUMENTS 4,813,065  3/1989  Segala ................................. 379/130

Primary Examiner—Stafford D. Schreyer
Attorney, Agent, or Firm—Arthur L. Lessler

[57] ABSTRACT

A device having a keyboard and a display for determining and displaying information relating to the cost of telephone calls. The device contains information as to the identify of exchanges which may be called, as well as information as to the cost parameters of telephone calls placed from a predetermined exchange which is usually the exchange of the user's telephone. The device has an idle state in which a telephone number may be entered and an operating mode may be selected. The device has Timer, Verify and D.E.N. operating modes in each of which telephone cost information may be based on the rates of any of four long distance carriers. In all of these modes the device displays the exchange of the (local or non-local) telephone number entered and information as to one or more cost parameters associated with a call to the telephone number entered. In the Timer mode the device shows the initial and additional period costs and durations and can display the accumulating cost of a call while the call is in progress using any of the four long distance carriers, and including time of day, day of week and holiday discounts. In the Verify mode the called number, day, time and duration of the call are entered and the cost of the call using any of the four long distance carriers is displayed. In the D.E.N. mode the intitial and additional period costs and durations are repetitively displayed for each time period.

24 Claims, 48 Drawing Sheets

SELECT PROCESSING MODE

D.E.N (TIME-OF-DAY DISCOUNT) MODE

DATE/TIME MODE

```
┌─────────────┐
│ ENTER MONTH │
│ USE 2 DIGITS│
└──────┬──────┘
       ↓
┌─────────────┐
│  ENTER DAY  │
│ USE 2 DIGITS│
└──────┬──────┘
       ↓
┌─────────────┐       ENTER :
│ ENTER YEAR  │
│ USE 2 DIGITS│       THE DATE AS mm/dd/yy.
└──────┬──────┘
       ↓
┌─────────────┐
│ ENTER HOUR  │
│ USE 2 DIGITS│
└──────┬──────┘
       ↓
┌─────────────┐
│ENTER MINUTE │
│ USE 2 DIGITS│
└──────┬──────┘
       ↓
┌─────────────┐       ENTER :
│ENTER SECOND │
│ USE 2 DIGITS│       THE TIME AS hh/mm/ss.
└──────┬──────┘
       ↓
┌─────────────┐       SET :
│             │
│ PRESS * KEY │       THE RATECUTTER'S DATE AND
│             │       TIME EQUAL TO THE DATE
└─────────────┘       AND TIME ENTERED ABOVE.

RETURN :

THE RATECUTTER TO THE
                      SELECT PROCESSING MODE.
```

FIG. 6

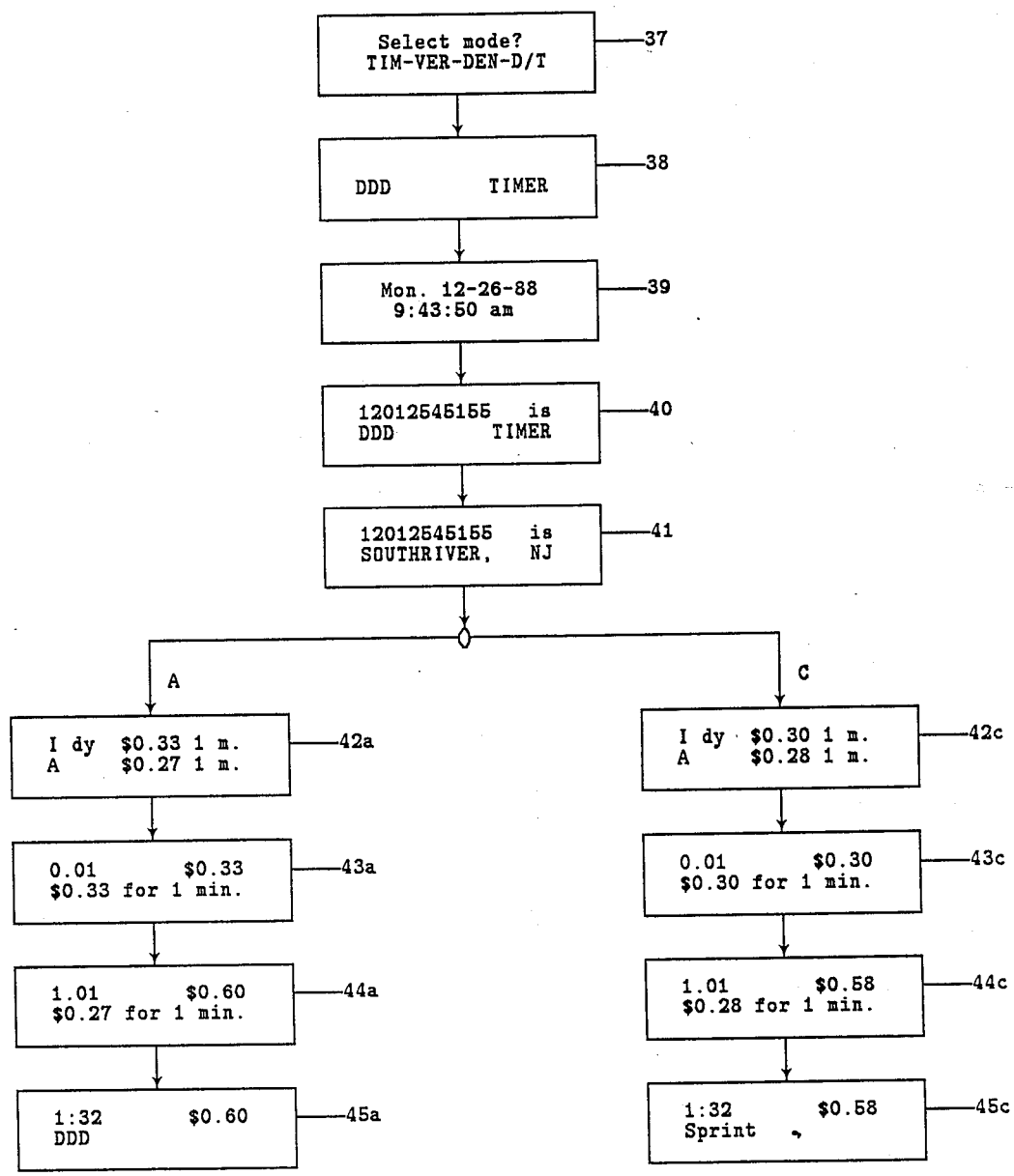

APPARATUS AND METHOD FOR DETERMINING COST OF TELEPHONE CALLS

BACKGROUND OF THE INVENTION

This invention relates to a self-contained apparatus and an associated method for determining and displaying the cost of a telephone call and/or related parameters.

Telephones containing memory arrangements from which the cost of a telephone call can be determined while the call is in progress without receipt of any call cost information from the telephone central office through which the call is placed have been known for several years. See, e.g., U.S. Pat. No. 4,122,308 to Gerald J. Weinberger and Stanley F. Miller entitled Telephone Call Meter. For a somewhat different arrangement for providing telephone call cost information, see U.S. Pat. No. 4,091,238 to Samuels et al.

Calculator-type devices are known that display information as to the cost of a call on a real time basis, but are not self-contained. That is, the user is required to input call cost parameters such as initial period duration, next period duration, initial period cost and next period cost and to press a start button when the call is initiated, after which the device displays the cost of the call while the call is in progress.

Private pay telephones having self-contained telephone rate memory arrangements are now in common use, and are capable of displaying call cost information before the call is placed and while the call is in progress. Such telephones, however, are relatively expensive and are not capable of displaying the total cost of a call in response to information keyed in by the user as to the number being called and the duration of the call, without actually placing the call. Nor do such telephones provide information to the user as to the particular exchange being called, rate variations with time of day or day of week, or rates of various long distance carriers.

There is a need for a relatively inexpensive self-contained device for displaying the aforementioned types of information. Such a device would be useful for verifying the accuracy of the charges on telephone bills, for determining the location of a number to be called, for facilitating the choice of a long distance carrier based on the exchanges most frequently called by the user, and for related purposes.

Accordingly, an object of the present invention is to provide an apparatus and method for providing such information which is easy to use and which is capable of being manufactured at a relatively low cost.

SUMMARY OF THE INVENTION

According to one aspect of the present invention there is provided a self-contained device for determining and displaying information relating to the cost of a telephone call from a calling telephone having a calling area code and a calling exchange associated therewith to a called telephone having a called telephone number including a called exchange number and which may include a called area code number.

The device has a keyboard with a plurality of keys, and a display. Idle state routine means places the device in an idle state wherein a called telephone number may be entered by pressing selected keys of the keyboard.

Rate data memory means in the device contains stored information as to cost parameters for telephone calls from a calling telephone in the calling exchange to a multiplicity of called local and non-local telephone numbers including long distance telephone numbers. The cost parameters comprise initial period cost, additional period cost, initial period duration, additional period duration, time-of-day discount and applicable discount period, day of week discount and applicable discount period, holiday discount and applicable discount period. The stored information includes information as to the cost parameters for long distance telephone calls using the services of a number of long distance carriers.

Rate center name memory means in the device contains stored information as to the name of the exchange associated with each of a multiplicity of called telephone numbers.

The device has mode control means operative when the device is in the idle state thereof for placing the device in a desired one of a number of modes of operation in response to the pressing of a mode selection key and a key corresponding to the desired mode, said device defaulting to a predetermined one of said modes when in the idle state prior to the pressing of the mode selection key.

Service designation means in the device is operative in each of said modes for selecting from said rate data memory means the cost parameters corresponding to a desired one of said long distance carriers in response to the pressing of a corresponding key of said keyboard.

Rate center name display means is coupled to the rate center name memory means and operative in at least one of said modes for determining and displaying the name of the exchange of a called telephone number entered into the keyboard when said device is in the idle state thereof.

The device includes clock means for determining and displaying the date and time of day; and clock control means for changing the date and time of day settings of the clock means.

The device also has telephone cost information means for determining and displaying information relating to the cost of a telephone call from a telephone in the calling exchange to a called telephone having a called telephone number entered into the keyboard when said device is in the idle state thereof.

According to another aspect of the invention there is provided a self-contained device for determining and displaying information relating to the cost of a telephone call from a calling telephone having a calling area code and a calling exchange associated therewith to a called telephone having a called telephone number including a called exchange number and which may include a called area code number.

The device includes a keyboard having a plurality of keys as well as a display. The device also has means for placing the device in a number entry state wherein a called telephone number may be entered by pressing selected keys of the keyboard.

Rate data memory means in the device contains stored information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers.

Service designation means in the device selects from the rate data memory means the cost parameters corresponding to a desired one of said long distance carriers in response to the pressing of a corresponding key of the keyboard.

Verify means in the device is coupled to the rate data memory means and the service designation means. The verify means is operative in a Verify mode of the device for determining and displaying the actual cost of a telephone call having a duration entered into the keyboard, from a telephone in the calling exchange to a called telephone having a called telephone number entered via the keyboard when the device is in the number entry state thereof.

According to still another aspect of the invention there is provided a self-contained device for determining and displaying information relating to the cost of a telephone call from a calling telephone having a calling area code and a calling exchange associated therewith to a called telephone having a called telephone number including a called exchange number and which may include a called area code number.

The device includes a keyboard having a plurality of keys and a display, as well as clock means for determining the date and time of day and clock control means for changing the date and time of day settings of the clock means.

The device has means for placing the device in a number entry state wherein a called telephone number may be entered by pressing selected keys of the keyboard.

Rate data memory means within the device contains stored information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers.

The device has service designation means for selecting from the rate data memory means the cost parameters corresponding to a desired one of said long distance carriers in response to the pressing of a corresponding key of said keyboard.

Telephone cost timing means of the device is coupled to the clock means, the rate data memory means and the service designation means. The timing means is operative in a Timer mode of the device for determining and displaying the current cost of a telephone call from a telephone in the calling exchange to a called telephone having a called telephone number entered into the keyboard when the device is in the number entry state thereof. The timing means is responsive to the pressing of a start key of the keyboard for commencing the timing of the telephone call based on the time elapsed after the pressing of the start key, and is responsive to the pressing of a stop key of the keyboard for terminating the timing of the call and displaying the actual cost of the call.

According to yet another aspect of the invention there is provided a self-contained device for determining and displaying information relating to the cost of a telephone call from a calling telephone having a calling area code and a calling exchange associated therewith to a called telephone having a called telephone number including a called exchange number and which may include a called area code number.

The device includes a keyboard having a plurality of keys and a display, as well as clock means for determining the date and time of day, and clock control means for changing the date and time of day settings of the clock means.

The device has means for placing the device in a number entry state wherein a called telephone number may be entered by pressing selected keys of the keyboard.

Rate data memory means in the device contains stored information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers.

Service designation means in the device selects from the rate data memory means the cost parameters corresponding to a desired one of the long distance carriers in response to the pressing of a corresponding key of the keyboard.

Discount rate display means in the device is coupled to the rate data memory means and the service designation means. The discount rate display means is operative in a D.E.N. mode of the device for determining and displaying the initial period cost and additional period cost as well as the corresponding initial period duration, additional period duration, discount type and applicable discount period for each time-of-day discount period applicable to the date determined by the clock means, of a telephone call from a telephone in the calling exchange to a called telephone having a called telephone number entered into the keyboard when the device is in the number entry state thereof.

According to a still further aspect of the invention there is provided a method for determining and displaying information relating to the cost of a telephone call from a calling telephone having a calling area code and a calling exchange associated therewith to a called telephone having a called telephone number including a called exchange number and which may include a called area code number.

One such method comprises the steps of: providing a device having a keyboard with a plurality of keys and a display; placing the device in an idle state wherein a called telephone number may be entered by pressing selected keys of the keyboard; storing in a rate data memory means information as to cost parameters for telephone calls from a calling telephone in the calling exchange to a multiplicity of called local and non-local telephone numbers including long distance telephone numbers, said cost parameters comprising initial period cost, additional period cost, initial period duration, additional period duration, time-of-day discount and applicable discount period, day of week discount and applicable discount period, holiday discount and applicable discount period, said information including information as to the cost parameters for long distance telephone calls using the services of a number of long distance carriers; storing in a rate center name memory means information as to the name of the exchange associated with each of a multiplicity of called telephone numbers; placing the device in a desired one of a number of modes of operation in response to the pressing of a mode selection key of said keyboard and a key of said keyboard corresponding to the desired mode, and causing said device to default to a predetermined one of said modes when in the idle state prior to the pressing of the mode selection key; selecting from said rate data memory means the cost parameters corresponding to a desired one of said long distance carriers in response to the pressing of a corresponding key of said keyboard; determining and displaying the name of the exchange of a called telephone number entered into the keyboard when said device is in the idle state thereof; determining and displaying the date and time of day; and determining and displaying information relating to the cost of a telephone call from a telephone in the calling exchange to a called telephone having a called telephone number entered into the keyboard when said device is in the idle state thereof.

Another such method comprises the steps of: providing a device including a keyboard having a plurality of keys and a display; placing the device in a number entry state wherein a called telephone number may be entered by pressing selected keys of the keyboard; storing in rate data memory means information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers; selecting from said rate data memory means the cost parameters corresponding to a desired one of said long distance carriers in response to the pressing of a corresponding key of said keyboard; and determining and displaying the actual cost of a telephone call having a duration entered into the keyboard, from a telephone in the calling exchange to a called telephone having a called telephone number entered via the keyboard when said device is in the number entry state thereof.

Still another such method comprises the steps of: providing a device including a keyboard having a plurality of keys and a display; determining the date and time of day; placing the device in a number entry state wherein a called telephone number may be entered by pressing selected keys of the keyboard; storing in rate data memory means information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers; selecting from said rate data memory means the cost parameters corresponding to a desired one of said long distance carriers in response to the pressing of a corresponding key of said keyboard; and determining and displaying the current cost of a telephone call from a telephone in the calling exchange to a called telephone having a called telephone number entered into the keyboard when said device is in the number entry state thereof, in response to the pressing of a start key of the keyboard, based on the time elapsed after the pressing of the start key; and thereafter displaying the actual cost of the call in response to the pressing of a stop key of the keyboard.

Yet another such method comprises the steps of: providing a device including a keyboard having a plurality of keys and a display; determining the date and time of day; placing the device in a number entry state wherein a called telephone number may be entered by pressing selected keys of the keyboard; storing in rate data memory means information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers; selecting from said rate data memory means the cost parameters corresponding to a desired one of said long distance carriers in response to the pressing of a corresponding key of said keyboard; and determining and displaying the initial period cost and additional period cost as well as the corresponding initial period duration, additional period duration, discount type and applicable discount period for each time-of-day discount period applicable to the date determined by said clock means, of a telephone call from a telephone in the calling exchange to a called telephone having a called telephone number entered into the keyboard when said device is in the number entry state thereof.

BRIEF DESCRIPTION OF THE DRAWINGS

FIG. 6 is a diagram showing the operation of the keyboard and display in the Set Date/Time mode of the device;

FIG. 22 shows two displays which appear on the display panel of the device at the time it is turned on;

FIG. 23 shows the displays which appear on the display panel of the device in the Timer Mode;

USER OPERATION OF KEYBOARD —RELATED DISPLAYS

Figure 1A:
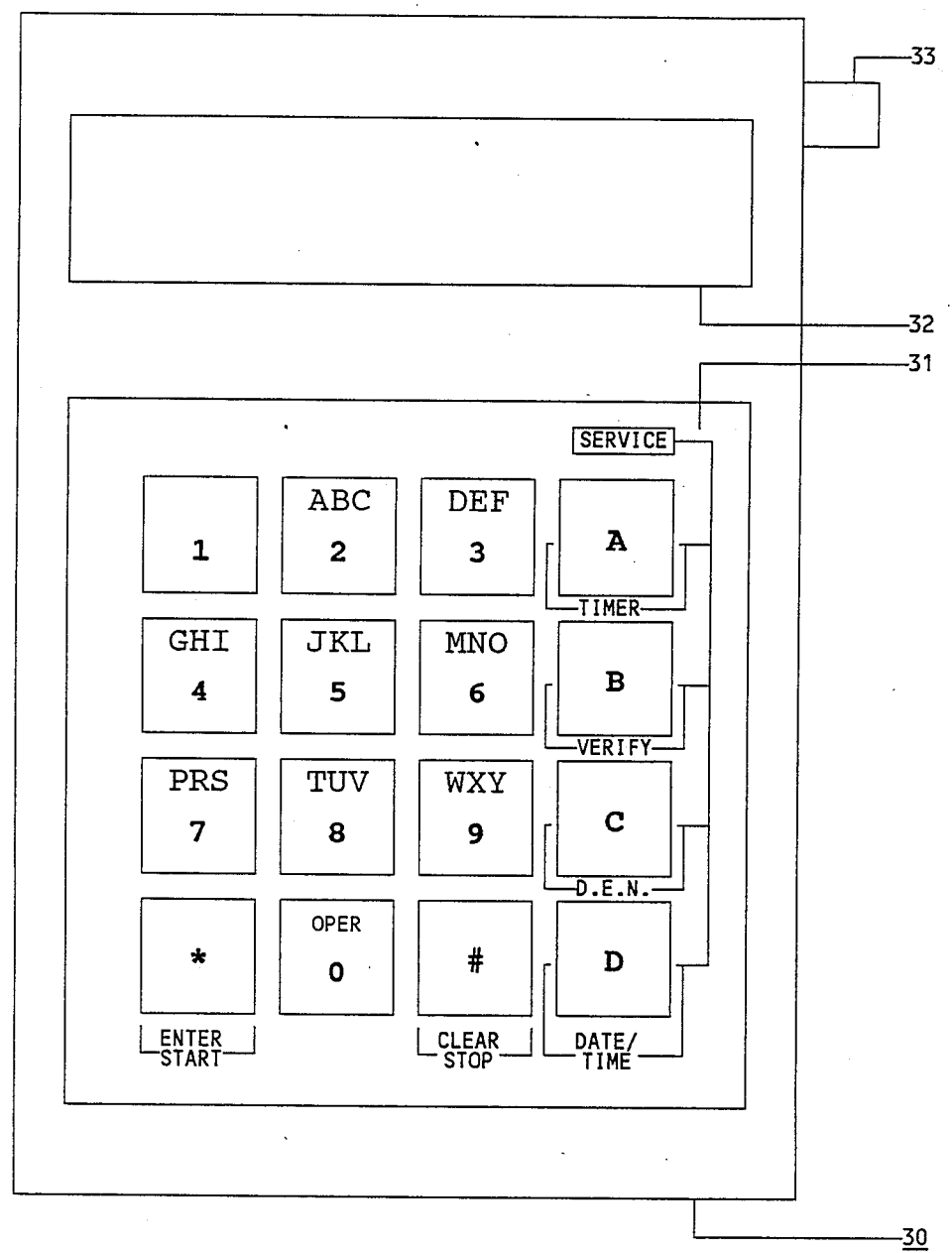
FIG. 1A shows the keyboard and display panel of a telephone call cost determining device according to a preferred embodiment of the present invention.

The telephone call cost determining device 30 shown in FIG. 1A has a keyboard 31 with 16 momentary pushbutton keys, and a liquid crystal display panel 32 for displaying two lines of alphanumeric characters with up to 16 characters per line. The device 30, which receives operating power from an internal battery 34 (FIG. 1B), also has a power on-off switch 33.

The keyboard 31 has ten numerical keys 1 to 9 and 0 which also contain corresponding telephone characters; an asterisk key "*" which also serves as an enter key and a start key; a number key "#" which also serves as a mode key, a clear key and a stop key; and four service keys A, B, C and D.

The device 30 is provided with a Rate Data Erasable Programmable Read-Only Memory (EPROM) 4 (FIG. 1B) which stores data from which telephone call cost information is obtained. The capacity of the memory for use in connection with telephone calls in the United States is typically on the order of 32K (32,768 bytes).

The information stored in the Rate Data EPROM 4 is accessed by the program of the device 30 to obtain the initial period cost, initial period duration, additional period cost, and additional period duration for a telephone call from the area code and exchange to which the EPROM 4 relates, to any desired (local or non-local) telephone number in the United States, taking into consideration the time of day and day of the week that the call is placed, and including the aforementioned rate data for up to four different long distance carriers.

The EPROM 4 is provided with rate data corresponding to calls to be placed from a telephone of the user, and a different EPROM memory is required for each area code/exchange combination. Thus the EPROM 4 must be replaced (or reconfigured) if the telephone number of the user changes, or if there is a change in any of the telephone rates involved. Since the EPROM 4 is a plug-in chip, such replacement can readily be done by the user.

The appearance of the display 32 in various modes of operation of the device 30 is shown in FIGS. 22 to 25, wherein displays are shown for a device which has an internal EPROM 4 corresponding to a calling telephone with an area code 214 and an exchange 220, in Dallas, TX.

Startup

As shown in FIG. 22, when the power switch 33 is turned on the display 32 shows (in display block 35) information which identifies the EPROM 4 by the corresponding area code and exchange as well as the date when the telephone rates were stored in the EPROM. Then the display shows other information such as the version of the device, copyright information, and the name and address of the manufacturer; after which the device enters an Idle State where it displays the day, date and time (display block 36). At this point the device is ready to be used by pressing the number key marked "#" (which also serves as a clear key and a stop key) to enable selection of a desired operating mode, or proceeding to use the default mode.

Figure 2:
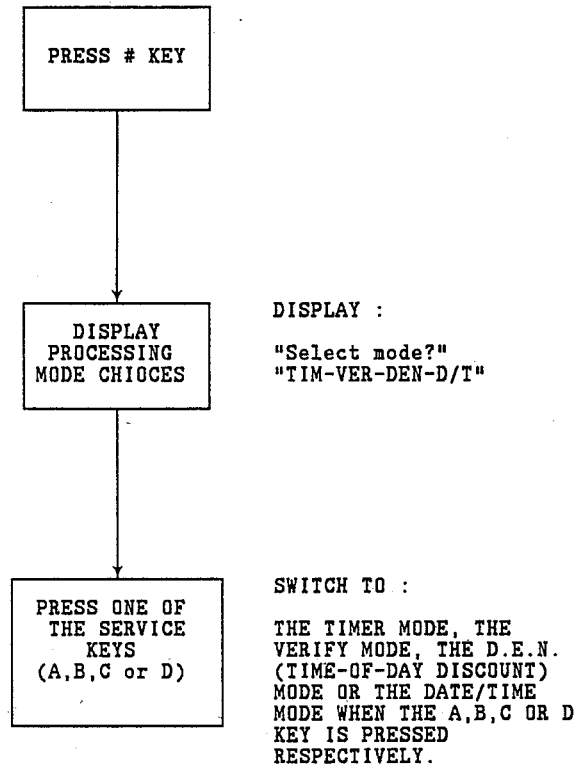
FIG. 2 is a diagram showing the way in which the device selects processing modes.

Mode Selection (FIGS. 2, 22)

After the startup is completed the device is in the Timer Mode as the default mode. When the # key is pressed the display changes to a two line display with "Select mode?" on the first line and "TIM-VER-DEN-D/T" on the second line. The desired one of these modes is then selected by a corresponding one of the service keys A (TIMER), B (VERIFY), C (D.E.N.) or D (DATE/TIME). If the # key is pressed again without selecting a mode, the device remains in its default (Timer) mode.

The service keys A, B, C and D also serve to enable selection of one of four long distance carriers. In the particular unit described above, the A key corresponds to AT&T, the B key to MCI, the C key to Sprint, and the D key to Allnet, with the A key as the default key.

The TIMER, VERIFY and D.E.N. modes (FIGS. 3 and 23, 4 and 24, 5 and 25 respectively) correspond to operating modes in which information is provided by the device; while the DATE/TIME mode (FIG. 6) is merely a mode which allows setting of the device clock 6 (FIG. 1B) to the current date and time. Since the DATE/TIME mode is conventional and its operation is similar to that of electronic clocks known in the art, it will not be discussed in any detail here.

Figure 3:
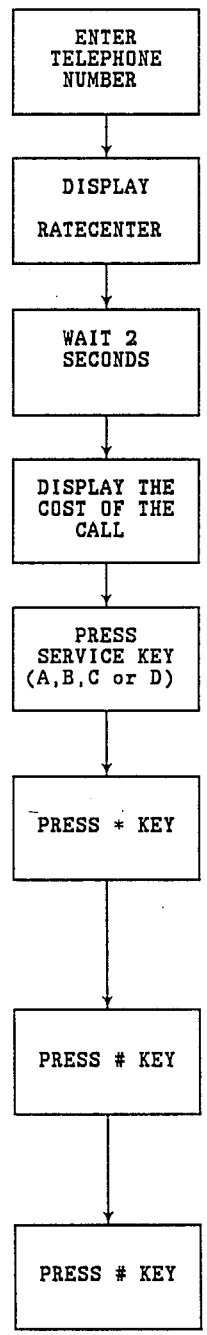
FIG. 3 is a diagram showing the operation of the keyboard and display in the Timer mode of operation of the device.

Timer Mode (FIGS. 3, 23)

After the # key is pressed the display appears as shown in display block 37. When the A (TIMER) service key is pressed the display changes to that shown in display block 38 and, after two seconds, reverts to the day/date/time display (i.e., the Idle State) as shown in display block 39.

If at this point the B (MCI long distance carrier) service key is pressed, the display momentarily shows a one line display of "MCI TIMER" and then reverts to the day/date/time display. If the C (Sprint long distance carrier) service key is pressed, the display momentarily shows a one line display of "Sprint TIMER" and then reverts to the day/date/time display. If the D (Allnet long distance carrier) service key is pressed, the display momentarily shows a one line display of "Allnet TIMER" and then reverts to the day/date/time display. Pressing the A (AT&T) key again results in a momentary one line display of "DDD TIMER" wherein the letters DDD denote "Direct Distance Dialing".

The TIMER mode will operate based on the long distance rates of the carrier for which the corresponding service button was last depressed prior to starting the timing clock; and the device can be configured so that the B, C and D service keys correspond to telephone rate data associated with any desired provider (not necessarily limited to a long distance service provider) of telephone service. Pressing one of these keys will result in a momentary display of the name of the particular provider with which that key is associated, and the word "TIMER".

After the day/date/time display as shown in display block 39 has appeared and the device is therefore in its Idle State, a telephone number which has been called or may be called is keyed in using the numeric keys. The numeric keys are active only when the device is in its Idle State, so that it is only in this state that a telephone number can be entered.

Figure 1B:
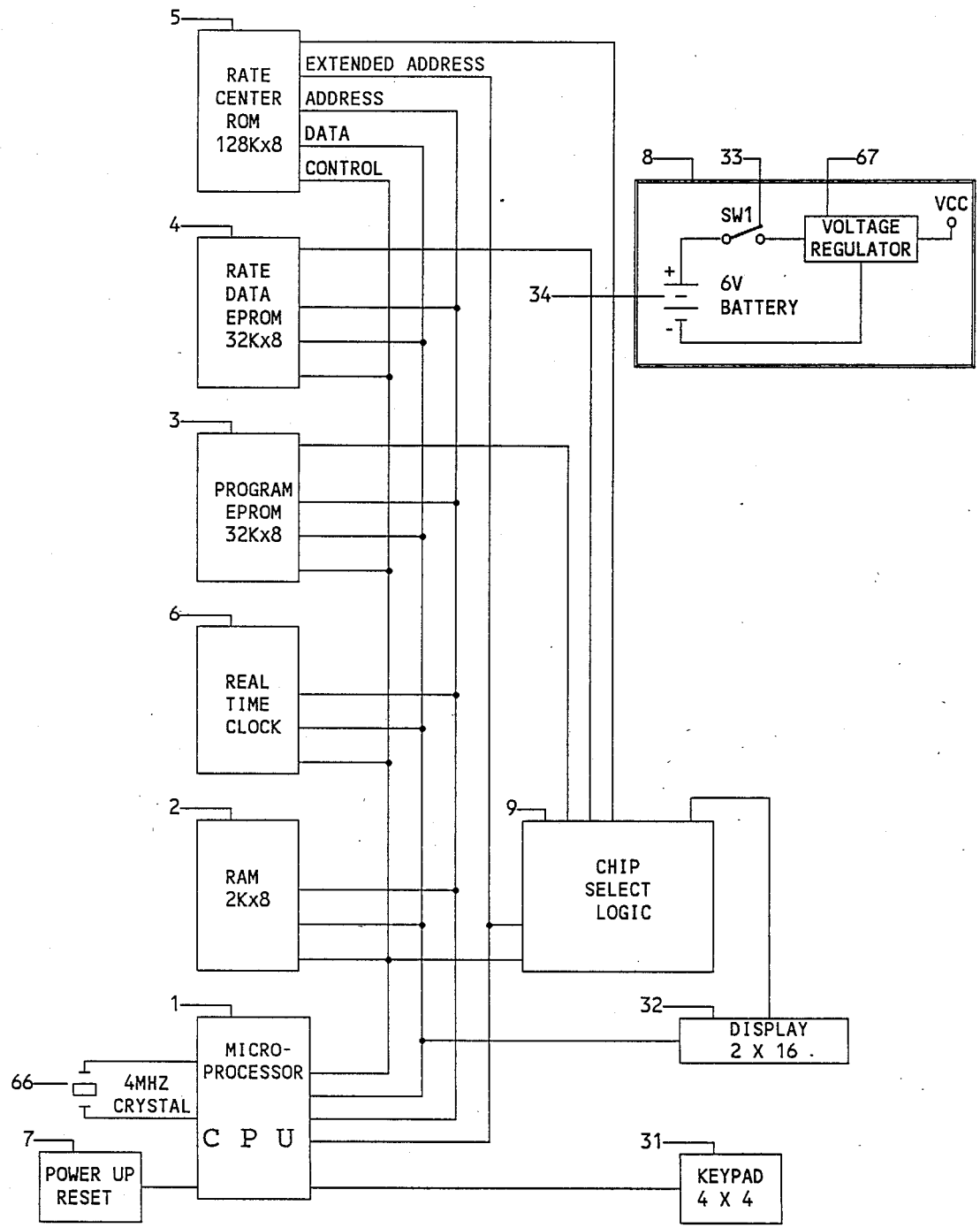
FIG. 1B is a block diagram showing the physical operational elements of the device of FIG. 1.

If the telephone number 1-201-254-5155 is keyed in, the display initially appears as shown in display block 40, and after a processing delay changes to the display shown in display block 41, which (as a result of the program accessing the Rate Center Read-Only Memory (ROM) 5—FIG. 1B) indicates that the exchange of the called number is South River, N.J.

After two seconds the display changes to give the call cost parameters for the call based on the day/date/time to which the date/time clock is set, and the rates of the long distance carrier corresponding to the last service button pressed; or if no service button was pressed the rates of the carrier corresponding to service button A.

At this point the display appears as shown in display block 42a if service button A was used to select the long distance carrier or if no service button was pressed. This display indicates that the cost of a telephone call from the 220 exchange in the 214 area code to the called telephone number 1-201-254-5155 is 33¢ for the first minute and 27¢ for each additional minute, for a call placed at 9:43 a.m. on Dec. 26, 1988, using AT&T as the long distance carrier.

If the B, C or D service button is now pressed, corresponding rate information for the same call using MCI, Sprint or Allnet as the long distance carrier will be displayed respectively. The display which appears, for example, when service button C is pressed is as shown in display block 42c —which indicates that the cost of a telephone call from the 220 —exchange in the 214 area code to the called telephone number 1-201-254-5155 is 30¢ for the first minute and 28¢ for each additional minute, for a call placed at 9:43 a.m. on Dec. 26, 1988, using Sprint as the long distance carrier.

In order to now actually time a call, the asterisk key * is pressed to start the timing operation, preferably at the time the called party picks up the called telephone.

One second after the asterisk "START" key * has been pressed, the display appears as shown in display block 43a if service button A was pressed or no service button was pressed; or as shown in display block 43c if service button C has been pressed. In these displays the upper left-hand number is the amount of time since the timer start button was pressed. That is, in blocks 43a and 43c the time is shown as 0:01 to denote one second.

The display in block 43a indicates that one second after the timer was started a cost of 33¢ has been incurred for the telephone call, and that this cost will remain constant for the first minute. Block 43c indicates that the cost incurred for this period would be 30¢ for a call using Sprint as the long distance carrier.

Ten seconds before the end of the initial cost period (1 minute in the example given here) of the call, the display flashes to warn that the cost of the call will increase in several more seconds.

As soon as the duration of the call, i.e. the time elapsed since the timer start button * was pressed, exceeds the initial period (one minute in this example) the display is incremented to reflect the additional cost increment incurred and the additional time before there will be another cost increment. That is, display block 44a shows that after one minute and one second the total cost incurred is 60¢ (58¢ if Sprint is the long distance carrier, as shown in display block 44c) and this cost will remain constant for an additional minute.

When the call is over or it is desired to stop timing the call (one minute and thirty-two seconds after pressing the timer start button * in this example), the stop button # is pressed to "freeze" the display, which then appears as shown in (i) display block 45a when AT&T (service button A) has been selected as the long distance carrier, and (ii) display block 45c when Sprint (service button C) has been selected as the long distance carrier.

Pressing the clear button # then causes the display to revert to the day/date/time or Idle State display shown in display block 36 (FIG. 22), and allows the same or another mode of operation to be selected to use the device for another "call".

Figure 4:
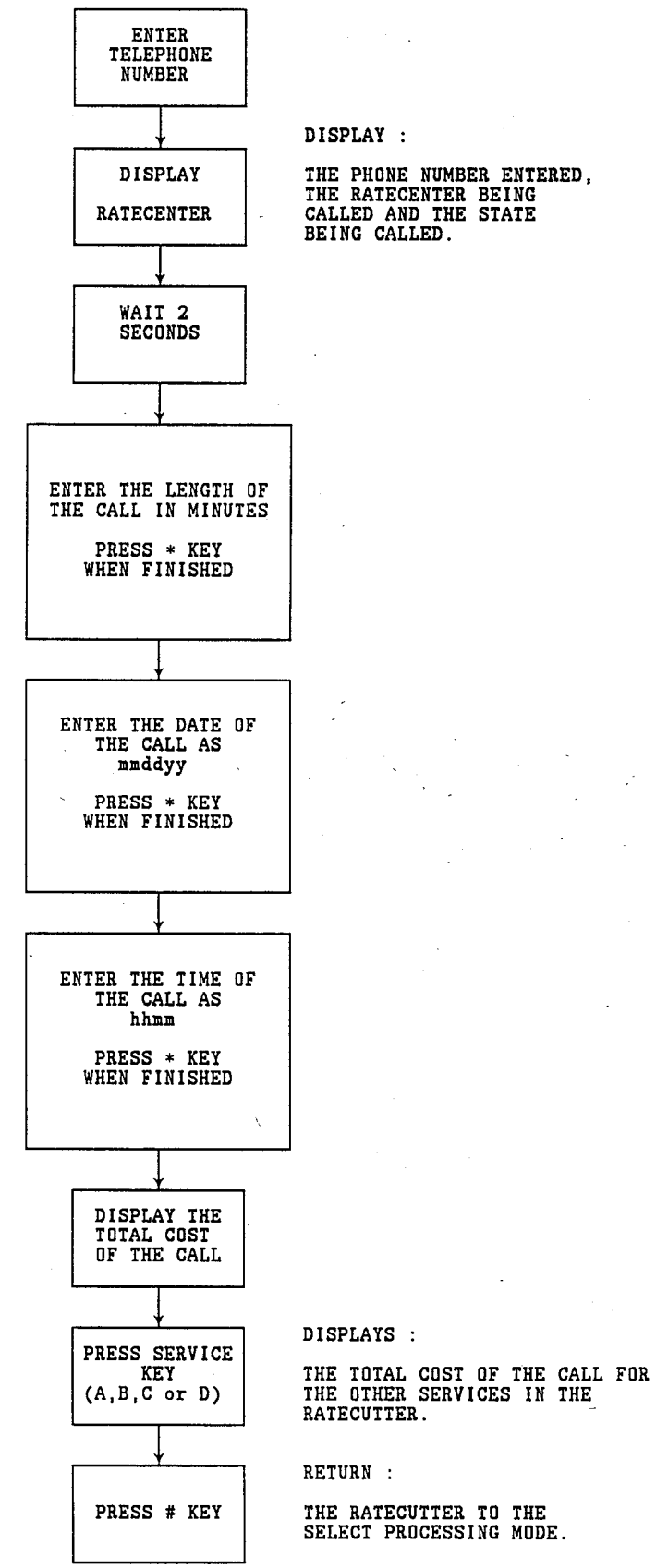
FIG. 4 is a diagram showing the operation of the keyboard and display in the Verify mode of operation of the device.
Figure 24:
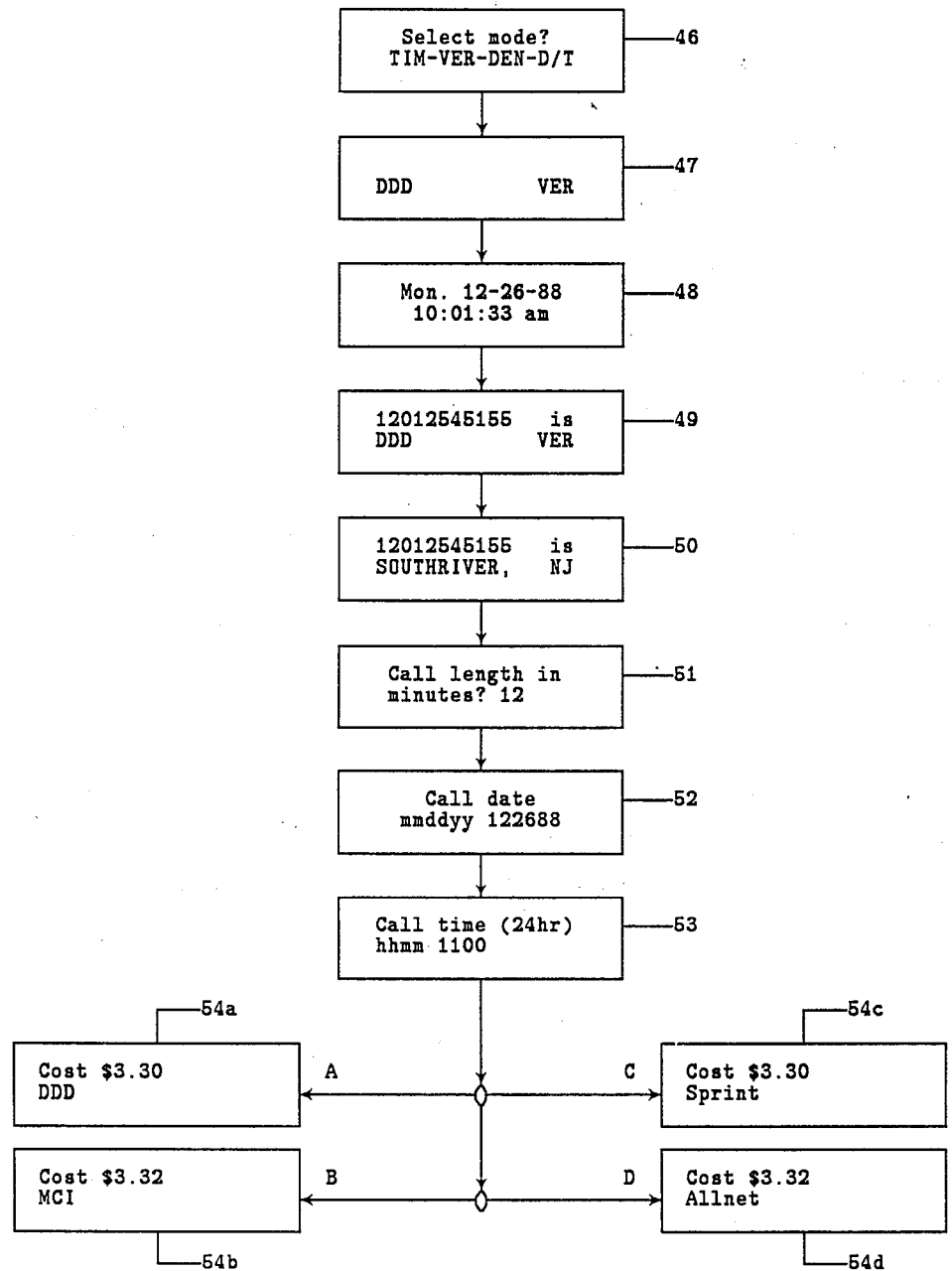
FIG. 24 shows the displays which appear on the display panel of the device in the Verify Mode.

Verify Mode (FIGS. 4, 24)

After the # key is pressed while the device is in its Idle State, the display appears as shown in display block 46. When the B (VERIFY) service key is pressed the display changes to that shown in display block 47 and, after two seconds, reverts to the day/date/time or Idle State display as shown in display block 48.

If at this point the B (MCI long distance carrier) service key is pressed, the display momentarily shows a one line display of "MCI VER" and then reverts to the day/date/time display. If the C (Sprint long distance carrier) service key is pressed, the display momentarily shows a one line display of "Sprint VER" and then reverts to the day/date/time display. If the D (Allnet long distance carrier) service key is pressed, the display momentarily shows a one line display of "Allnet VER" and then reverts to the day/date/time display. Pressing the A (AT&T) key again results in a momentary one line display of "DDD VER" wherein the letters DDD denote "Direct Distance Dialing".

The VERIFY mode will operate based on the long distance rates of the carrier for which the corresponding service button was last depressed before proceeding further with the Verify mode. The device can be configured so that the B, C and D service keys correspond to telephone rate data associated with any desired provider (not necessarily limited to a long distance service provider) of telephone service. Pressing one of these keys will result in a momentary display of the name of the particular provider with which that key is associated, and the abbreviation "VER" (for Verify).

After the day/date/time or Idle State display as shown in display block 48 has appeared, a telephone number which has been called or may be called is keyed in using the numerical keys. If the telephone number 1-201-254-5155 is keyed in, the display initially appears as shown in display block 49, and after a processing delay changes to the display shown in display block 50, which (as a result of the program accessing the Rate Center Read-Only Memory (ROM) 5—FIG. 1B) indicates that the name of the exchange of the called number is South River, N.J.

As shown in display block 51, after the exchange of the called telephone number has been displayed for two seconds the device displays an inquiry as to the duration of the telephone call which is to have its cost verified. In the example shown in display block 51 a call duration of 12 minutes has been entered in response to the display inquiry. The call duration should be entered as a number of minutes. If an actual call such as one reflected on a telephone bill is to be verified, the duration of the call should be rounded up to the next highest minute.

After keying in the duration of the telephone call to be verified, the enter key * is pressed, causing the display to inquire as to the date of the call, as shown in display block 52. This information is needed because the cost of the call will usually depend upon the day of the week that the call is placed, i.e. whether during the weekday period or the weekend period or on a holiday.

After keying in the date of the call (Dec. 26, 1988 in the example shown in display block 52) the enter key * is pressed, causing the display to inquire as to the time of day of placing the call to be verified, as shown in display block 53. This information is needed because the cost of the call will usually depend upon the time of day that the call is placed, i.e. whether a day rate, an evening discount rate or a night discount rate applies.

After keying in the time of the call (11:00 a.m.) the enter key * is pressed, causing the display to change to give the cost of the telephone call. If the telephone call is a long distance call, the cost is based on the rates of the long distance carrier corresponding to the last service button pressed; or if no service button was pressed, the rates of AT&T, the carrier corresponding to service button A.

At this point the display appears as shown in display block 54a if service button A was used to select the long distance carrier or if no service button was pressed. This display indicates that the cost of a twelve minute telephone call from the 220 exchange in the 214 area code to the called telephone number 1-201-254-5155 is $3.30, for a call placed at 11:00 a.m. on Dec. 26, 1988, using AT&T as the long distance carrier.

If the B, C or D service button is now pressed, corresponding cost information for the same telephone call using MCI, Sprint or Allnet as the long distance carrier will be displayed respectively. These costs will, of course, be different only if a long distance call is being verified. The display which appears, for example, when service button B is pressed is as shown in display block 54b—which indicates that the cost of a telephone call from the 220 exchange in the 214 area code to the called telephone number 1-201-254-5155 is $3.32, for a call placed at 11:00 a.m. on Dec. 26, 1988, using MCI as the long distance carrier.

Pressing the clear button # then causes the display to revert to the day/date/time or Idle State display shown in display block 36 (FIG. 22), and allows the same or another mode of operation to be selected to use the device for another "call".

Figure 5:
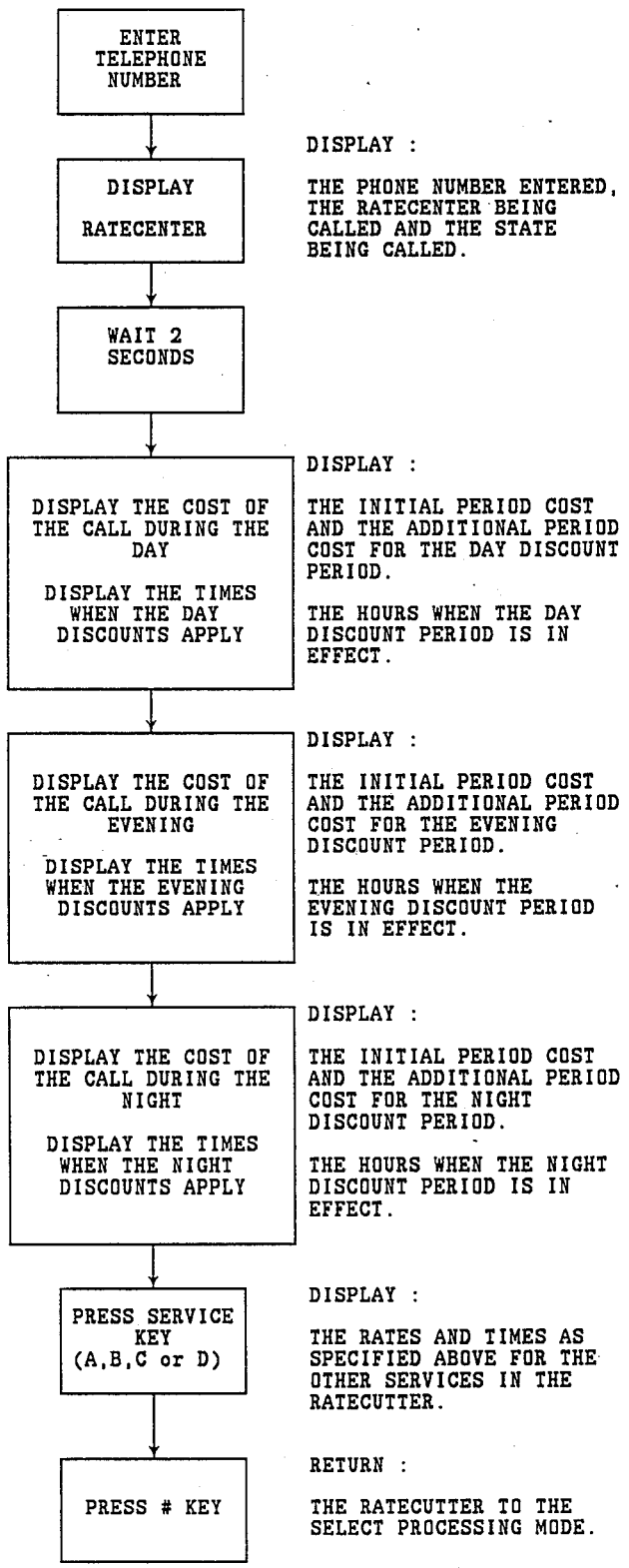
FIG. 5 is a diagram showing the operation of the keyboard and display in the Day-Evening-Night (D.E.N.) or Time-of-Day Discount mode of operation of the device.
Figure 25:
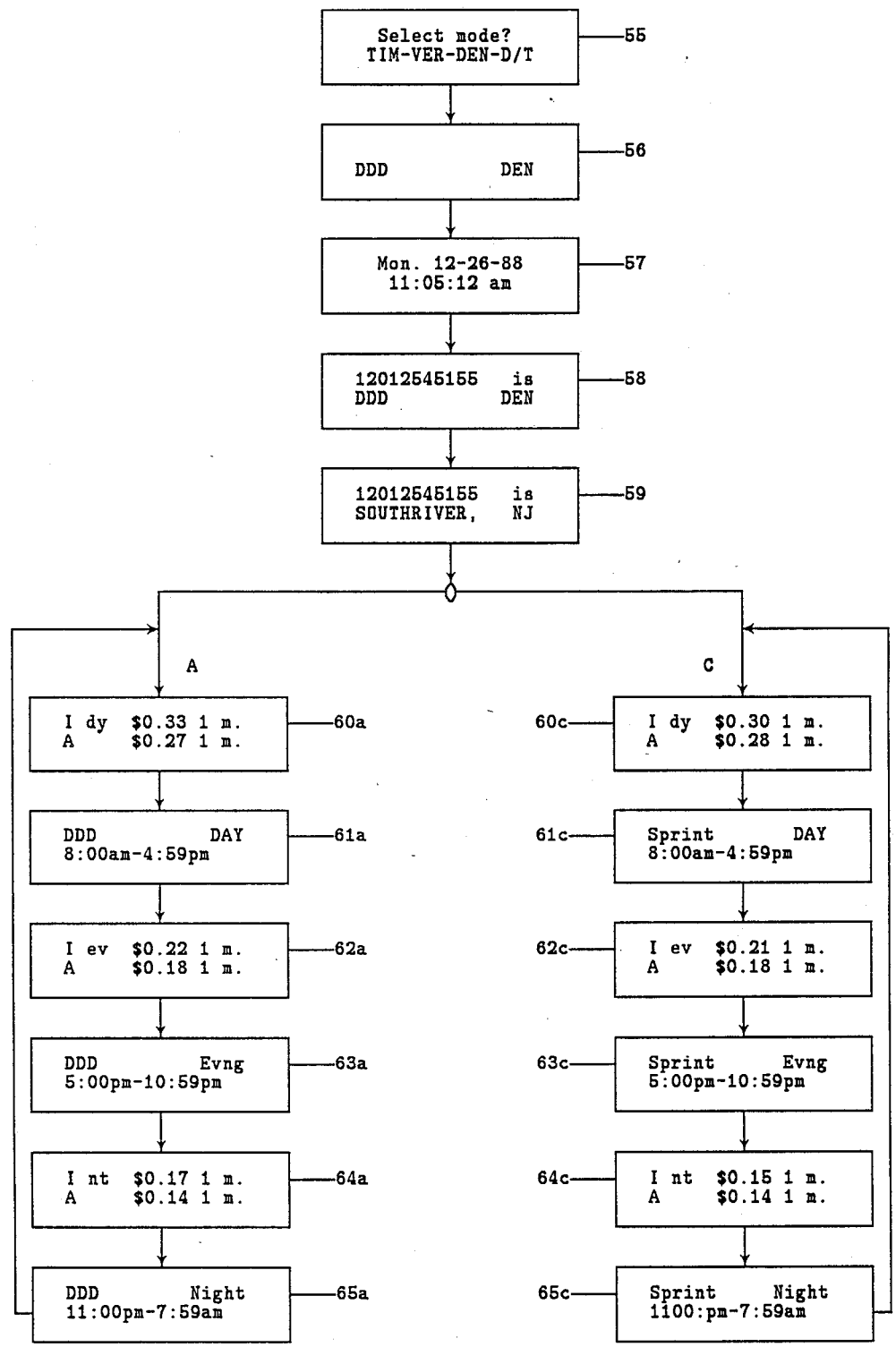
FIG. 25 shows the displays which appear on the display panel of the device in the Day-Evening-Night (D.E.N.) or Time-of-Day Discount Mode.

Day-Evening-Night (D.E.N.) or Time-of-Day Discount Mode (FIGS. 5, 25)

After the # key is pressed while the device 30 is in its Idle State, the display appears as shown in display block 55. When the C (D.E.N.) service key is pressed the display changes to that shown in display block 56 and, after two seconds, reverts to the day/date/time or Idle State display as shown in display block 57.

If at this point the B (MCI long distance carrier) service key is pressed, the display momentarily shows a one line display of "MCI DEN" and then reverts to the day/date/time display. If the C (Sprint long distance carrier) service key is pressed, the display momentarily shows a one line display of "Sprint DEN" and then reverts to the day/date/time display. If the D (Allnet long distance carrier) service key is pressed, the display momentarily shows a one line display of "Allnet DEN" and then reverts to the day/date/time display. Pressing the A (AT&T) key again results in a momentary one line display of "DDD DEN" wherein the letters DDD denote "Direct Distance Dialing".

The D.E.N. mode will operate based on the long distance rates of the carrier for which the corresponding service button was last depressed before proceeding further in that mode. The device can be configured so that the B, C and D service keys correspond to telephone rate data associated with any desired provider (not necessarily limited to a long distance service provider) of telephone service. Pressing one of these keys will result in a momentary display of the name of the particular provider with which that key is associated, and the abbreviation "DEN".

After the day/date/time or Idle State display as shown in display block 57 has appeared, a telephone number which has been called or may be called is keyed in using the numerical keys. If the telephone number 1-201-254-5155 is keyed in, the display initially appears as shown in display block 58, and after a processing delay changes to the display shown in display block 59, which (as a result of the program accessing the Rate Center Read-Only Memory (ROM) 5—FIG. 1B) indicates that the exchange of the called number is South River, N.J.

After two seconds the display changes to give the day rate call cost parameters for the call, i.e. the initial period cost, initial period duration, additional period cost, and additional period duration. If the call is a long distance telephone call, the display shows the day rate parameters of the long distance carrier corresponding to the last service button pressed; or if no service button was pressed, the rate parameters of AT&T, the carrier corresponding to service button A.

At this point the display appears as shown in display block 60a if service button A was used to select the long distance carrier or if no service button was pressed. This display indicates that the day rate for a telephone call from the 220 exchange in the 214 area code to the called telephone number 1-201-254-5155 is 33¢ for the first minute and 27¢ for each additional minute, for a call placed using AT&T as the long distance carrier.

If the B, C or D service button is now pressed, corresponding day rate information for the same call using MCI, Sprint or Allnet as the long distance carrier will be displayed respectively. The display which appears, for example, when service button C is pressed is as shown in display block 60c—which indicates that the cost of a telephone call from the 220 exchange in the 214 area code to the called telephone number 1-201-254-5155 is 30¢ for the first minute and 28¢ for each additional minute, for a call placed using Sprint as the long distance carrier.

After displaying the day rate parameters for two seconds, the display changes to show the time period during which the day rate parameters are in effect. The display appears as shown in display block 61a if service button A was pressed or no service button was pressed after selecting the D.E.N. mode; or as shown in display block 61c if service button C has been pressed. These displays indicate that the AT&T day rate parameters as well as the Sprint day rate parameters for this call are in effect between 8:00 a.m. and 4:49 p.m.

The display continues to change at two second intervals to successively show the evening rate parameters (display block 62a for AT&T and display block 62c for Sprint), the time period during which the evening rate discount is in effect (display block 63a for AT&T and display block 63c for Sprint), the night rate parameters (display block 64a for AT&T and display block 64c for Sprint), and the time period during which the night rate discount is in effect (display block 65a for AT&T and display block 65c for Sprint).

If at any time that the display is repeating the cycle of day/evening/night rate information one of the service keys A, B, C or D is pressed, the display commences repeating the cycle of day/evening/night rate information for the corresponding long distance carrier.

Thereafter the display repeats the cycle of day/evening/night rate information display blocks (60a to 65a for AT&T, 60c to 65c for Sprint); and continues to repetitively display this sequence of display blocks until the stop key # is pressed — at which time the display reverts to the day/date/time or Idle State display of display block 36 (FIG. 22).

Description Of Electrical Components (Hardware)

As shown in FIG. 1B, the device 30 comprises a microprocessor unit 1 which contains a central processing unit ("CPU"), input and output ports and counters, and an internal clock regulated by the crystal 66. The microprocessor 1 utilizes (i) program instructions stored in the program memory EPROM 3, (ii) instructions and data keyed in via the keyboard 31, (iii) date and time of day information from the real time clock 6, (iv) rate information from the Rate Data EPROM 4, and (v) rate center information from the Rate Center ROM 5, to drive the display 32.

The CPU within the microprocessor 1 responds to the instructions stored in the program memory to control all internal operations of the device 30. The input/output ports are used to read the keyboard/keypad 31 and to provide extended address control lines for communicating with other peripheral units as shown in FIG. 1B. The counters provide timing intervals for the program.

The random access memory 2 has a capacity of 2K (2,048 bytes) and is used to provided temporary storage for the program.

The Rate Center Read-Only Memory (ROM) 5 is addressed by the CPU to identify the exchange (central office and state) corresponding to the called telephone number entered via the keyboard 31. This ROM may typically have a capacity on the order of 128K (131,072 bytes). As area codes and exchanges change, the ROM (which is in the form of a plug-in chip) may be changed by the user from time to time to provide an updated memory.

The Power Up Reset circuit 7 operates when the device 30 is turned on via the switch 33, to keep the microprocessor 1 reset until the power and clock circuits are stable.

The power supply 8 contains the battery 34, switch 33, and a voltage regulator 67.

The Chip Select Logic circuit 9 decodes the address, control and output signals supplied by the microprocessor 1 to enable the corresponding functional element (memory, temporary storage, real time clock, display) selected by the microprocessor CPU.

SOFTWARE OVERVIEW

The device program is used to find the call costing information for a particular phone call and to utilize this information in one of three different modes of operation (TIMER, VERIFY, D.E.N.).

The device is initially in an Idle State (FIG. 8) where it merely displays the current date and time. While the device is in the Idle State the user may set its mode of operation (FIG. 9) or may utilize the mode of operation that the device is currently in.

The Timer Mode (FIG. 11) gives the user the call costing information for a phone call to the phone number entered by the user. This information consists of the initial period cost and time in seconds or minutes, the additional period cost and time in seconds or minutes, and the time-of-day discount type (usually day, evening, or night). The Timer Mode also allows the user to time a call to this phone number and to display the actual accumulated cost of the call as the call proceeds.

The Verify Mode (FIG. 12) allows the user to verify a phone bill by entering the phone number called, the date and time of the call and the length of the call in minutes. The device then uses this information in conjunction with its own call costing information to calculate the final cost of the call.

The D.E.N. (Day-Evening-Night or Time-of-Day Discount) Mode (FIG. 13) gives the user the call costing information shown in the Timer Mode for a phone call to the phone number entered by the user for each time-of-day discount period (usually day, evening and night) and the hours of the day when the discount period is in effect.

DETAILED DESCRIPTION (FIGS. 7 to 21)

Figure 7:
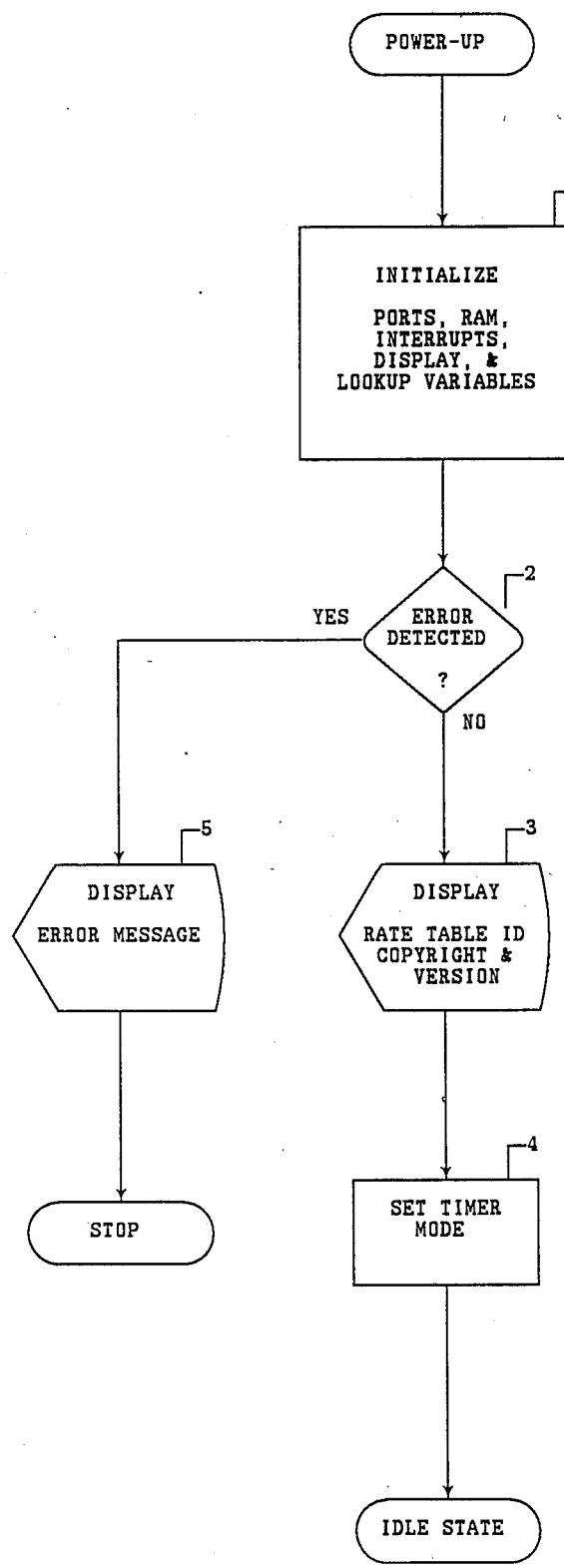
FIG. 7 is a flow chart showing the Power Up Routine of the device.

Power up (FIG. 7)

This routine starts when the device is turned on with the on-off switch 33. At Step 1 all of the ports and variables are initialized. If an error is found, information respecting the error is displayed and the operation of the device is halted (Steps 2 and 5).

If no error is found, at Step 3 the Rate Data EPROM is read to find the rate table identifying information (area code, exchange and date made), which is displayed. Copyright information and the software version number of the device are then displayed. At Step 4 the program is set to the (default) Timer Mode and the program proceeds to its Idle State (FIG. 8).

Figure 8:
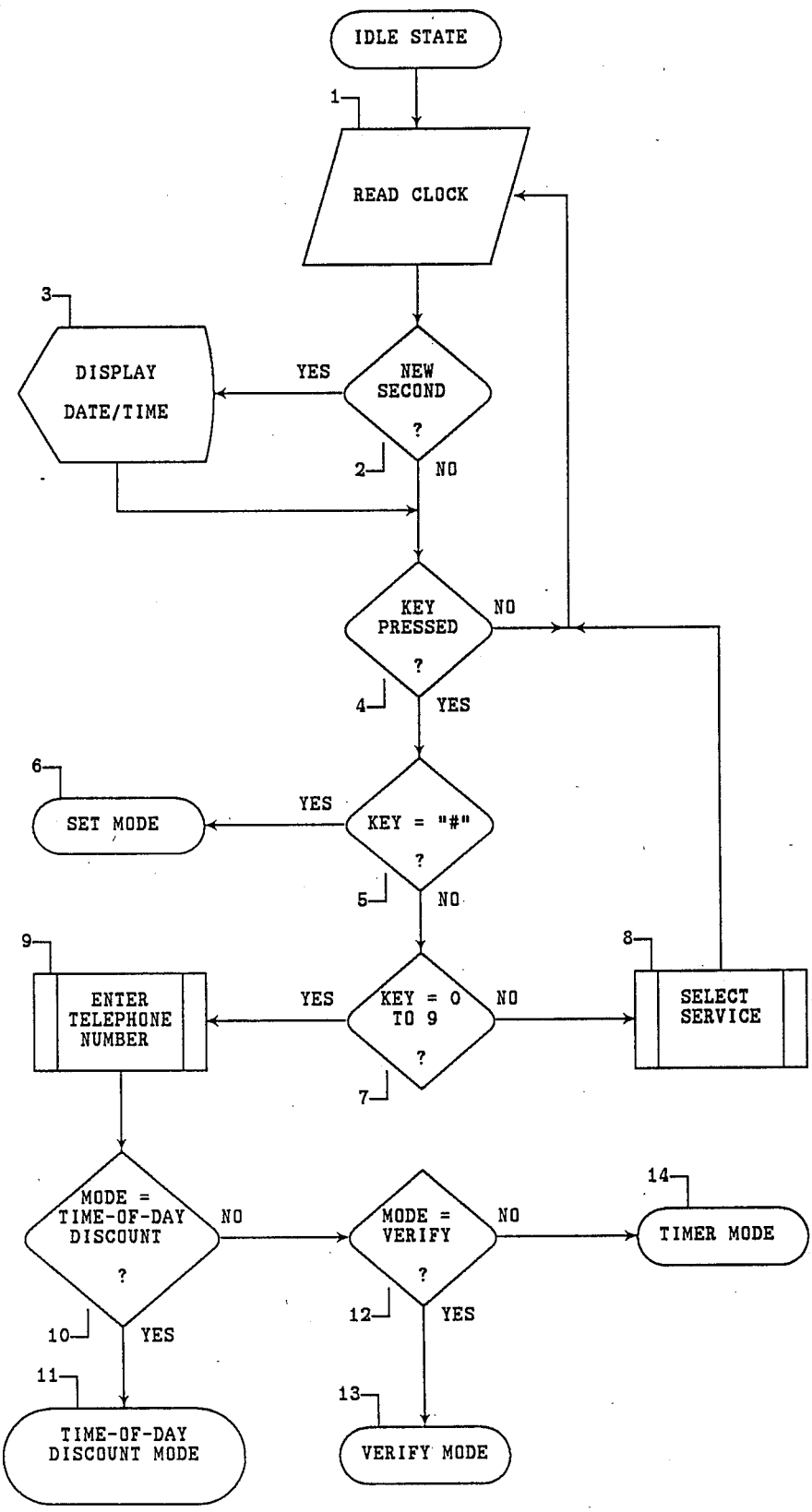
FIG. 8 is a flow chart showing the Idle State Routine of the device, which is the main routine controlling all other routines, and which uses the Enter Telephone Number Subroutine (FIG. 14) and the Select Service Subroutine (FIG. 18) to complete its functions.

Idle State (FIG.8)

In this routine the device waits while no processing is being done. After Power Up (FIG. 7) and after completion of any selected mode, the program goes here to await further instructions.

Figure 9:
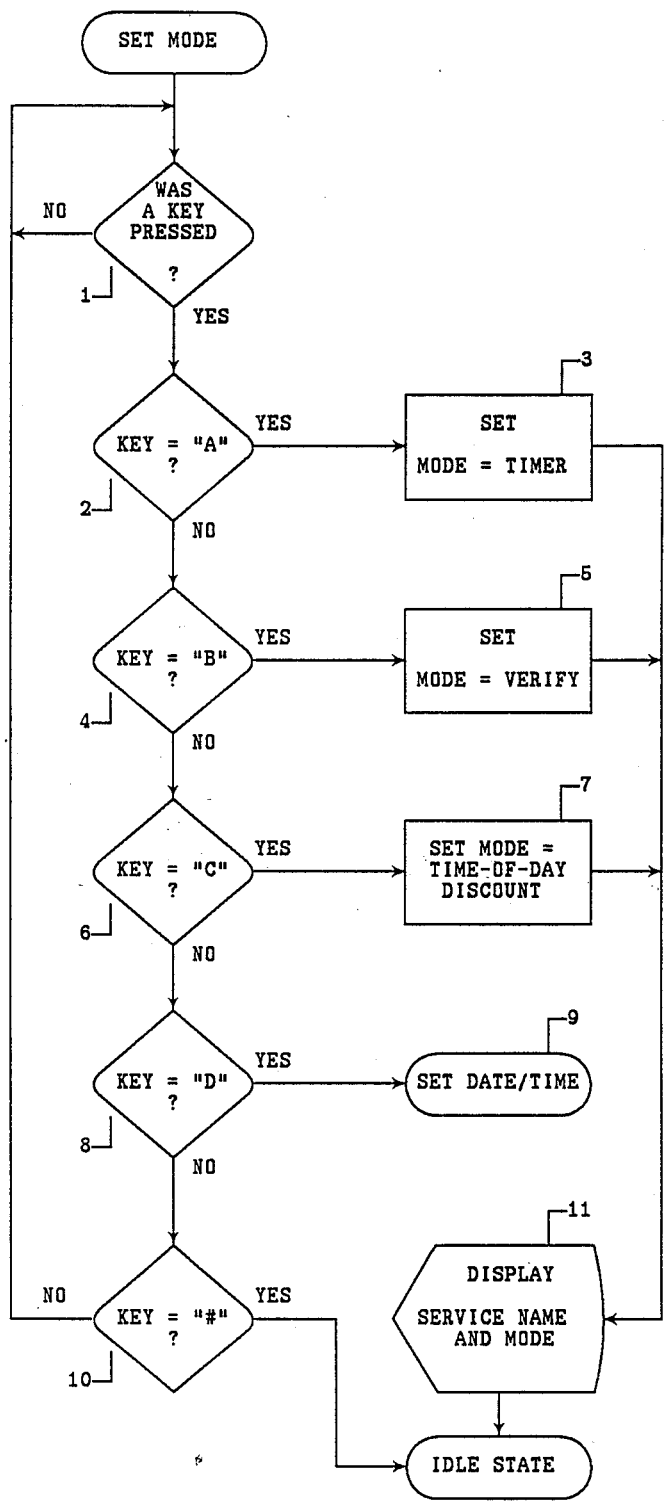
FIG. 9 is a flow chart showing the Set Mode Routine which is used to change the mode of operation of the device.

Until a key is pressed the program reads and displays the time (Steps 1 to 4). At Steps 4 to 6, if the # key is pressed the program goes to the Set Mode subroutine (FIG. 9). If a Service key (A, B, C or D) is pressed the program calls the Select Service subroutine (FIG. 18) to ascertain the service to be used (Steps 4, 5, 7, 8), and then goes to Step 1.

Figure 11A:
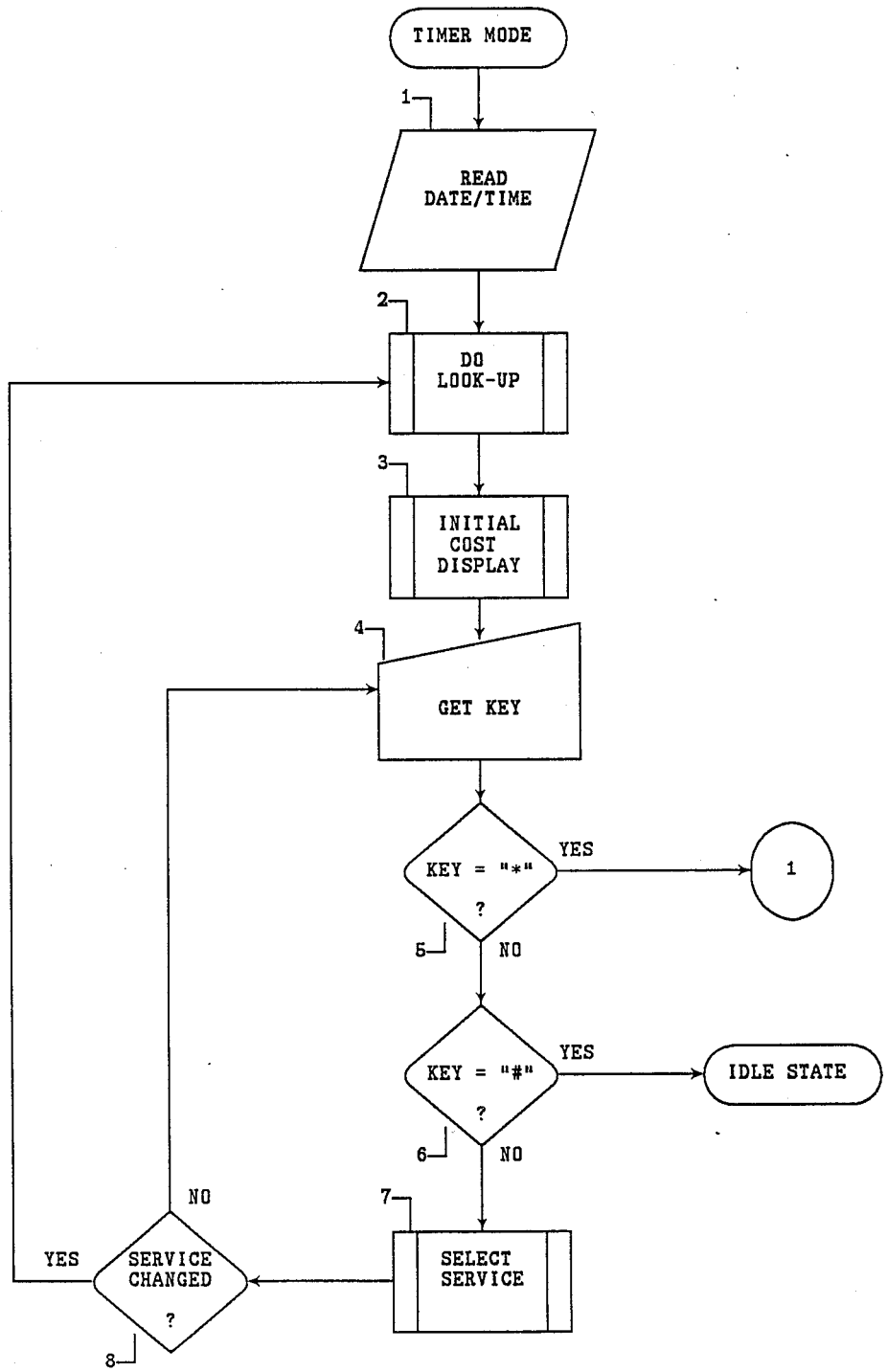
FIGS. 11A, 11B and 11C, hereafter collectively referred to as FIG. 11, constitute a flow chart showing the Timer Routine, which uses the Do Look-Up Subroutine (FIG. 16), the Initial Cost Display Subroutine (FIG. 17) and the Select Service Subroutine (FIG. 18) to complete its functions.
Figure 11B:
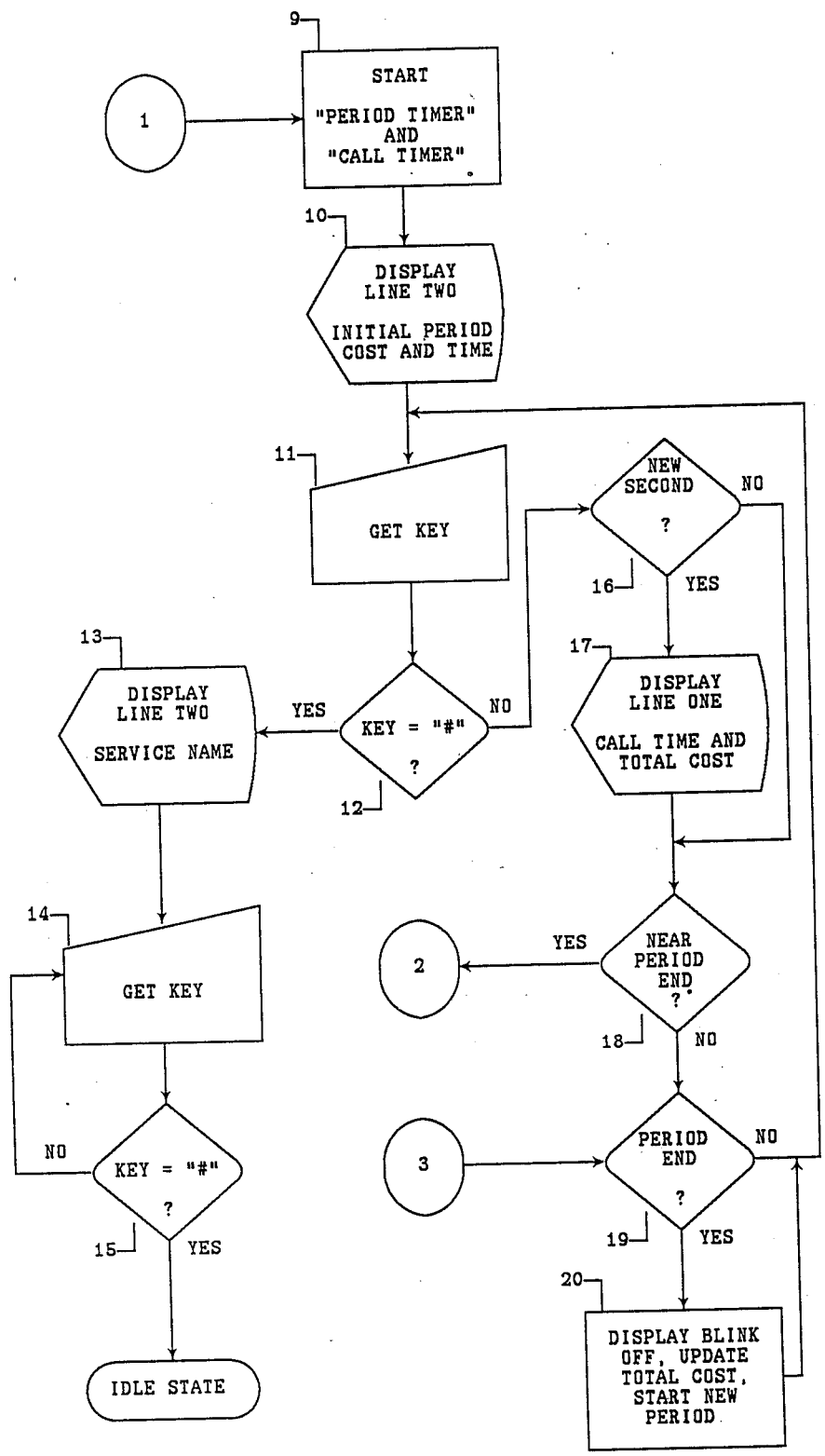
Figure 11C:
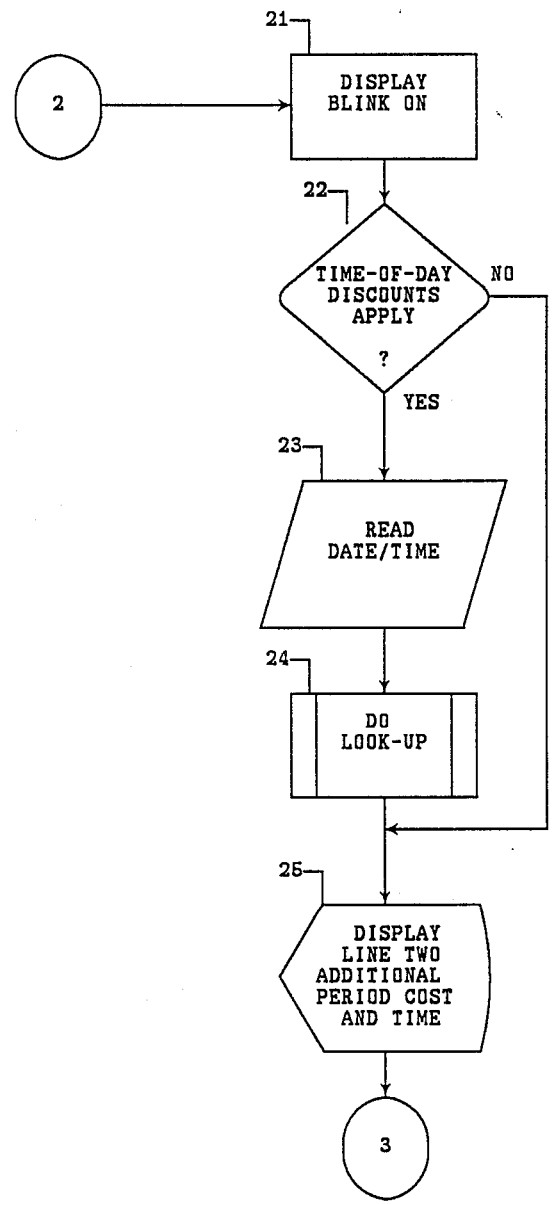
Figure 12A:
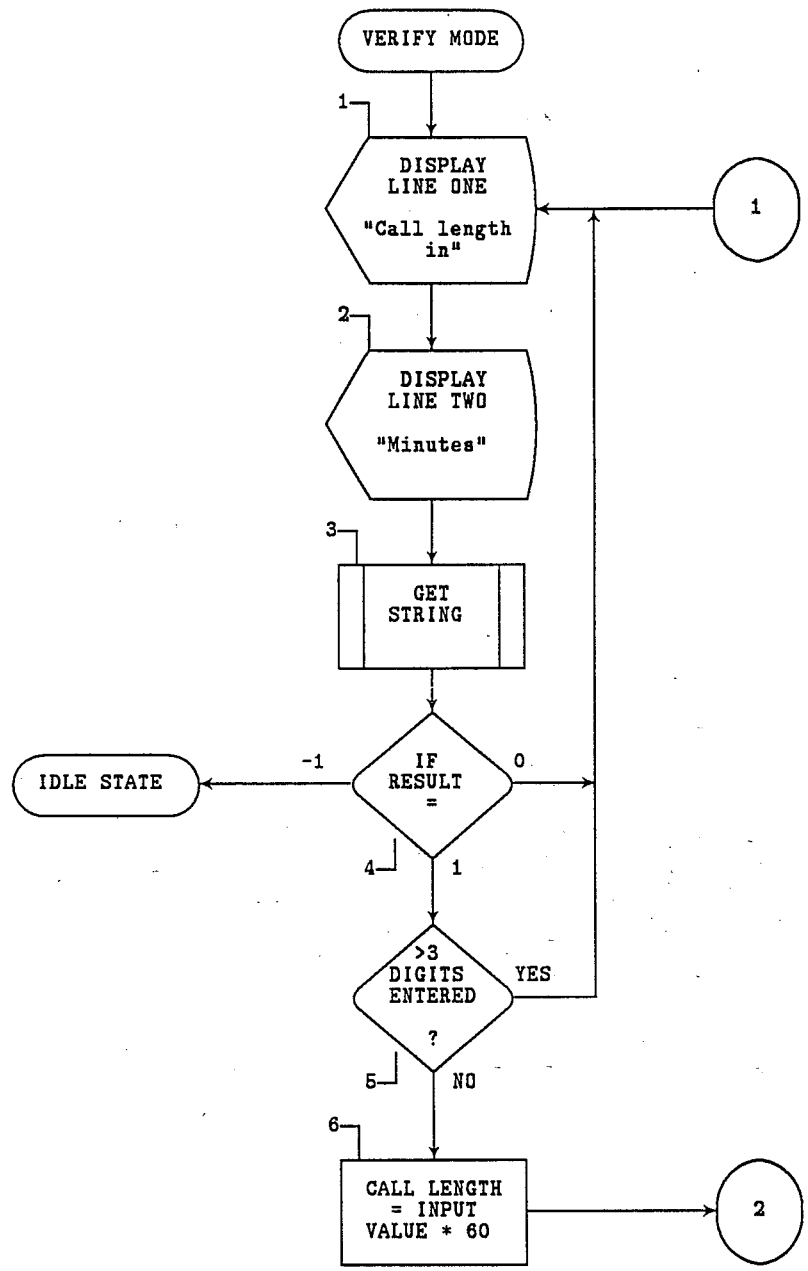
FIGS. 12A, 12B, 12C, 12D and 12E, hereafter collectively referred to as FIG. 12, constitute a flow chart showing the Verify Routine, which uses the Do Look-Up Subroutine (FIG. 16), the Select Service Subroutine (FIG. 18), and the Get String Subroutine (FIG. 21) to complete its functions.
Figure 12B:
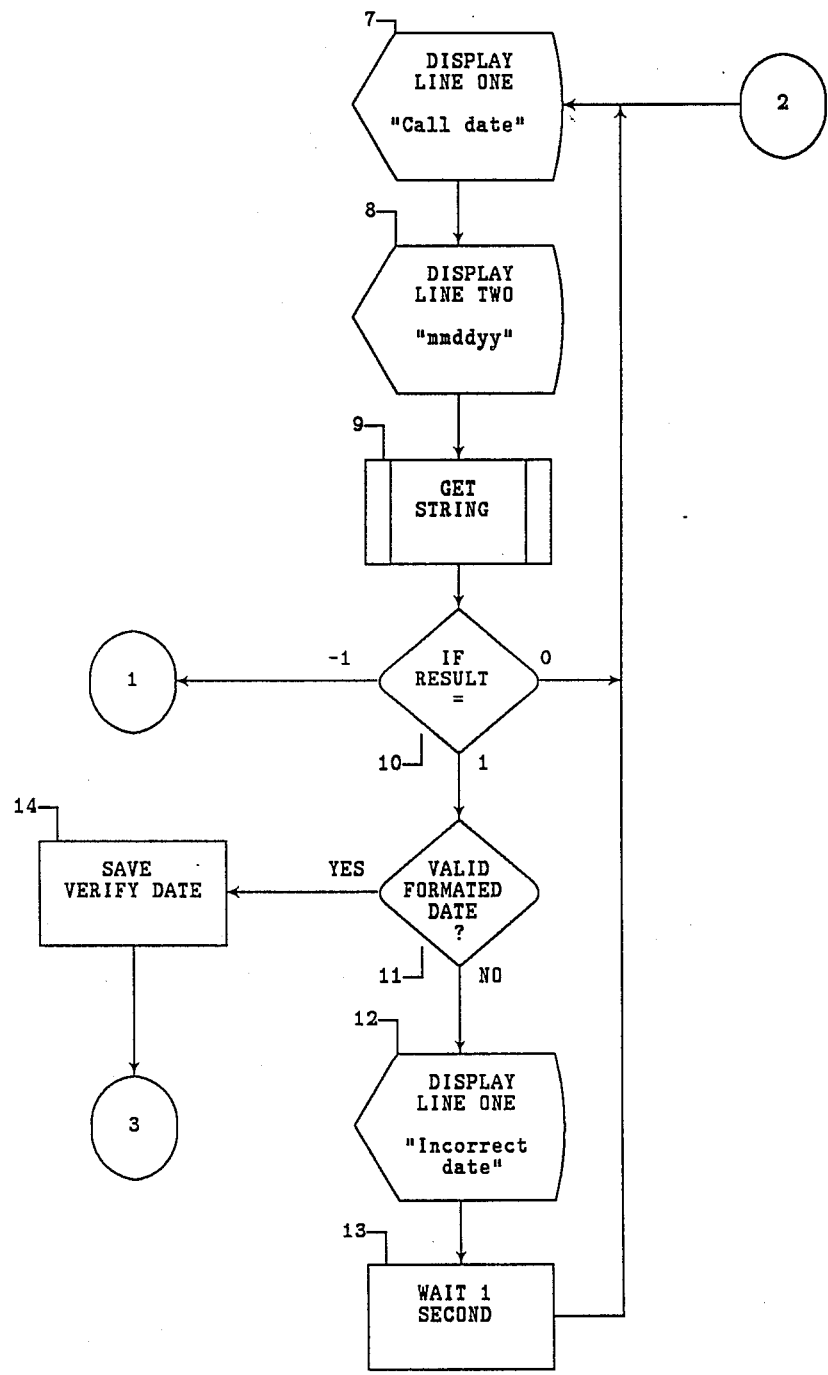
Figure 12C:
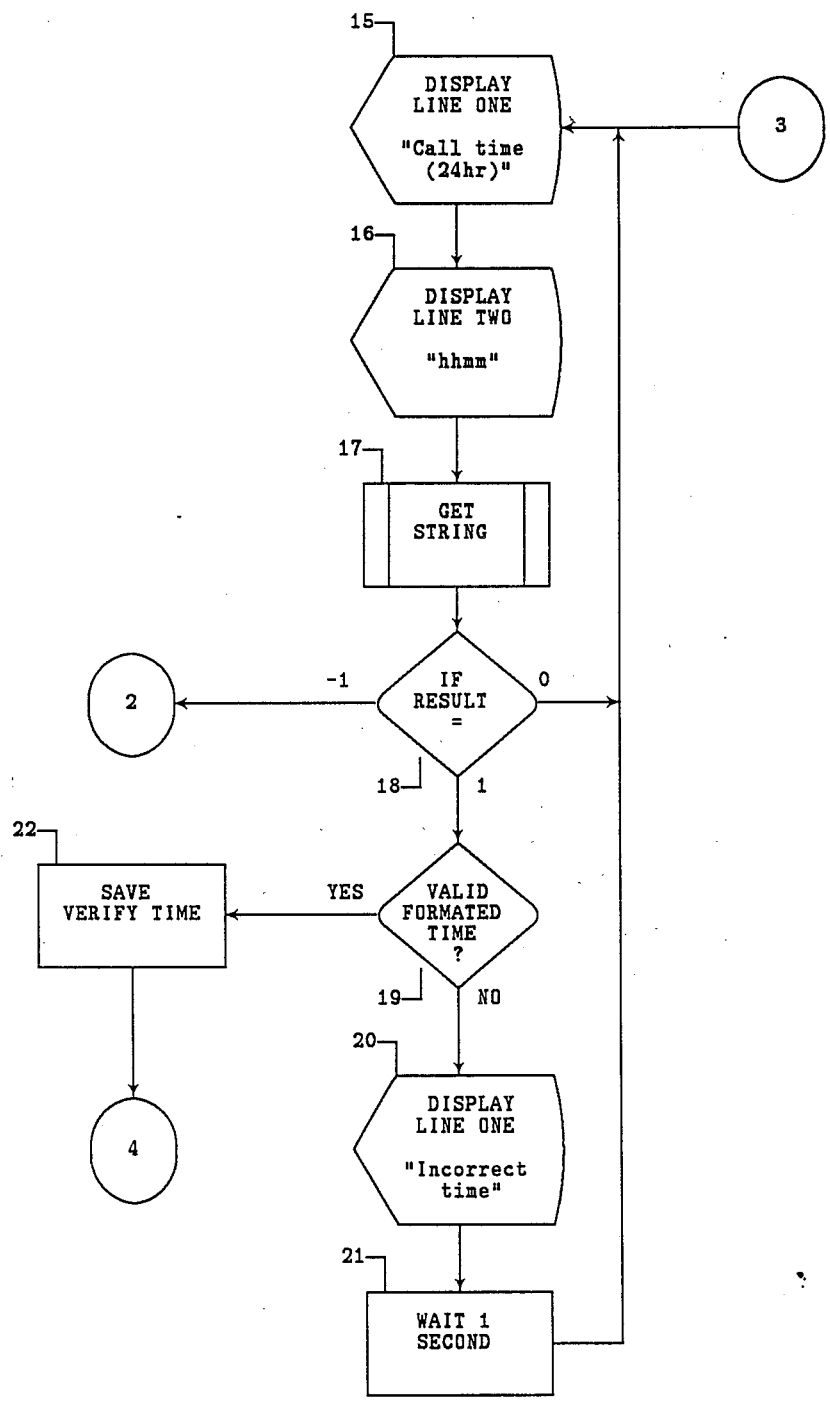
Figure 12D:
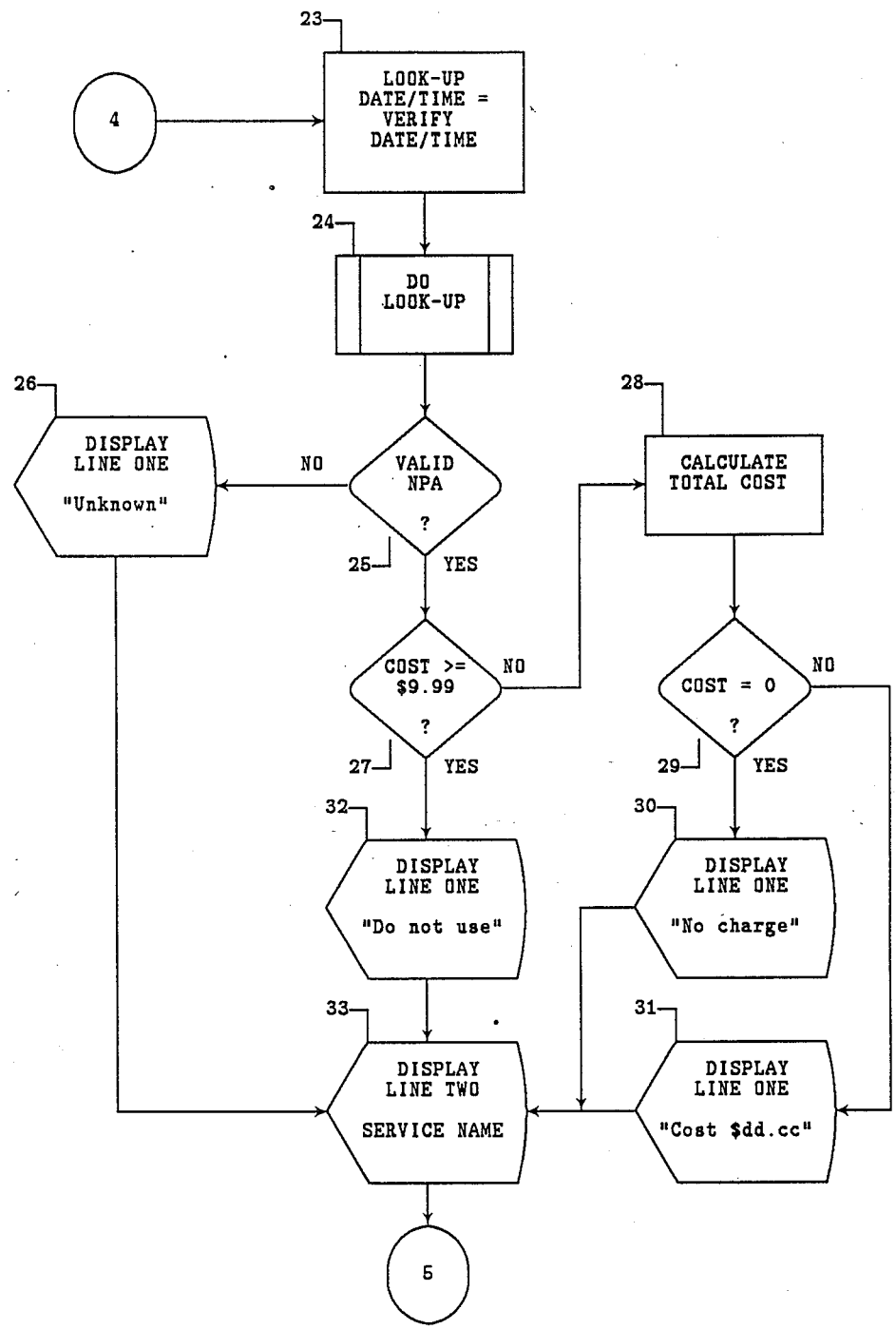
Figure 12E:
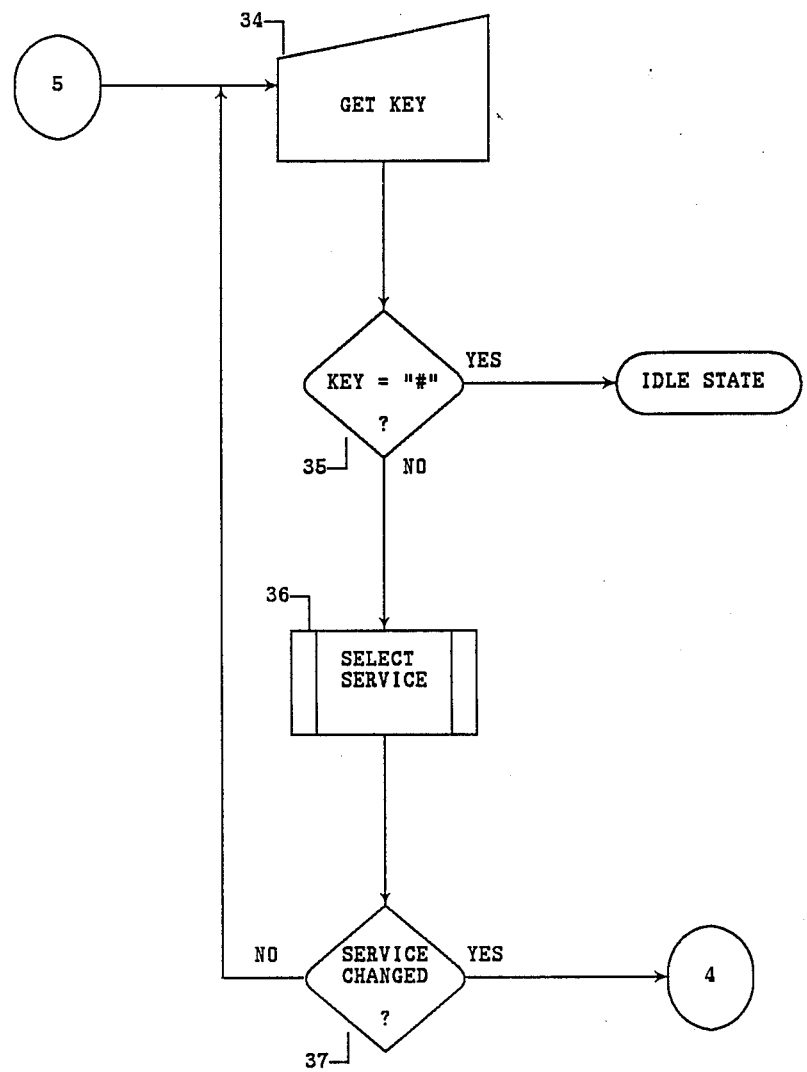
Figure 13A:
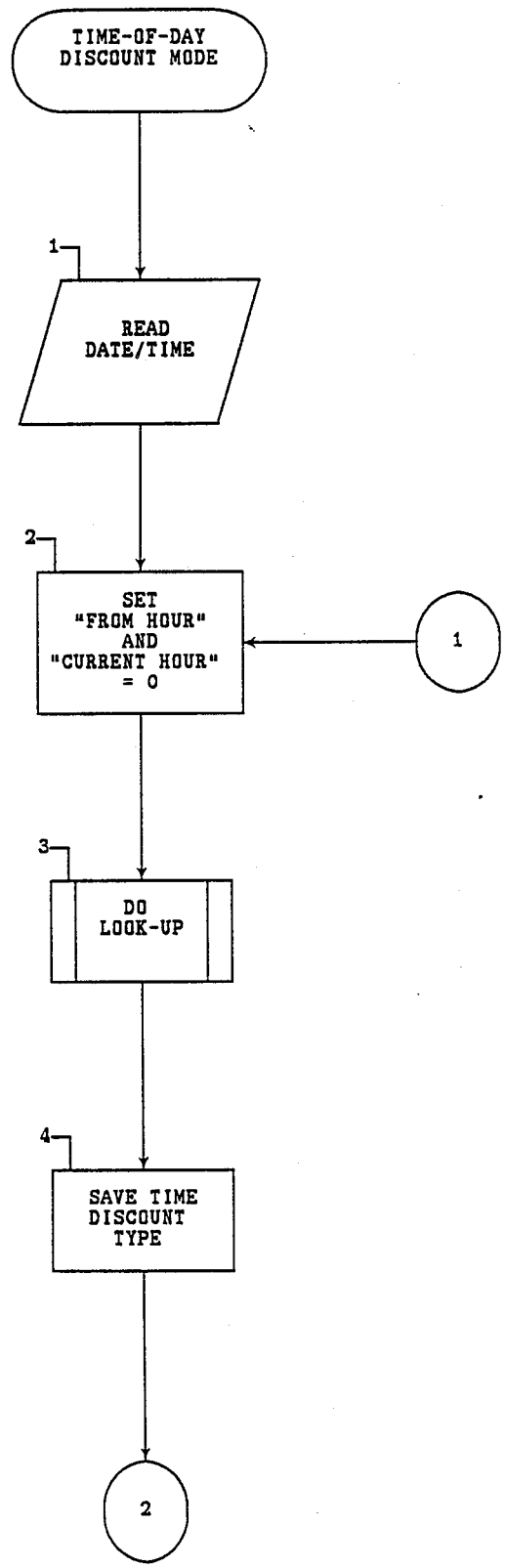
FIGS. 13A, 13B, 13C, 13D and 13E, hereafter collectively referred to as FIG. 13, constitute a flow chart showing the Day-Evening-Night (D.E.N.) or Time-of-Day Discount Routine, which uses the Do Look-Up Subroutine (FIG. 16), the Initial Cost Display Subroutine (FIG. 17), the Select Service Subroutine (FIG. 18), and the Display D.E.N. Subroutine (FIG. 20) to complete its functions.
Figure 13B:
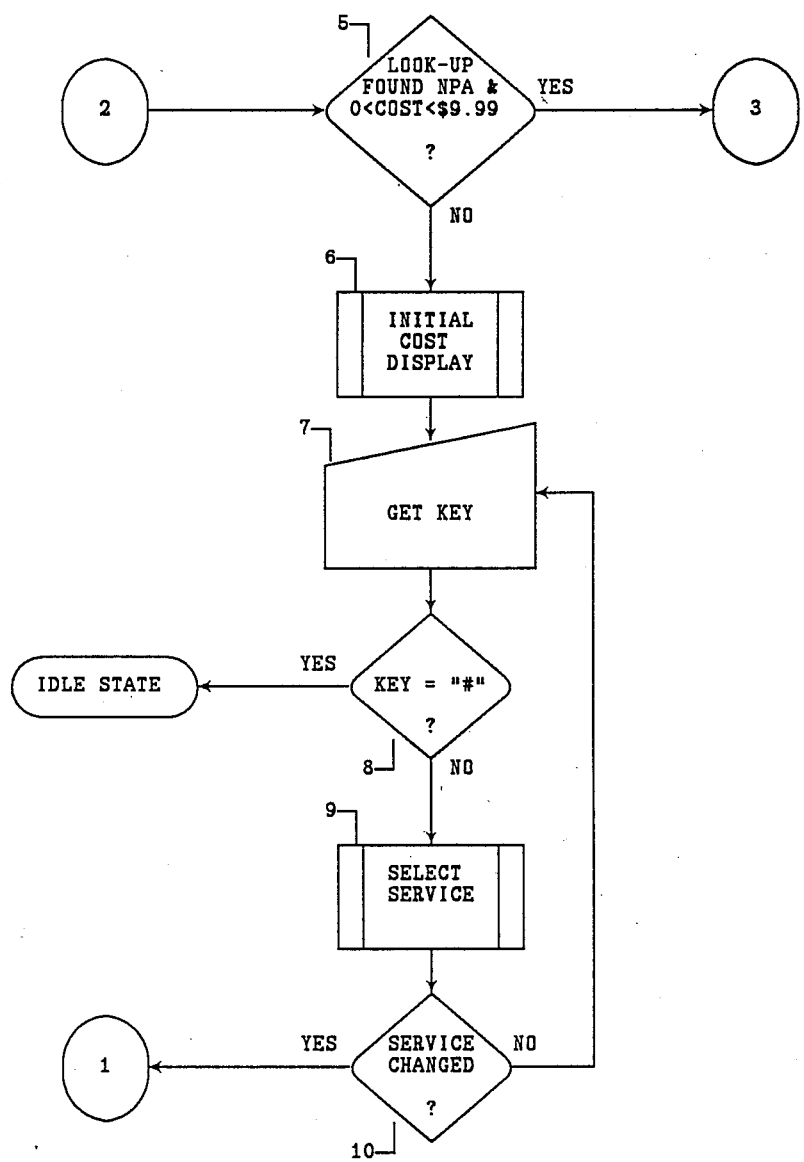
Figure 13C:
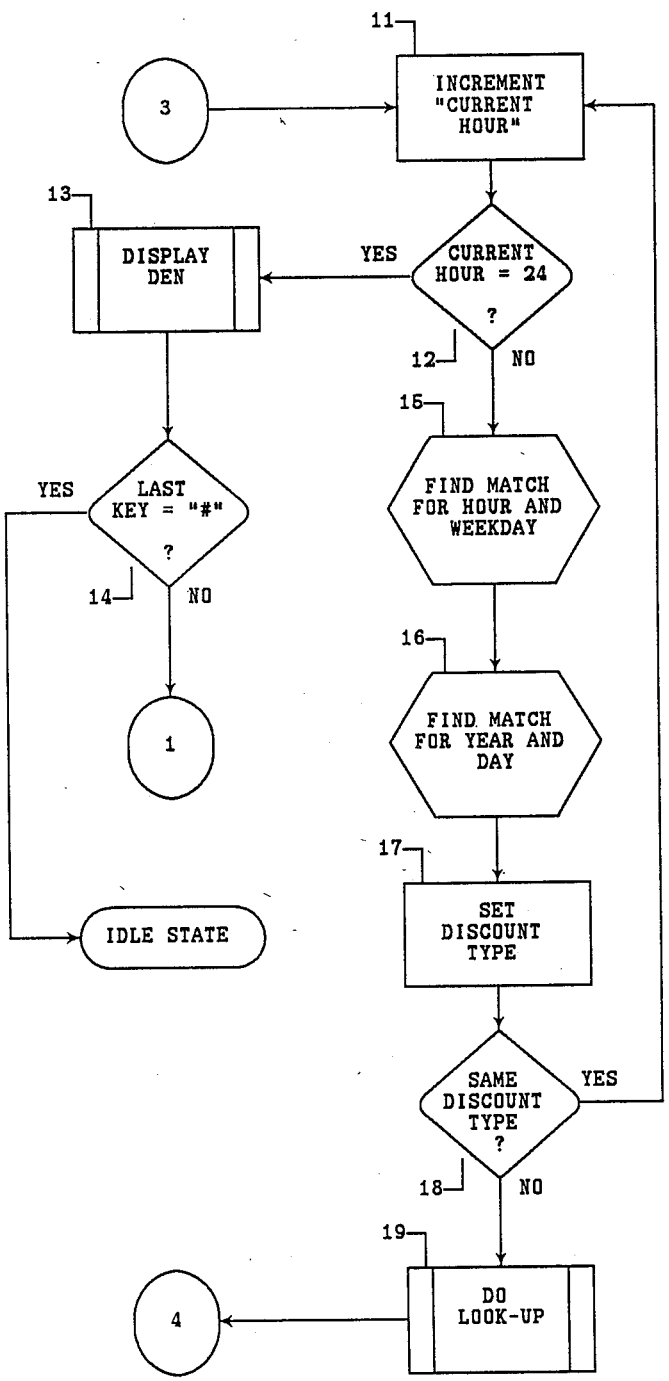
Figure 13D:
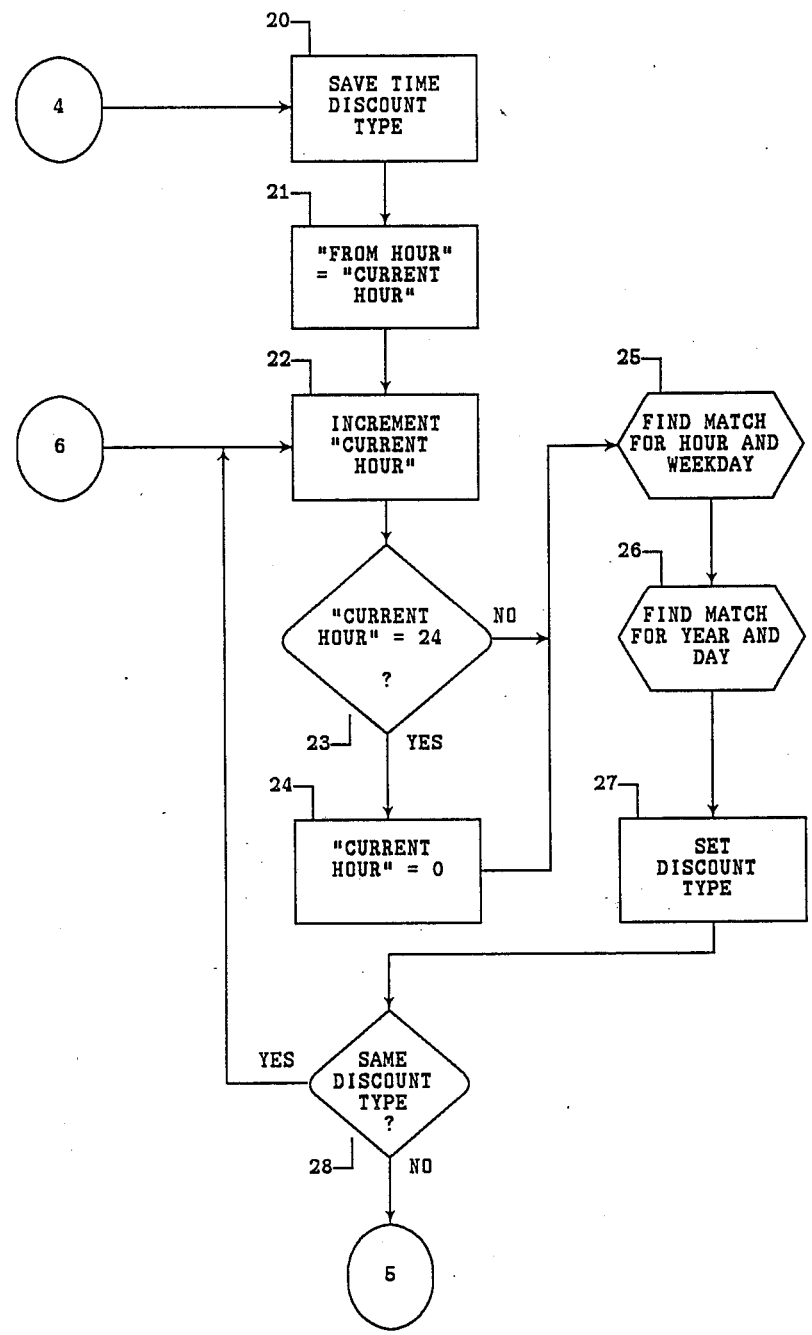
Figure 13E:
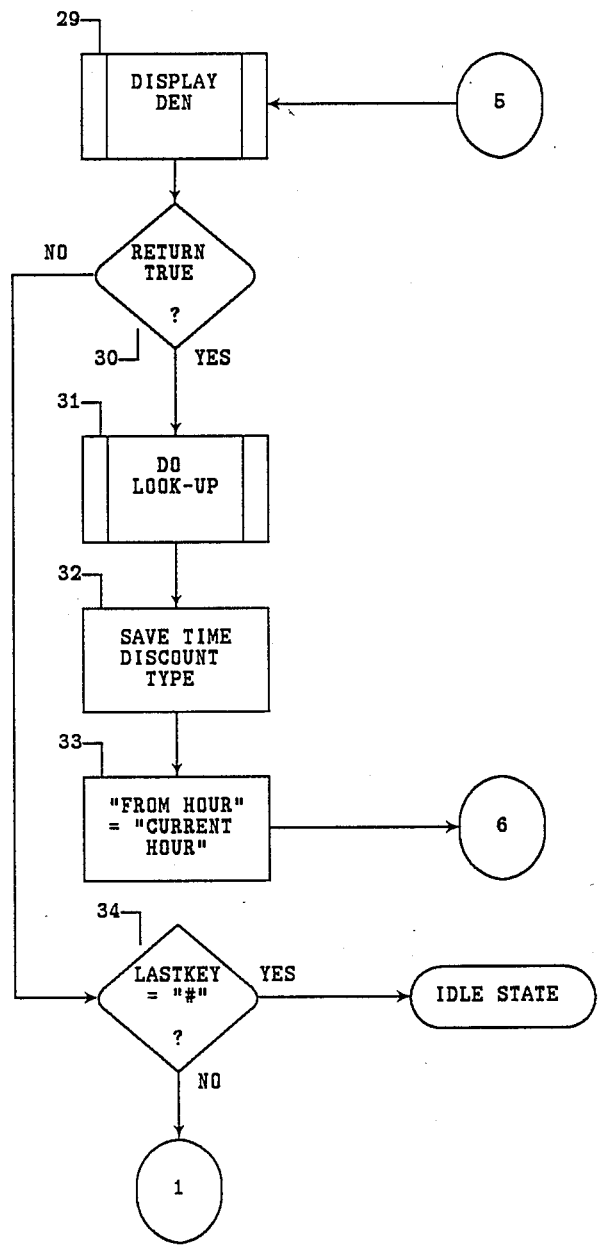

If a numeric key is pressed the program calls the Enter Telephone Number subroutine (FIG. 14), which allows the rest of the phone number to be entered and displayed. The program also uses the Find Rate Center Name subroutine (FIG. 19) to find and display the rate center that matches the phone number (Steps 4, 5, 7, 9). If the processing mode is D.E.N. (Time-of-Day Discount), then at Steps 10, 11 the program goes to the Time-of-Day Discount Mode (FIG. 13). If the processing mode is Verify, then at Steps 10, 12, 13 the program goes to the Verify Mode (FIG. 12). Otherwise at Steps 10, 12, 14 the program goes to the Timer Mode (FIG. 11).

Set Mode (FIG. 9)

Processing control is sent to the Set Mode subroutine when the '#' key is pressed during the Idle State (FIG. 8).

This routine waits for another key to be pressed. If the A, B or C Service key is pressed the device is set to the Timer Mode, the Verify Mode or the D.E.N. (Time-of-Day Discount) Mode respectively.

The service name and the mode chosen are displayed at Steps 1 to 7 and 11, after which the program goes to the Idle State (FIG. 8).

Figure 10A:
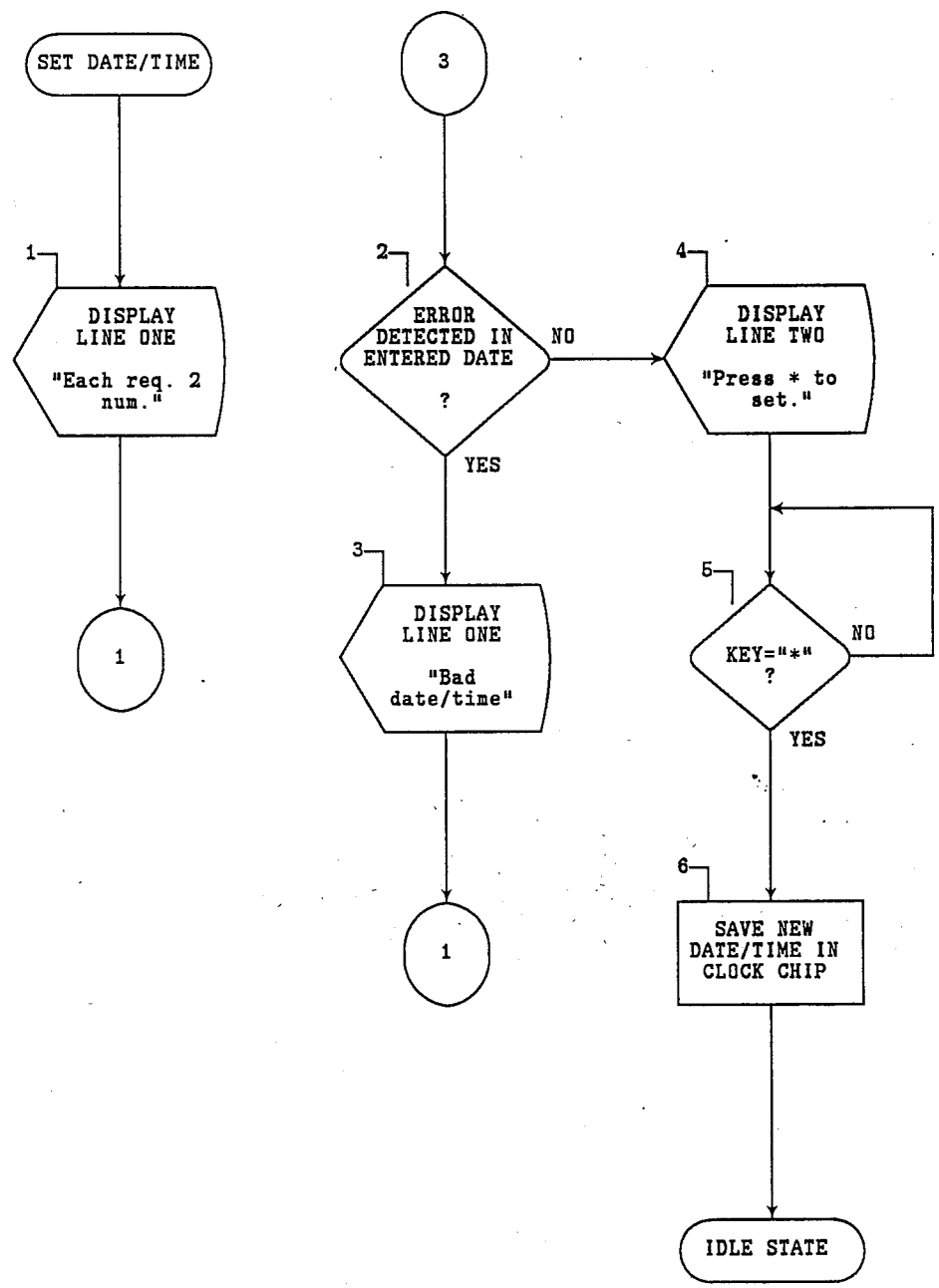
FIG. 10A, 10B and 10C, hereafter collectively referred to as FIG. 10, constitute a flow chart showing the Set Date/Time Routine which allows the user to set or change the date and time settings of the device.
Figure 10B:
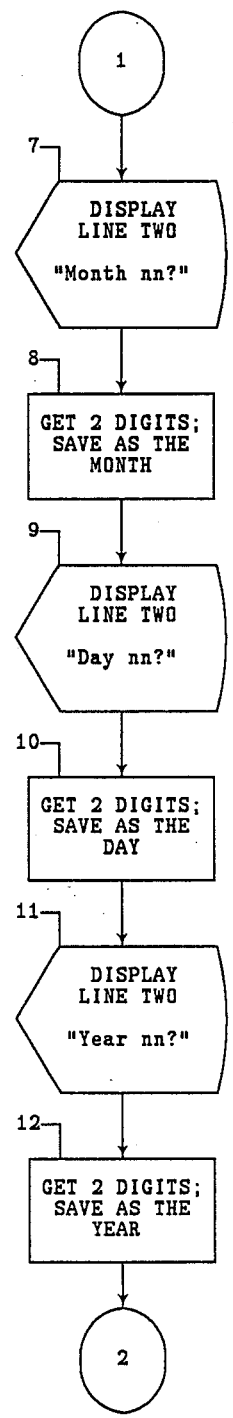
Figure 10C:
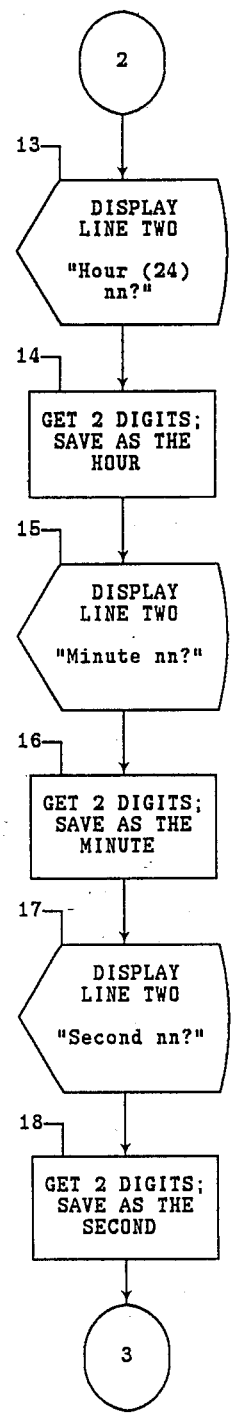

If Service key D is pressed, then at Steps 8,9 the program goes to the Set Date/Time routine (FIG. 10).

If the # key is pressed, then at Step 10 the program goes to the Idle State (FIG. 8) without changing the mode.

If a numeric key or the * key is pressed, then at Step 10 the program goes to Step 1.

Set Date/Time (FIG. 10)

When the D Service key is pressed during the Set Mode (FIG. 9), processing control is sent to the Set Date/Time routine, and the message "Each require 2 numbers" is displayed at Step 1.

The current month, day, year, hour, minute and second are entered via the keyboard, and at Steps 7 to 18 each entry is saved in a corresponding variable. At steps 2, 3 the entries are checked to determine if they are of a valid format. If any entry is invalid the error message "Bad date/time" is displayed and the program goes back to Step 1.

If the date and time entries are valid the message "Press * to set" is displayed and the program waits for the * key to be pressed. When the * key is pressed the real time clock 6 (FIG. 1B) is set to the entered date and time at Steps 1, 4, 5, 6; and the program then goes to its Idle State (FIG. 8).

Timer Mode (FIG. 11)

When the program is in its default (Timer) mode or when the Service key A has been pressed to set the program to the Timer Mode, program control is sent from the Idle State routine (FIG. 8) to the Timer Mode routine, which at Step 1 reads the current date and time.

At Step 2 the Timer Mode routine calls the Do Look-Up subroutine (FIG. 16), which returns the initial period cost and additional period cost of the call, the durations of the initial and additional periods of the call in minutes or seconds, and the time-of-day discount period of the call. At Step 3 the Timer Mode routine calls the Initial Cost Display subroutine (FIG. 17), which displays all of the information returned by the Do Look-Up subroutine.

At Step 4 the keyboard is accessed to determine the next key pressed. If the * is pressed, at Steps 5, 9, 10 the program starts the period and call timers, displays the initial period cost and time, and goes to Step 11. At Steps 5, 6 if the # key is pressed the program goes to the Idle State routine (FIG. 8).

If a key other than the * key or the # key is pressed, at Steps 5 to 7 the program calls the Select Service subroutine (FIG. 18), which returns the desired choice of service. If the service is different from the one currently being used, at Step 8 the program goes back to Step 2. Otherwise, the program goes back to Step 4.

At Step 11 the program determines the next key to be pressed. At Step 12, if the # key is pressed the program goes to Step 13, which displays the name of the current long distance carrier on the second line of the display. If any other key is pressed the program proceeds to Steps 16 and 17, which increment the timer and display its output, i.e. the time elapsed since the * key was pressed, as well as the current cost of the call.

At Step 18, if the timer is not near (e.g. within 10 seconds of) the end of the current (initial or additional) time period, the program goes to Step 19; and if the timer is near the end of the current time period, the program goes to Step 21 which causes the display to blink and the program to proceed to Step 22 where a determination is made as to whether date or time-of-day discounts apply. If such discounts do not apply the program proceeds to Step 25. If such discounts do apply, at Step 23 the program reads the date and time and advances to Step 24, which calls the Do Look-Up subroutine (FIG. 16) to find the next period rates if the time-of-day discount period has changed. At Step 25 the additional period cost and time are displayed.

At Step 18, the program advances to Step 19 whether the current time period is nearly over or not. At Step 19, if the current period is not yet over the program goes back to Step 11; and if the current period has ended the program advances to Step 20, which stops the blinking of the display, adds the cost of the time period which just ended to the total cost, displays the new total cost, starts the next period timer, and causes the program to proceed to Step 11.

At Step 12, if the # key is pressed the timer is stopped and the program proceeds to Step 13, which displays the long distance carrier name and the final cost of the telephone call.

At Steps 14, 15 the program now waits for the # key to be pressed again; and then proceeds to the Idle State routine (FIG. 8).

Verify Mode (FIG. 12)

When the program mode is set to VERIFY, program control is sent to the Verify Mode routine from the Idle State routine (FIG. 8).

Steps 1 and 2 generate a display inquiry for keyboard entry of the duration in minutes of the telephone call to be verified. When the call duration is entered and the * key is pressed, the program advances to Step 3, which calls the Get String subroutine (FIG. 21) to evaluate the digits entered and return a result flag. At Step 4, if the result flag value is −1, the program proceeds to the Idle State routine (FIG. 8); and if the result flag value is 0 the program goes back to Step 1.

At Steps 4 and 5, if the result flag value is 1 and more than three digits were entered, the program goes back to Step 1. If the result flag value is 1 and less than 4 digits were entered, at Step 6 the number of minutes of the call duration as measured by the timer is multiplied by 60 to obtain the corresponding number of seconds, and this number of seconds is saved in a variable.

At Steps 7 and 8 an inquiry as to the date of the call is displayed. When the date is entered via the keyboard and the * key is pressed, at Step 9 the program calls the Get String subroutine (FIG. 21) to evaluate the digits entered and to return a result flag. At Step 10, if the result flag is −1 the program goes to Step 1; and if the result flag is 0 the program goes to Step 7. The program proceeds to Step 11 which checks the validity of the date which has been entered. If the result flag is 1 and the date is not valid the program advances to Step 12, which displays the error message "Incorrect date", advances to Step 13 which provides a one second delay, and then goes back to Step 7. If at Step 10 the result flag is 1 and at Step 11 the date is valid, the program proceeds to Step 14 which saves the entered date in a variable and causes the program to advance to Step 15.

Steps 15 and 16 generate a display inquiry as to the time of day that the call was or is to be placed. After the time of time is entered and the * key is pressed, at Step 17 the program calls the Get String subroutine (FIG. 21) to evaluate the digits entered and to return a result flag. At Step 18, if the result flag is −1 the program goes back to Step 7; if the result flag is 0 the program goes back to Step 15; and if the result flag is 1 the program advances to Step 19. At Step 19, if the entered time is not valid the error message "incorrect time" is displayed and the program proceeds to Step 21 which provides a 1 second delay; after which the program goes back to Step 15. At Step 19, if the result flag is 1 and the entered time is valid, at Step 22 the entered time is saved in a variable and the program proceeds to Step 23.

At Step 23 the program sets the Look-Up date and time equal to the date and time which were entered at Step 17. The program proceeds to Step 24 which calls the Do Look-Up subroutine (FIG. 16) to return the rate information needed to calculate the cost of this call, and the program advances to Step 25.

At Step 25, if the area code is not valid the program proceeds to Step 26, which displays the error message "Unknown" and advances the program to Step 33 which displays the name of the long distance carrier; after which the program proceeds to Step 34.

At Step 25, if the area code is valid the program advances to Step 27, which determines whether the initial period cost of the telephone call is greater than or equal to $9.98; in which event the program proceeds to Step 32 where the message "Do not use" is displayed, after which the program proceeds to Step 33 to display the name of the long distance carrier — following which the program proceeds to Step 34.

At Step 27, if the initial period cost is less than $9.99 the program proceeds to Step 28 where the total cost of the call is calculated. If the total cost equals zero then the message "No Charge" is displayed at Step 30; while if the total cost is not zero the program proceeds to Step 31 where the total cost of the call is displayed on the first line of the display — after which the program advances to Step 33 which displays the name of the long distance carrier and advances the program to Step 34.

At Step 34 the program waits for a key to be pressed and then proceeds to Step 35. At Step 35, if the * key is pressed the program proceeds to the Idle State routine (FIG. 8); while if a key other than the * key is pressed the program advances to Step 36 which calls the Select Service subroutine (FIG. 18) and returns the chosen service. At Step 37, if the service chosen is different from the original service the program proceeds to Step 23; otherwise the program goes to Step 34.

D.E.N. or Time-Of-Day Discount Mode (FIG.13)

When the device is set to the D.E.N. or Time-of-Day Discount mode, program control is transferred from the Idle State routine (FIG. 8) to the D.E.N. or Time-Of-Day Discount routine, which at Step 1 reads the current date and time from the real time clock 6 (FIG. 1B).

At Step 2 the "from hour" and "current hour" variables are set to the current time and the program advances to Step 3, which calls the Do Look Up subroutine (FIG. 16) and returns the rate information for a call to the phone number entered the last time the program was in the Idle State routine.

The program then advances to Step 4, which saves the time-of-day discount type (i.e. day, evening or night) in a variable. The program advances to Step 5, where if the area code is valid and the initial period cost is between zero and $9.99 the program proceeds to Step 11; while if the area code is invalid or the initial period cost is outside this range the program goes to Step 6 which calls the Initial Cost Display subroutine (FIG. 17) — which subroutine displays a message notifying the user of the above situation and advances the program to Step 7 where it waits for a key to be pressed and inputs to Step 8 the identity of the key pressed.

At Step 8, if the # key has been pressed the program proceeds to the Idle State routine (FIG. 8); otherwise the program advances to Step 9 which calls the Select Service subroutine (FIG. 18) and returns the chosen long distance carrier. At Step 10, if the carrier chosen is different from the original carrier the program goes to Step 2; otherwise the program goes back to Step 7 where it looks at the next key to be pressed.

At Step 11 the "current hour" variable is incremented by one and input to Step 12. At Step 12, if the value of the "current hour" variable is 24 the program proceeds to Step 13, which calls the Display DEN subroutine (FIG. 20) to display the initial period and additional period cost parameters of the call, the initial period and additional period durations for the call, the Time-of-Day Discount period and the hours that the Time-of-Day Discount is in effect.

At Step 14, if the last key pressed was the # key, the program proceeds to the Idle State routine (FIG. 8); otherwise the program goes to Step 2.

At Step 12, if the "current hour" is not 24 the program proceeds to Steps 15 and 16, which search the holiday and time tables of the Rate Data EPROM 4 (FIG. 1B) for the date and time corresponding to the current values thereof as provided by the Real Time Clock 6 (FIG. 1B), and obtain the corresponding Time-of-Day Discount type which is set at Step 17. At Step 18, if the discount type is the same as that which was previously set at Step 17, the program proceeds to Step 11; otherwise the program advances to Step 19 which calls the Do Look-Up subroutine (FIG.16), which returns the rate information for this call during the new discount period, and advances the program to Step 20 where the time-of-day discount type is saved in a variable. The program proceeds to Step 21 which sets the "from hour" variable equal to the "current hour" variable; after which the program advances to Step 22.

At Step 22 the "current hour" variable is incremented by one, and the program proceeds to Step 23. At Steps 23 and 24, if the current hour is 24 the current hour is reset to zero and the program proceeds to Step 25; and if the current hour is not 24 the program proceeds directly to Step 25.

Steps 25 and 26 search the holiday and time tables of the Rate Data EPROM 4 (FIG. 1B) for the current date and time, to obtain the corresponding Time-of-Day discount type, which is set at Step 27; and the program proceeds to Step 28. At Step 28, if the discount type is the same as that which was previously set at Step 28, the program goes to Step 22; otherwise the program proceeds to Step 29, which calls the Display DEN subroutine (FIG. 20) to display the initial period and additional period cost parameters of the call, the initial period and additional period durations of the call, the time-of-day Discount type (day, evening or night), and the hours that the Time-of-Day Discount is in effect. Step 29 also causes the Display DEN subroutine to return a true/false flag, after which the program advances to Step 30.

At Step 30, if the flag is true the program advances to Step 31 which calls the Do Look-Up subroutine (FIG. 16) to get the rates for the new discount period. The program then proceeds to Step 32, which saves the time-of-day discount type and advances the program to Step 33, which sets the "from hour" variable equal to the "current hour" variable; and the program then proceeds to Step 22.

At Step 30, if the flag is not true, the program proceeds to Step 34, which determines whether the last key pressed was the # key. If the last key pressed was the # key the program proceeds to the Idle State routine (FIG. 8); otherwise the program goes to Step 2.

Figure 14A:
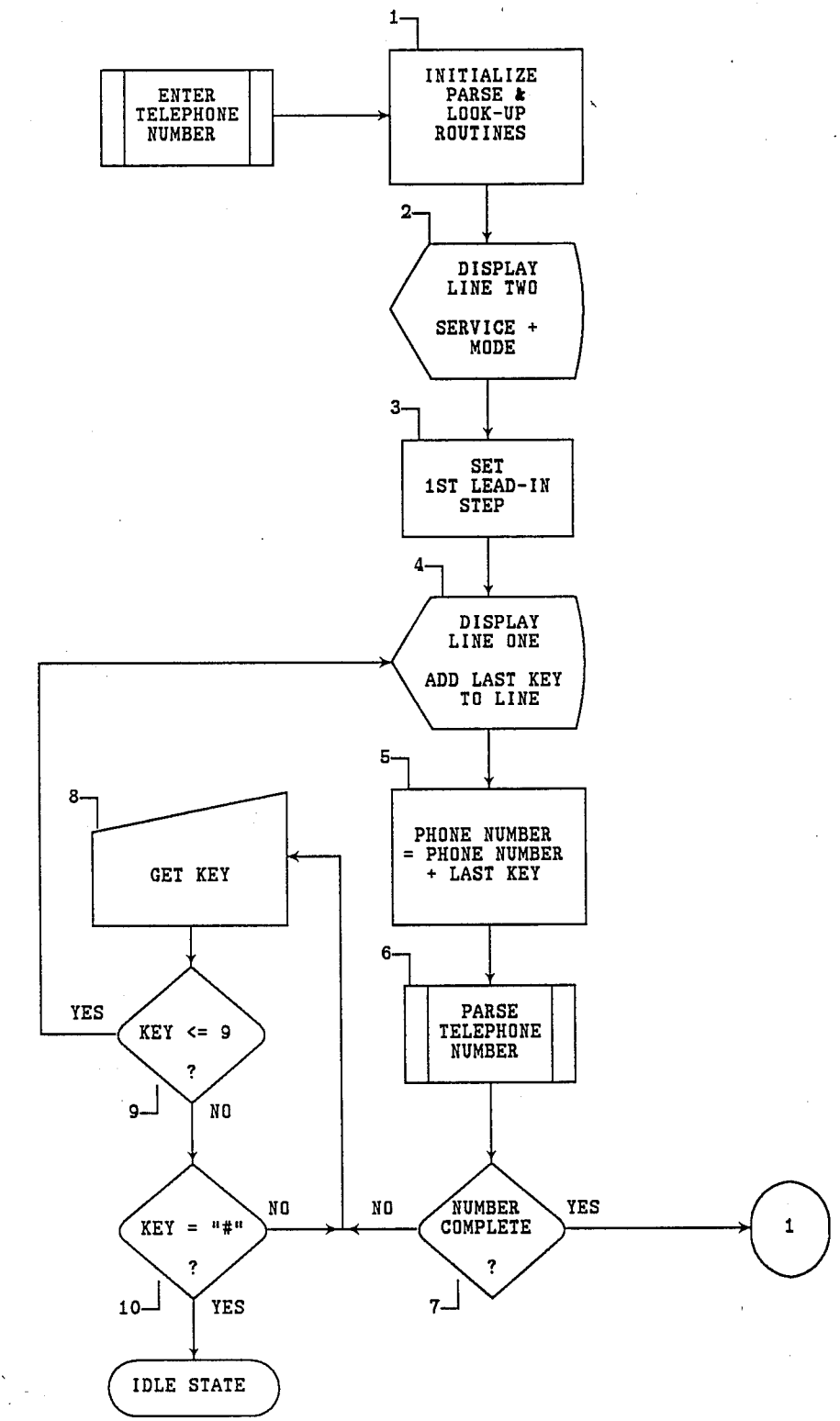
FIGS. 14A and 14B, hereafter collectively referred to as FIG. 14, constitute a flow chart showing the Enter Telephone Number Subroutine which is used by the Idle State Routine (FIG. 8), allows a user to type in the telephone number being called, and which uses the Parse Telephone Number Subroutine (FIG. 15), the Do Look-Up Subroutine (FIG. 16), and the Find Rate Center Name Subroutine (FIG. 19) to complete its functions.
Figure 14B:
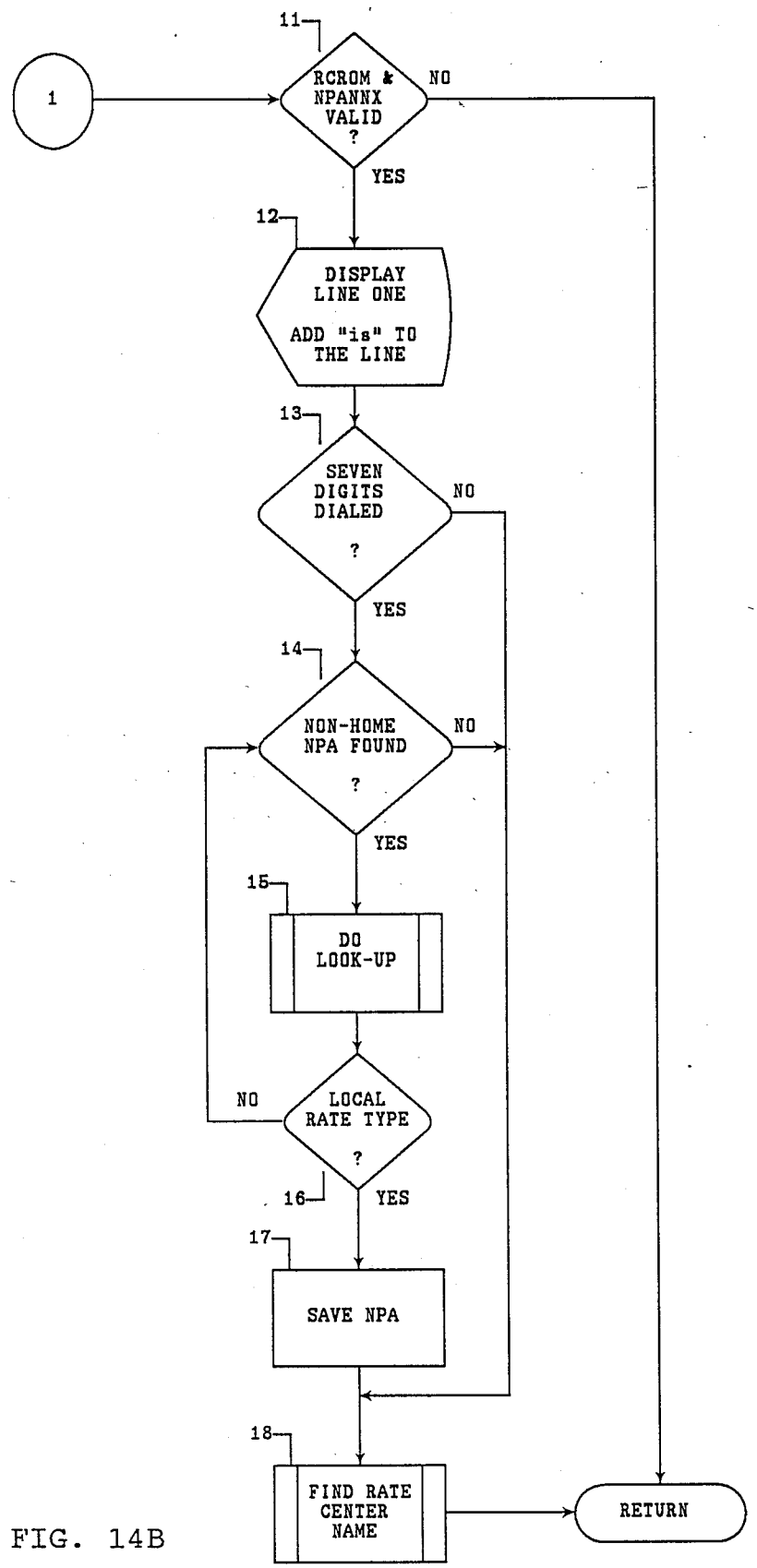
Figure 15A:
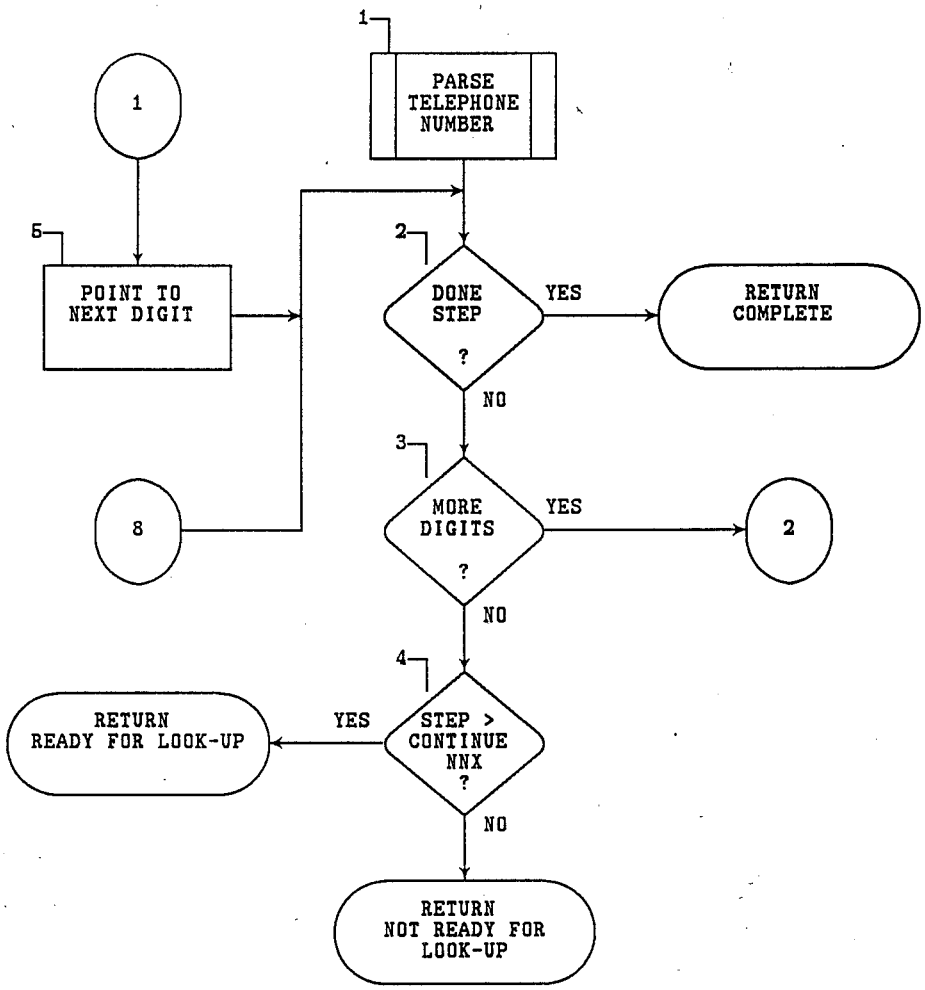
FIGS. 15A, 15B, 15C, 15D, 15E, 15F and 15G, hereafter collectively referred to as FIG. 15, constitute a flow chart showing the Parse Telephone Number Subroutine which analyzes the phone number entered by the user, and which is used by the Enter Telephone Number Subroutine (FIG. 14)
Figure 15C:
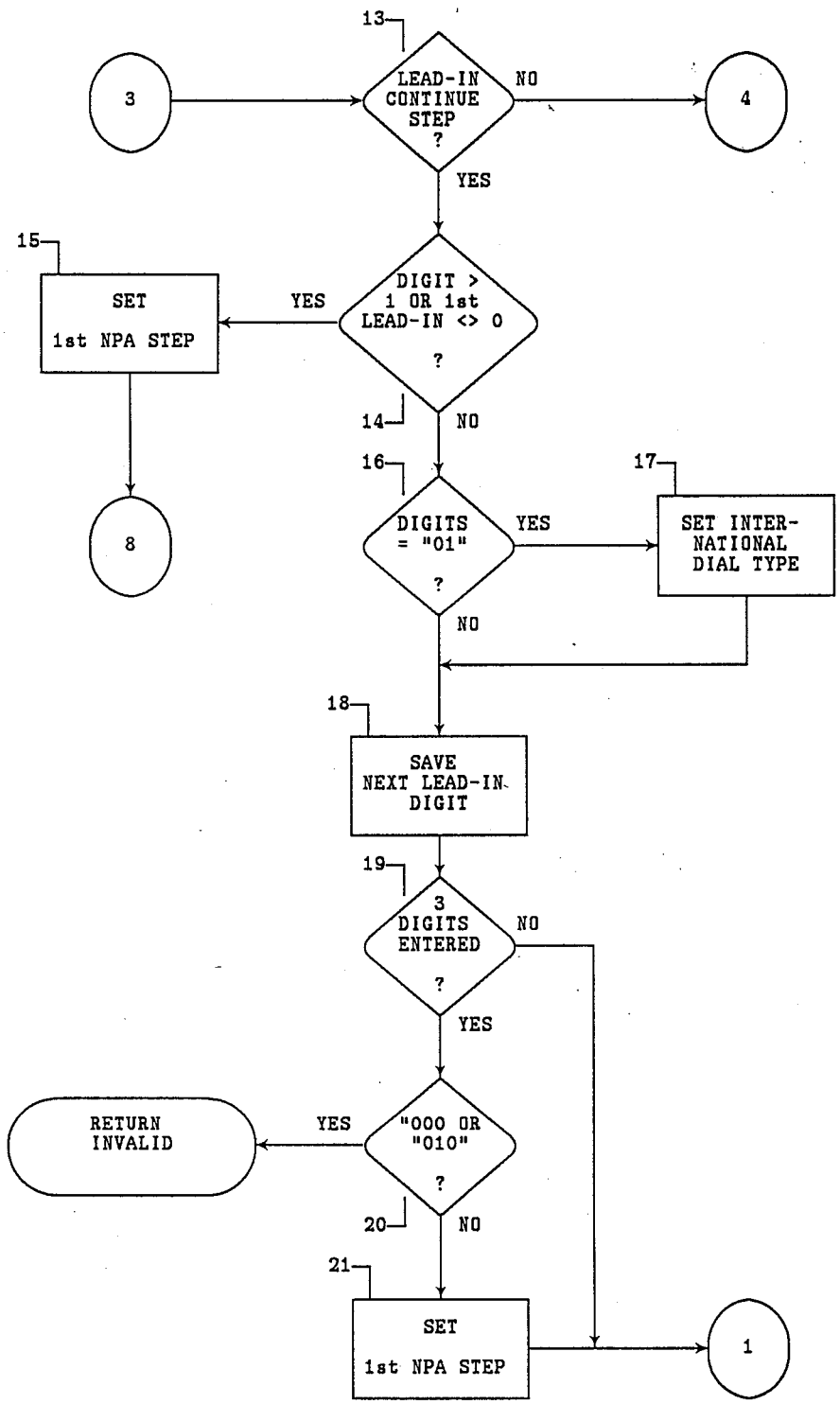
Figure 15B:
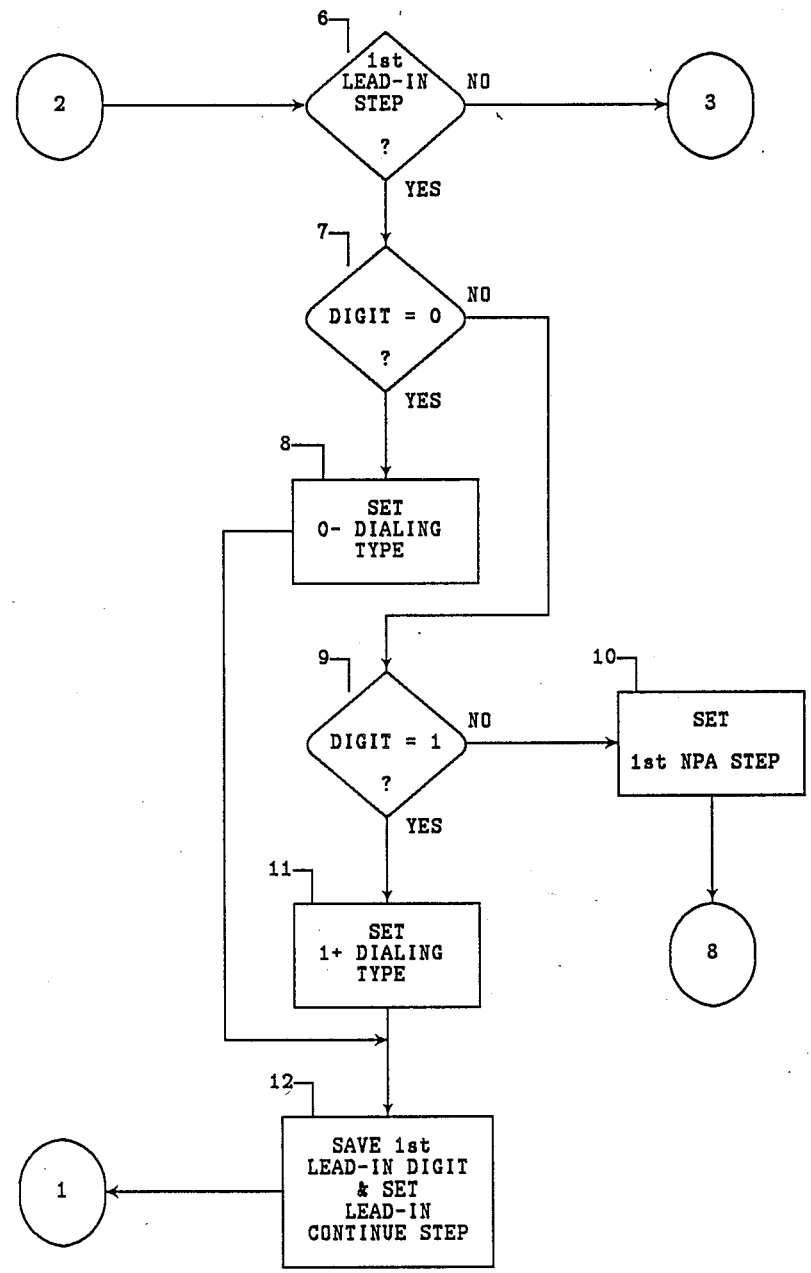
Figure 15D:
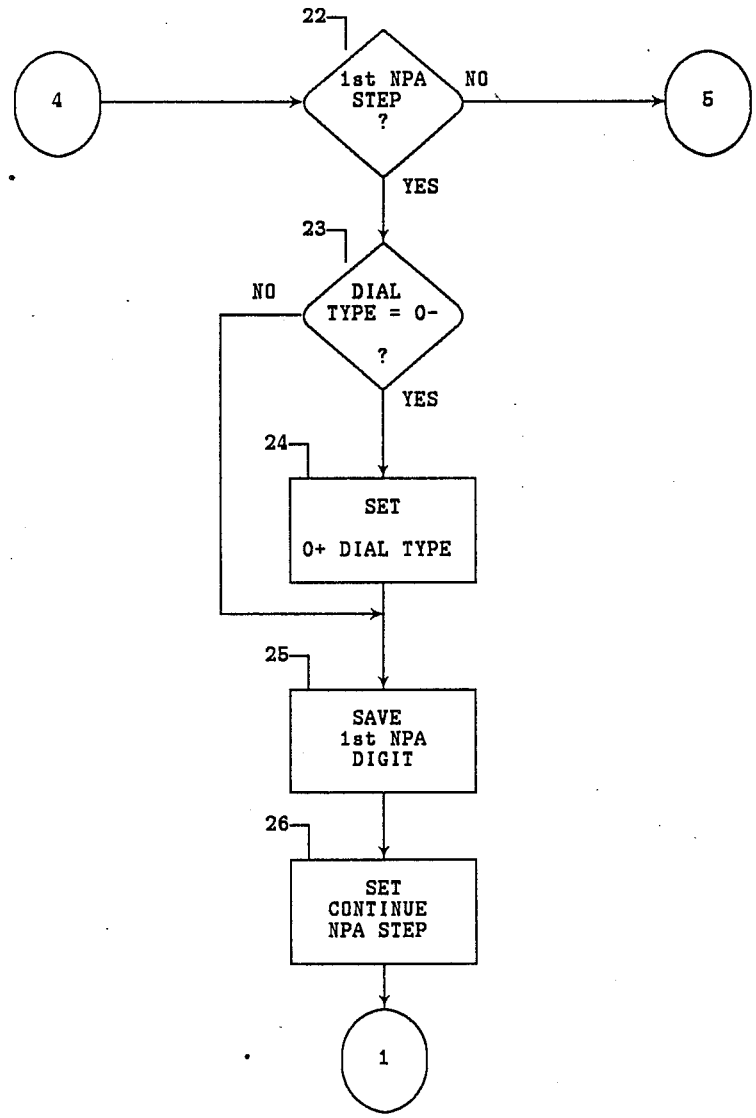
Figure 15E:
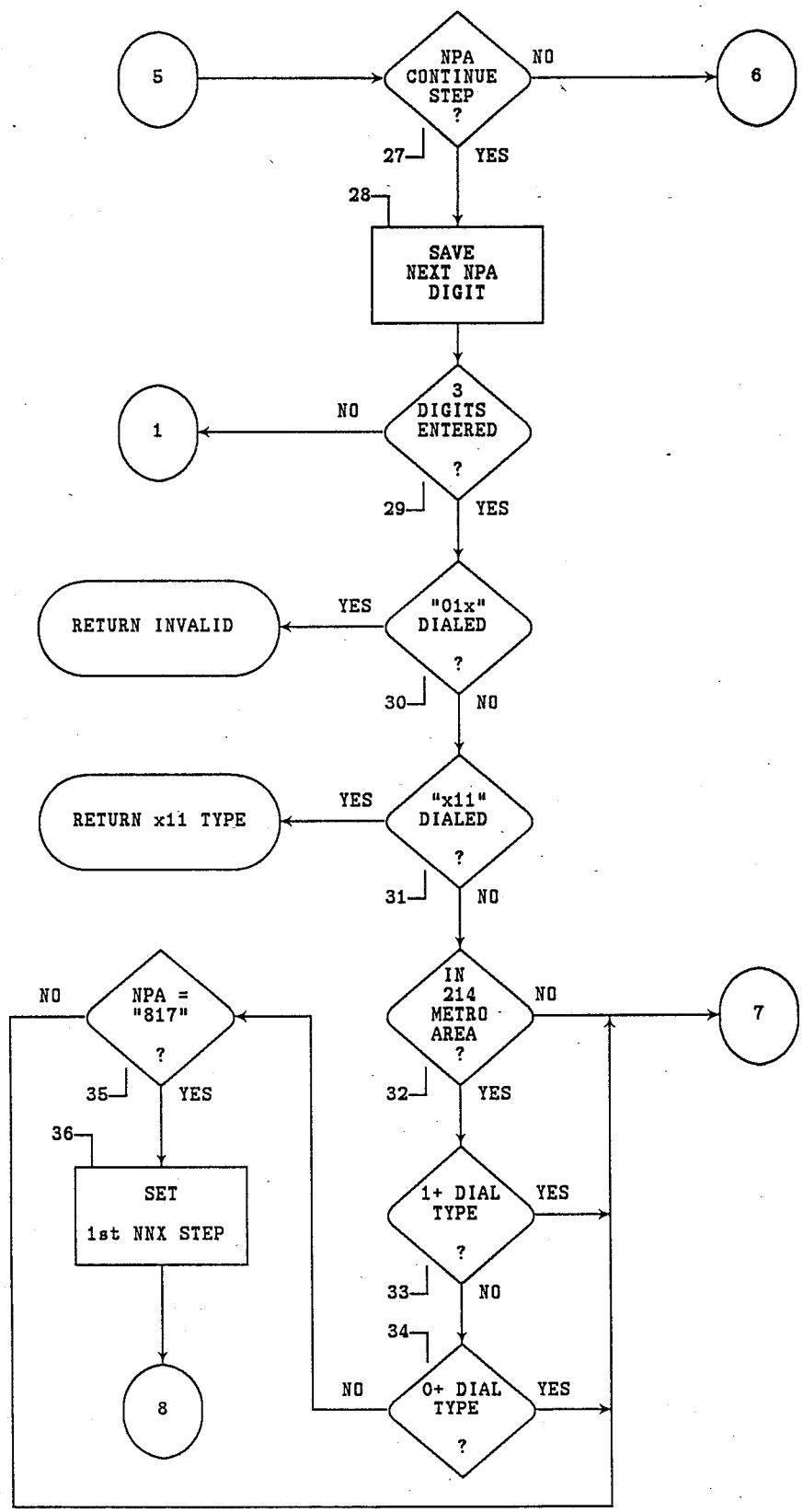
Figure 15F:
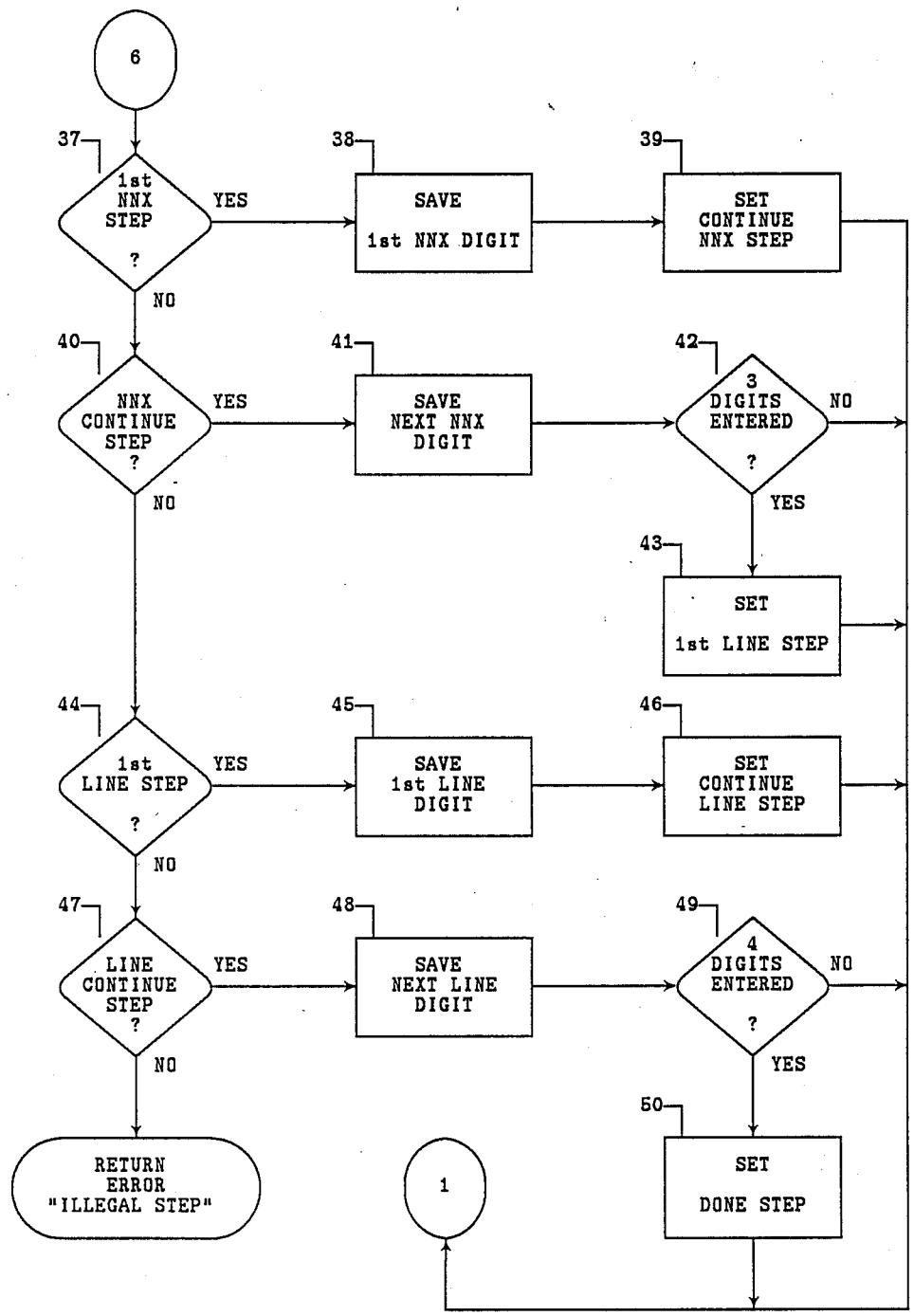
Figure 15G:
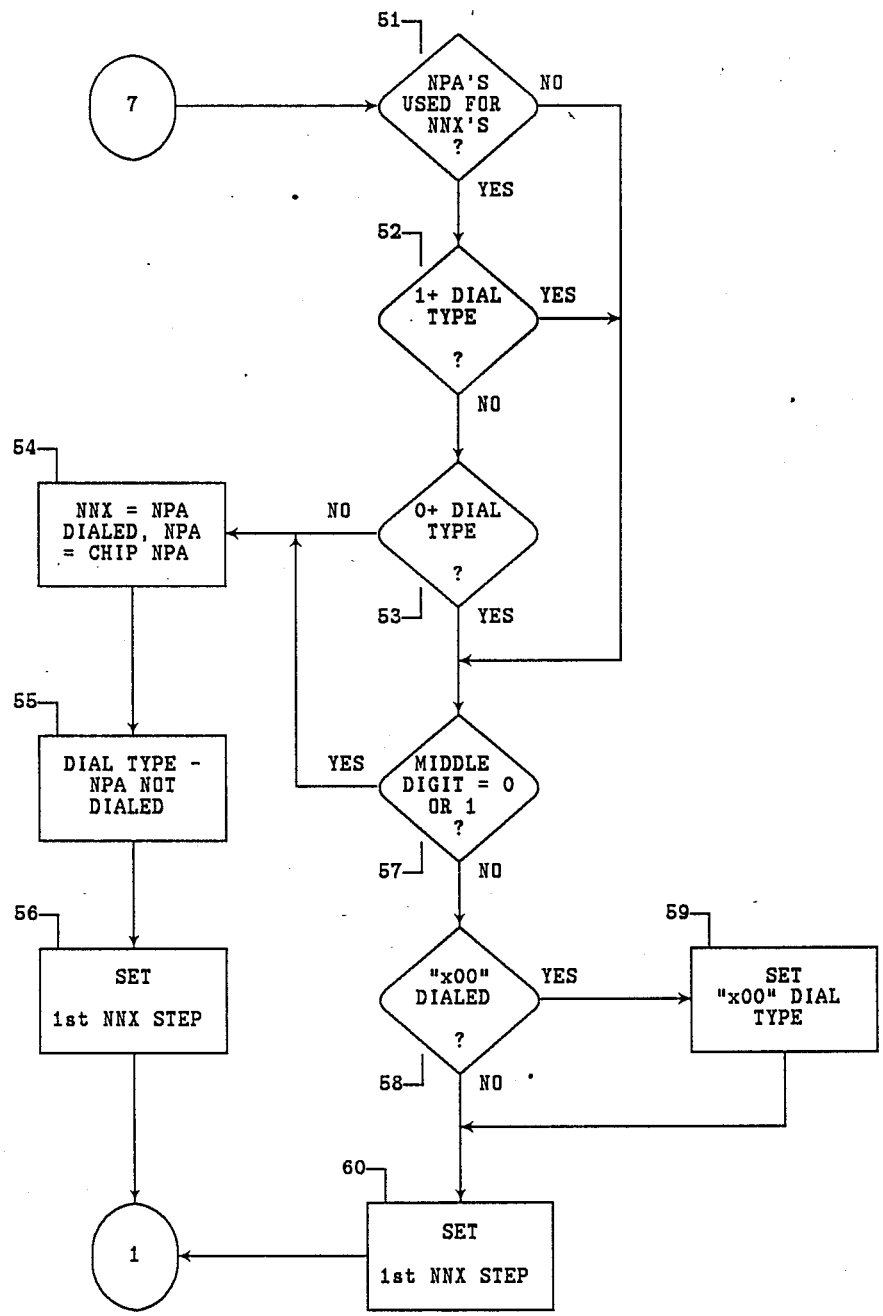

Enter Telephone Number (FIG. 14)

This subroutine is called when a numeric key is pressed while the device 30 is in the Idle State routine (FIG. 8). Telephone numbers can be entered only when the program is in the Idle State routine, i.e. when the day/date/time display is visible on the display panel 32 (FIGS. 1A and 1B).

Figure 16A:
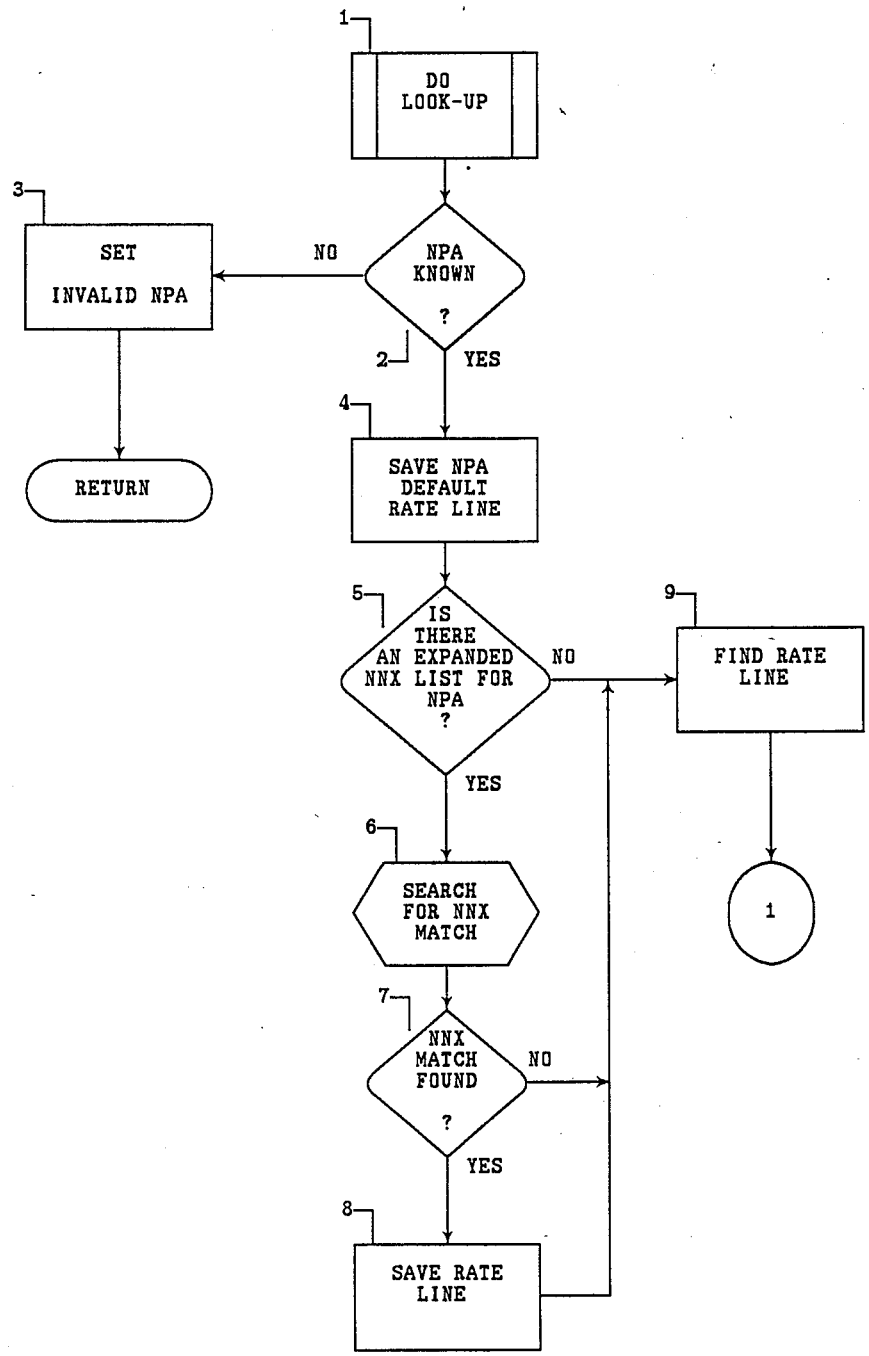
FIGS. 16A and 16B, hereafter collectively referred to as FIG. 16, constitute a flow chart showing the Do Look-Up Subroutine which finds the rate information for a desired telephone call, and which is used by the Timer Routine (FIG. 11), the Verify Routine (FIG. 12), the Day-Evening-Night (D.E.N.) or Time-of-Day Discount Routine (FIG. 1), and the Enter Telephone Number Subroutine (FIG. 14)
Figure 16B:
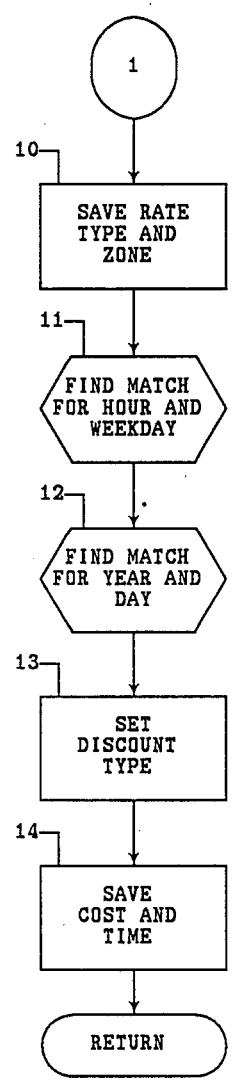

At Step 1 the program initializes the variables in the Parse Telephone Number subroutine (FIG. 15) and the Do Look-Up subroutine (FIG. 16). The program then advances to Step 2 which displays the current long distance carrier (DDD, MCI, Sprint or Allnet in the example previously described) and the current device mode (TIMER, VERIFY, DEN or D/T) on the second line of the display. The program proceeds to Step 3 which sets the program step equal to "1st lead-in", after which the program advances to Step 4.

Step 4 displays (on the first line of the display) the last key entered. The program goes to Step 5 which appends the last key entered to the end of the phone number.

The program then proceeds to Step 6 which calls the Parse Telephone Number subroutine (FIG. 15) to evaluate the telephone number entered, determine if it is a valid telephone number, determine the telephone number type (local or long distance), and to recognize when the entry of the telephone number is completed.

The program then advances to Step 7, where if the entry of the telephone number is not completed the program goes to Step 8 to determine the next key pressed; after which the program tests the next key pressed at Steps 9 and 10, reverting to Step 4 if the next key pressed is a numeric key, to Step 8 if the next key pressed is not a numeric key and not the # key, and to the Idle State routine (FIG. 8) if the next key pressed is the # key. At Step 7, if the entry of the telephone number has been completed the program advances to Step 11.

At Step 11 the program checks to see if the Rate Center Read-Only Memory (Rate Center ROM or RCROM) chip 5 (FIG. 1B) is present. The abbreviation NPANNX which appears in Step 11 refers to area code and exchange, the term NPA referring to area code and the term NNX referring to exchange. If the Rate Center ROM chip is not present the program returns to the Idle State routine (FIG. 8) at the place where the Enter Telephone Number subroutine was called. If the Rate Center ROM chip is present the program advances to Step 12 which displays the word "is" on the first line of the display, after the telephone number which has been entered; and the program proceeds to Step 13.

At Step 13, if the telephone number is seven digits long the program proceeds to Step 14; otherwise the program goes to Step 18.

At Step 14, if the area code entered is the same as the home area code (i.e. the area code to which the information in the Rate Data EPROM 4 (FIG. 1B) corresponds—Area Code 214 in the example previously described) the program proceeds to Step 15; otherwise the program goes to Step 18.

Step 15 calls the Do Look-Up subroutine (FIG. 16) to enable Step 16 to determine if the telephone number entered is a local number. If it is a local number the area code of the number is saved in a variable at Step 17 and the program proceeds to Step 18; otherwise the program goes to Step 14.

Step 18 calls the Find Rate Center Name subroutine (FIG. 19) which searches through the RCROM chip 5 (FIG. 1B), finds the rate center name (i.e. the exchange or central office name and the state in which it is located) and displays it. The program then returns to the Idle State routine (FIG. 8) at the place where the Enter Telephone Number subroutine was called.

Parse Telephone Number (FIG. 15)

This subroutine is called by the Enter Telephone Number subroutine (FIG. 14, Step 6) after each numeric digit of a telephone number is entered.

At Step 2, if the value assigned to this step is equal to "done" the return flag is set equal to "complete" and the program returns this value to the Enter Telephone Number subroutine (FIG. 14) at the place where the Parse Telephone Number subroutine was called; otherwise the program advances to Step 3.

At Step 3, if the next digit in the telephone number has been entered the program proceeds to Step 6; otherwise the program goes to Step 4.

At Step 4, if the value assigned to this step is greater than "continue nnx" (the abbreviation nnx is synonymous with exchange) the return flag is set equal to "ready for look-up" and the program returns this value to the Enter Telephone Number subroutine (FIG. 14) at the place where the Parse Telephone Number subroutine was called; otherwise the program returns the value "not ready for look-up" to that place in the Enter Telephone Number subroutine.

At Step 6, if the value assigned to this step is not equal to "1st lead-in" the program goes to Step 13; otherwise the program advances to Step 7.

At Step 7, if the digit entered via the keyboard is equal to zero the program advances to Step 8 which sets the dialing type to "0"; after which the program goes to Step 12 which saves the digit, sets the value assigned to this step equal to "lead-in continue", and goes back to Step 5 to enable the program to look at the next digit in the telephone number if one has been entered.

At Step 7, if the digit entered via the keyboard is not zero the program proceeds to Step 9, where if the digit is one the program advances to Step 11 where the dialing type is set to "1+"; after which the program proceeds to Step 12 which saves the digit, sets the value assigned to this step equal to "lead-in continue", and goes back to Step 5 to enable the program to look at the next digit in the telephone number if one has been entered.

At Step 9, if the digit is not one the program goes to Step 10 where the value assigned to the step is set equal to "1st npa" (the abbreviation npa is synonymous with area code), after which the program goes to Step 2.

At Step 13 if the value assigned to this step is not equal to "lead-in continue" the program goes to Step 22; otherwise the program advances to Step 14.

At Step 14 if the digit entered is greater than 1 or the first digit of the lead-in is not equal to zero value assigned to this step is set equal to "1st npa" at Step 15 and the program then goes to Step 2; otherwise the program proceeds to Step 16.

At Steps 16 and 17 the dialing type is set to "international" if the first two digits are "01". The program then proceeds to Step 18, which saves the lead-in digits; after which the program advances to Step 19.

At Step 19, if less than three digits have been entered the program goes to Step 5 which looks at the next digit in the telephone number if one has been entered; otherwise the program proceeds to Step 20.

At Step 20, if the digits entered are "000" or "010" the return flag is set to "invalid" and this value is returned to the Enter Telephone Number subroutine (FIG. 14) at the place where the Parse Telephone Number subroutine was called. If the digits entered are not "000" or "010" the program advances to Step 21 where the value assigned to this step is set equal to "1st npa", after which the program goes to Step 5 to look at the next digit in the telephone number if one has been entered.

At Step 22, if the value assigned to this step is not equal to "1st npa" the program goes to Step 27; otherwise the program advances to Step 23.

At Steps 23 and 24 the dialing type is set to "0+ if the dialing type was previously "0−"; after which the program advances to Step 25 which saves the 1st npa digit. The program then proceeds to Step 26 which sets the value assigned to that step equal to "continue npa", after which the program goes to Step 5 to look at the next digit in the telephone number if one has been entered.

At Step 27, if the value assigned to this step is not equal to "continue npa" the program goes to Step 37; otherwise the program advances to Step 28, which saves the area code digit; after which the program advances to Step 29.

At Step 29, if less than three area code digits have been entered the program goes to Step 5 which looks at the next digit in the telephone number if one has been entered; otherwise the program proceeds to Step 30.

At Step 30, if the first two digits of the area code are "01" the return flag is set to "invalid" and the program returns this value to the Enter Telephone Number subroutine (FIG. 14) at the place where the Parse Telephone Number subroutine was called; otherwise the program proceeds to Step 31.

At Step 31, if the last two digits of the area code are "11" the return flag is set to "x11 type" and the program returns this value to the Enter Telephone Number subroutine (FIG. 14) at the place where the Parse Telephone Number subroutine was called; otherwise the program proceeds to Step 32.

At Step 32, if the area code is not equal to "214 metro" the program goes to Step 51; otherwise the program advances to Step 33, where if the dialing type is "1+" the program goes to Step 51 and otherwise advances to Step 34.

At Step 34, if the dialing type is "0+" the program goes to Step 51; otherwise the program advances to Step 35. At Step 35, if the area code is not equal to "817" the program goes to Step 51; otherwise the program goes to Step 36 which sets the value assigned to this step equal to "1st nnx", after which the program goes to Step 5 to look at the next digit in the telephone number if one has been entered.

At Step 37, if the value assigned to this step is equal to "1st nnx" the program proceeds to Steps 38 and 39 which save the digit and set the value assigned to Step 39 equal to "continue nnx"; after which the program goes to Step 5 to look at the next digit in the telephone number if one has been entered. At Step 37 the program advances to Step 40 if the value assigned to this step is not equal to "1st nnx".

At Step 40, if the value assigned to this step equals "continue nnx" the program proceeds to Step 41 which saves the digit, after which the program proceeds to Step 42; otherwise the program does to Step 44.

At Step 42, if three exchange digits have been entered the program proceeds to Step 43 where the value assigned to this step is set equal to "1st line". After Step 42 (and ir applicable, Step 43) the program proceeds to Step 5 to look at the next digit in the telephone number if one has been entered.

At Step 44, if the value assigned to this step equals "1st line" the program proceeds to Steps 45 and 46 which save the digit and set the value assigned to Step 46 equal to "continue line"; after which the program goes to Step 5 to look at the next digit in the telephone number if one has been entered. If the value assigned to Step 44 is not equal to "1st line" the program advances to Step 47.

At Step 47, if the value assigned to this step equals "continue line" the program advances to Steps 48, 49 and 50 which save the digit and set the value assigned to Step 50 equal to "done" if four line digits have been entered, after which the program proceeds to Step 5 to look at the next digit in the telephone number if one has been entered; otherwise the program sets a flag equal to "illegal step" and returns this value to the Enter Telephone Number subroutine (FIG. 14) at the place where the Parse Telephone Number subroutine was called.

At Steps 51 to 53, if the area code is used for an exchange and the dialing type is not equal to "1+" or "0+" the program goes to Step 54; otherwise the program proceeds to Step 57.

At Step 57, if the middle digit (of the first three digits) is less than two the program proceeds to Step 54; otherwise the program advances to Step 58.

At Steps 58 and 59 the dialing type assigned to Step 59 is set to "x00" if the last two digits of the area code are "00"; and the program proceeds to Step 60 which sets the value assigned to this step equal to "1st nnx"—after which the program goes to Step 5 to look at the next digit in the telephone number if one has been entered.

At Step 54 the exchange is set equal to the area code dialed and the area code is set equal to the home area code, after which the program proceeds to Step 56 which sets the value assigned to this step equal to "1st nnx". The program then goes to Step 5 to look at the next digit in the telephone number if one has been entered.

Do Look-Up (FIG. 16)

The Do Look-Up subroutine is called by any routine that needs rate information.

At Step 2 the program searches through the Rate Data EPROM chip 4 (FIG. 1B) for the area code. If the area code is not found the program goes to Step 3 which sets the "invalid npa" flag to "on" and returns program control to the place that called the Do Look-Up subroutine; otherwise the program advances to Step 4.

At Step 4 the program sets the rate line number equal to a default determined by the Rate Data EPROM chip 4, after which the program advances to Step 5. In the Rate Data EPROM chip 4, if the area code is associated with more than one rate line an expanded exchange list is present to specify which rate line each exchange is associated with. If the area code is associated with only one rate line, then all exchanges in the area code are associated with the same rate line and no expanded exchange list is present.

At Step 5, if there is no expanded exchange list in the Rate Data EPROM chip 4 for the area code, the program goes to Step 9; otherwise the program advances to Step 6.

At Steps 6 and 7 the program searches the exchange list in the Rate Data EPROM chip 4 for the exchange of the telephone number which was entered via the keyboard. If the exchange is not found the program goes to Step 9; otherwise the program advances to Step 8 which sets the rate line number equal to the rate band number assigned to the exchange that was found.

At Steps 9 to 14 the program searches through the Rate Data EPROM until the rate line saved in Step 8 or the default rate line saved in Step 4 is found; saves the rate type and rate zone; searches the time and holiday tables of the Rate Data EPROM until the date and time are found; gets the time-of-day discount type from the Rate Data EPROM; sets the initial period cost and the additional period cost equal to the rates in the rate line of the Rate Data EPROM for the assigned time-of-day discount type; saves the initial period and additional period costs of the call and the initial period and additional time period durations of the call; and returns control to the place in the program from which the Do Look-Up subroutine was called.

Figure 17A:
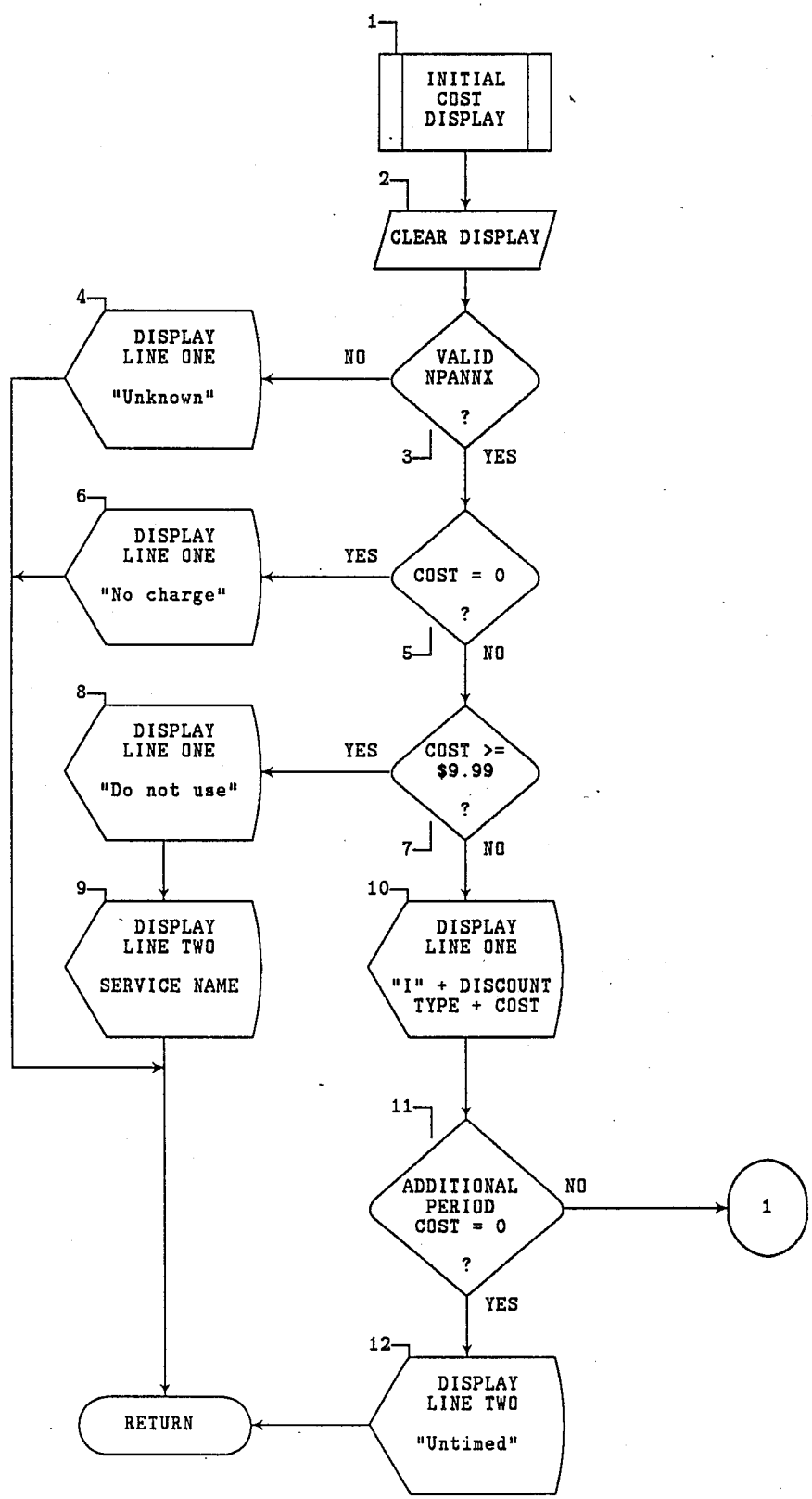
FIGS. 17A and 17B, hereafter collectively referred to as FIG. 17, constitute a flow chart showing the Initial Cost Display Subroutine which displays the rate information found by the Do Look-Up Subroutine (FIG. 16), and which is used by the Timer Routine (FIG. 11) and the Day-Evening-Night (D.E.N.) or Time-of-Day Discount Routine (FIG. 13)
Figure 17B:
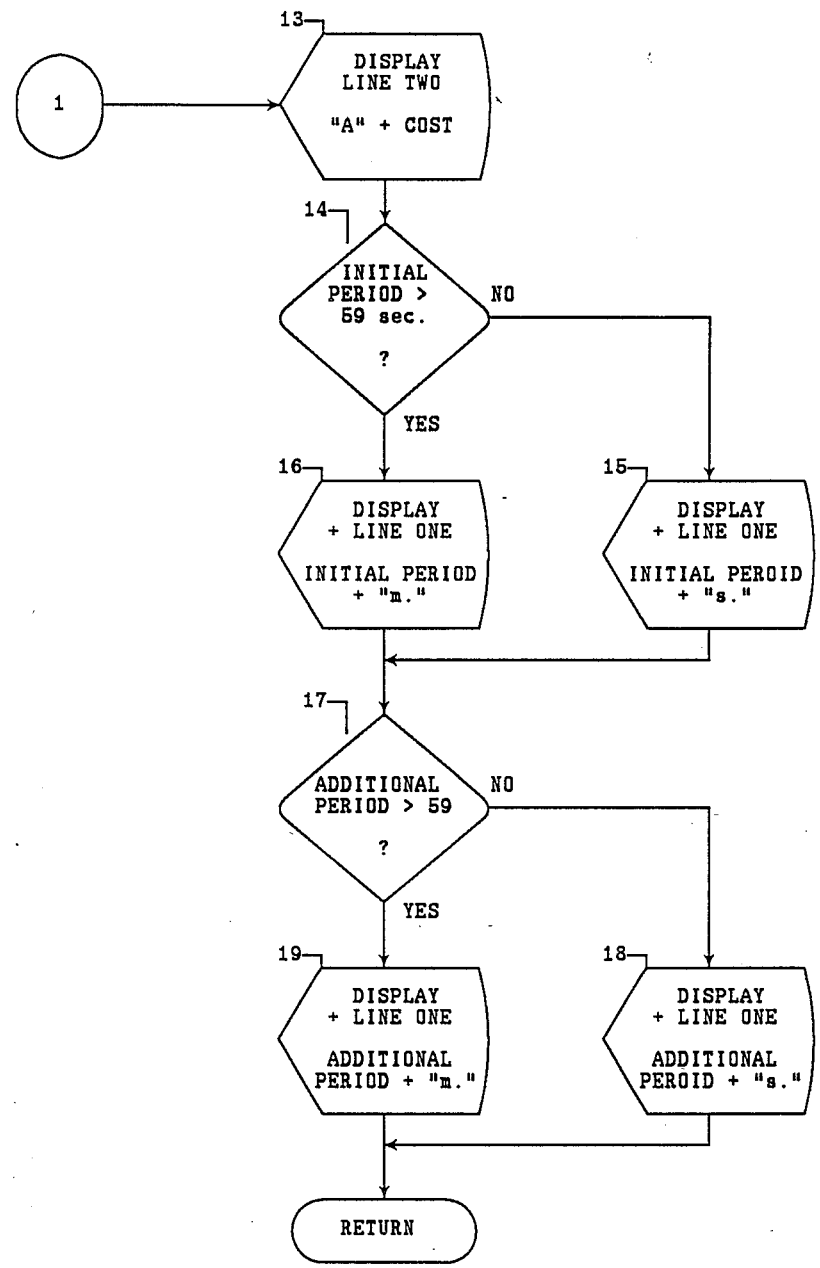

Initial Cost Display (FIG. 17)

The Initial Cost Display subroutine is called by any routine that needs to display the corresponding call costing information.

Step 2 clears the display and the program advances to Step 3, where if the area code and exchange are not valid the program goes to Step 4 which displays the message "Unknown"; otherwise the program proceeds to Step 5.

At Step 5, if the initial period cost equals zero the program goes to Step 6 which displays the message "No Charge"; otherwise the program advances to Step 7.

At Step 7, if the initial period cost is greater than $9.99 the program goes to Step 8 which displays the message "Do not Use" on the first line of the display—after which the program goes to Step 9 which displays the name of the current long distance carrier on the second line of the display. If the initial period cost does not exceed $9.99 the program proceeds to Step 10, which displays on the first line of the display the letter "I", the discount type (dy, ev or nt) and the initial period cost; after which the program advances to Step 11.

At Step 11, if the additional period cost is equal to zero the program proceeds to Step 12 which displays the message "Untimed"; after which the program returns control to the place in the program from which the Initial Cost Display subroutine was called. If the additional period cost is not equal to zero the program proceeds to Step 13.

At Step 13 the program displays the letter "A" and the additional period cost, and the program advances to Step 14 which determines whether the duration of the initial period is more than 59 seconds. If the initial period duration is less than 59 seconds the program proceeds to Step 15 which displays the initial period duration followed by the letter "s" (abbreviation for seconds). If the initial period duration is greater than 59 seconds the program proceeds to Step 16 which displays the initial period duration followed by the letter "m" (minutes).

The program then advances to step 17 which determines whether the duration of the additional period is more than 59 seconds. If the initial period duration is less than 59 seconds the program proceeds to Step 18 which displays the additional period duration followed by the letter "s" (abbreviation for seconds). If the additional period duration is greater than 59 seconds the program proceeds to Step 19 which displays the additional period duration followed by the letter "m" (minutes). After Steps 18 and 19 program control is returned to the place in the program from which the Initial Cost Display subroutine was called.

Figure 18:
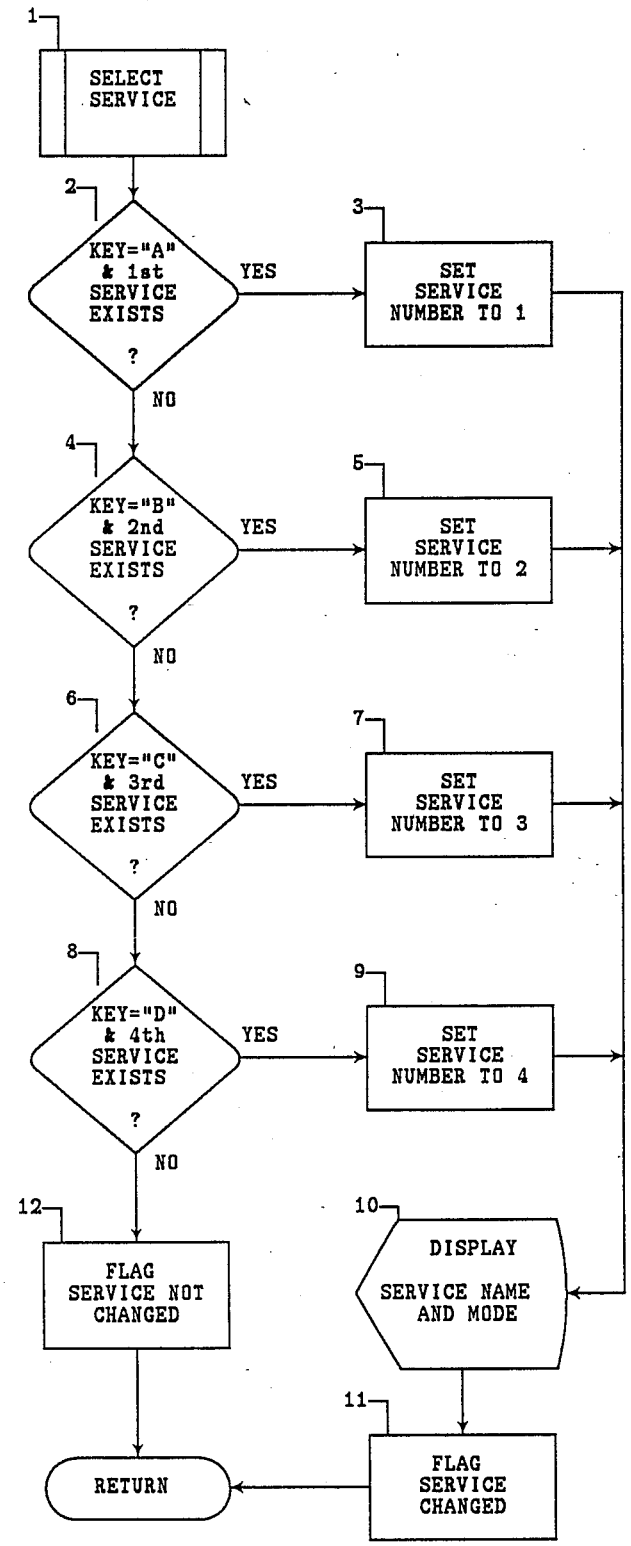
FIG. 18 is a flow chart showing the Select Service Subroutine which allows the user to select rate information corresponding to one of four different long distance carriers, and which is used by the Idle State Routine (FIG. 8), the Timer Routine (FIG. 11), the Verify Routine (FIG. 12), the Day-Evening-Night (D.E.N.) or Time-of-Day Discount Routine (FIG. 13), and the Display D.E.N. Routine (FIG. 20)

Select Service (FIG. 18)

The Select Service subroutine is called by any routine that allows the user to choose a service, i.e. a long distance carrier, different from the one being used at the time (the "current service").

At Steps 2 and 3, if the service key pressed is "A" the program sets the service to service number one and goes to Step 10 which displays the corresponding service name (DDD in the example previously described) and mode (TIMER, VER, DEN or D/T). At Steps 4 and 5, if the key pressed is "B" the program sets the service to service number two and goes to Step 10 which displays the corresponding service name (MCI in the example previously described) and mode. At Steps 6 and 7, if the key pressed is "C" the program sets the service to service number three and goes to Step 10 which displays the corresponding service name (Sprint in the example previously described) and mode. At Steps 8 and 9, if the key pressed is "D" the program sets the service to service number four and goes to Step 10 which displays the corresponding service name (Allnet in the example previously described) and mode.

At Steps 2 through 8, if any key other than a service key is pressed the program advances to Step 12 which sets the service changed flag to "off" and returns program control to the place in the program from which the Select Service subroutine was called.

After the service name and the device mode are displayed at Step 10, the program proceeds to Step 11, which sets the service changed flag to "on", after which program control is returned to the place in the program from which the Select Service subroutine was called.

Figure 19A:
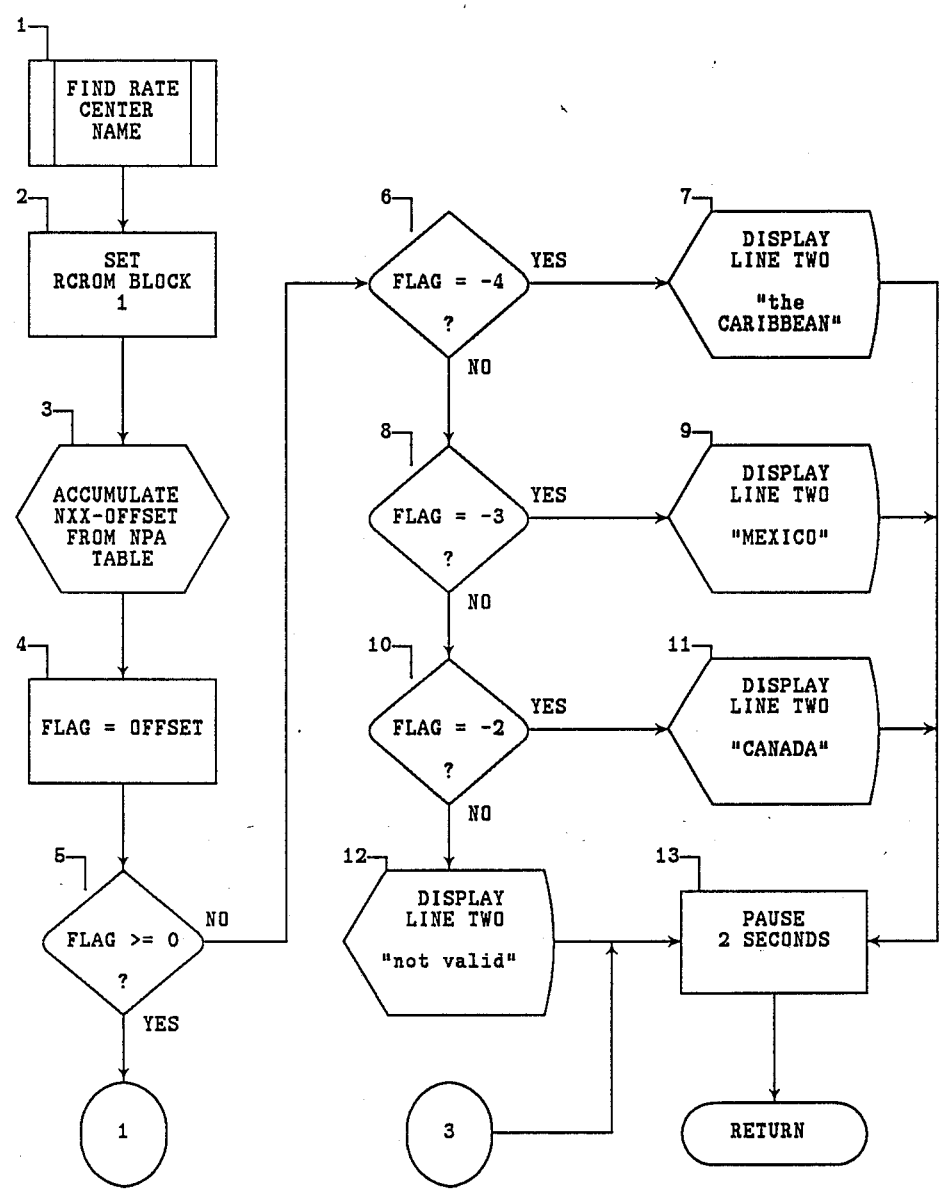
FIGS. 19A, 19B, and 19C, hereafter collectively referred to as FIG. 19, constitute a flow chart showing the Find Rate Center Name Subroutine which finds and displays the rate center name associated with the telephone number entered by the user, and which is used by the Enter Telephone Number Subroutine (FIG. 14)
Figure 19B:
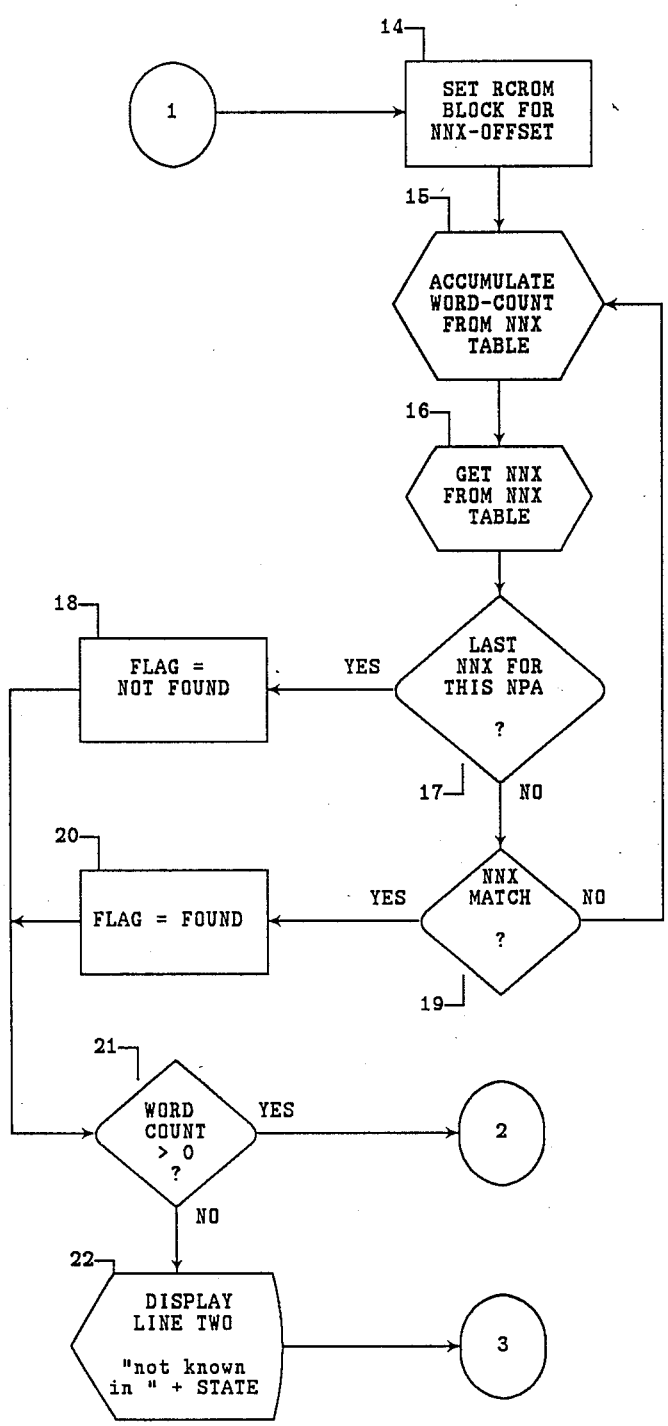
Figure 19C:
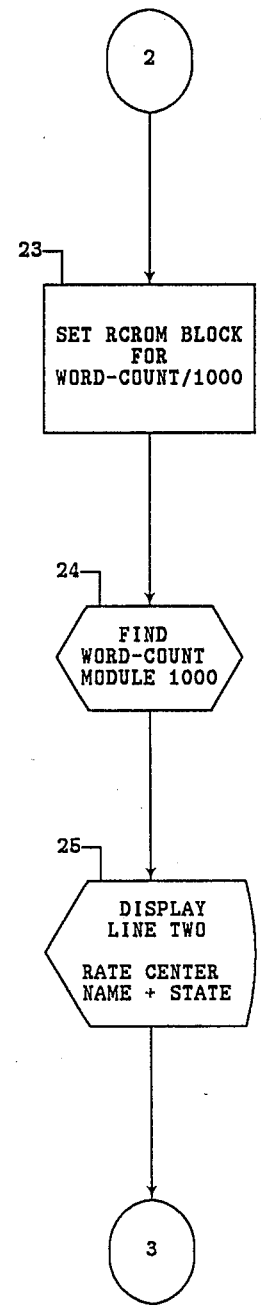

Find Rate Center Name (FIG. 19)

The Find Rate Center Name subroutine is called by the Enter Telephone Number subroutine (FIG. 14) in order to find the rate center name that matches the telephone number entered.

Step 2 sets the block of the Rate Center ROM (RCROM) 5 (FIG. 1B) to be addressed equal to one, after which the program proceeds to Step 3. A "block is the portion of the Rate Center ROM that the program is looking at.

At Steps 3 and 4 the program accumulates the exchange offset by searching through the area code table in the Rate Center ROM or RCROM chip 5 (FIG. 1B). The exchange offset is the number of bits from the beginning of the data in the Rate Center ROM to the beginning of the table in which the exchange is found.

At Step 5, if the exchange offset is greater than or equal to zero the program goes to Step 14; otherwise the program goes to Step 6. If the exchange offset is equal to −4 the program goes to Step 7 which displays "the CARIBBEAN"; otherwise the program goes to Step 8.

At Step 8, if the exchange offset is equal to −3 the program goes to Step 9 which displays "MEXICO"; otherwise the program advances to Step 10.

At Step 10, if the exchange offset is equal to −2 the program goes to Step 11 which displays "CANADA"; otherwise the program goes to Step 12 which displays the message "not valid".

After Steps 7, 9, 11 and 12 the program advances to Step 13 where it pauses two seconds and then returns program control to the place in the program from which the Find Rate Center Name subroutine was called.

At Step 14 the program sets the Rate Center ROM block for the exchange offset and the program proceeds to Step 15 which adds the count assigned by the Rate Center ROM to the exchange previously entered, to a word-count accumulator; after which the program advances to Step 16.

At Step 16 the program gets the next exchange from the exchange table stored in the Rate Center ROM and the program proceeds to Step 17 which determines if the exchange is the last exchange in the exchange table; and if so the program proceeds to Step 18 which sets a corresponding flag to "not found", after which the program advances to Step 21. If the exchange is not the last exchange in the table, the program proceeds to Step 19.

At Step 19, if the exchange found in the table is equal to the entered exchange the program proceeds to Step 20 which then sets the flag to "found", and the program advances to Step 21; otherwise the program goes to Step 15 and the word-count accumulator is incremented by one.

At Step 21, if the word count is not greater than zero the program goes to Step 22 which displays "not known in" followed by the state; and goes to Step 13 so that after a two second pause program control is returned to the place in the program from which the Find Rate Center Name subroutine was called. If the word count is greater than zero the program advances to Step 23.

At Step 23 the Rate Center ROM block for the word count determined in Step 15 is divided by 1,000 (because the list of rate center names stored in the Rate Center ROM is organized in tables, each table comprising 1,000 rate center or exchange names), and the program advances to Step 24 where the word count is used to search through the Rate Center Read-Only Memory and the corresponding rate center name is obtained from the Rate Center ROM. The program then advances to Step 25 which displays the rate center name and the state. The program then advances to Step 13 where it pauses two seconds and then returns program control to the place in the program from which the Find Rate Center Name subroutine was called.

Figure 20:
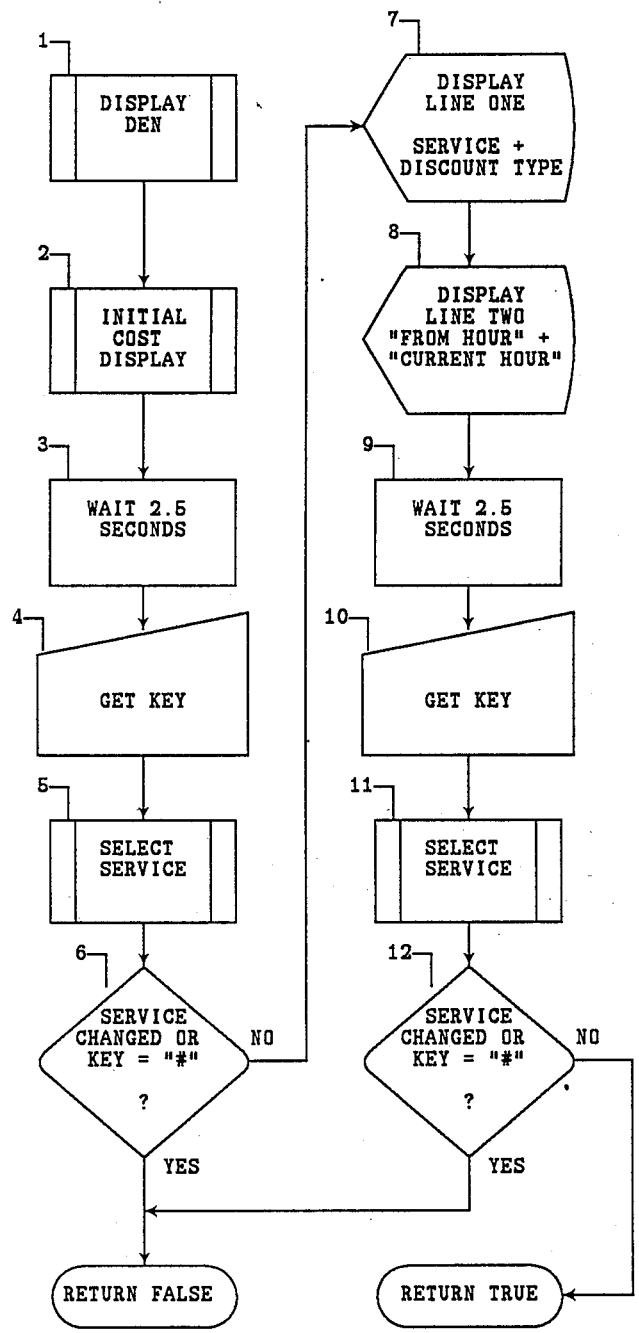
FIG. 20 is a flow chart showing the Display D.E.N. Subroutine which displays the hours when the time-of-day discounts are in effect, which is used by the Day-Evening-Night (D.E.N.) or Time-of-Day Discount Routine (FIG. 13), and which uses the Select Service Subroutine (FIG. 18) to complete its functions.

Display DEN (FIG. 20)

The Display DEN subroutine is called by the D.E.N. or Time-of-Day discount routine (FIG. 13) when the call cost parameters and the time-of-day information are to be displayed.

At Step 2 the program calls the Initial Cost Display subroutine (FIG. 17) to display the initial period and additional period costs, the initial period and additional period durations in minutes or seconds, and the time-of-day discount type. After program control is returned to the Display DEN subroutine the program advances to Step 3, where it pauses for two seconds; after which the program proceeds to Step 4 which reads the last key pressed.

The program then proceeds to Step 5 which calls the Select Service subroutine (FIG. 18) to determine whether or not the key pressed has changed the service (i.e. the long distance carrier) being used. Program control is then returned to the Display DEN subroutine and at Step 6, if the service was changed or the key pressed was the # key, the program sets the return flag to "false" and returns program control to the place in the program from which the Display DEN subroutine was called; otherwise the program proceeds to Step 7.

Step 7 displays the service (DDD, MCI, Sprint or Allnet in the example previously described) and the time-of-day discount type (dy, ev or nt), after which the program goes to Step 8 which displays the hours when that discount type is in effect. The program then advances to Step 9 where it pauses for two seconds and then goes to Step 10 which reads the last key pressed.

After the key is read at Step 10 the program proceeds to Step 11 where the Select Service subroutine (FIG. 18) is called to determine whether or not the key pressed changed the service being used. After program control is returned to the Display DEN subroutine the program advances to Step 12, where if the service was changed or the key pressed was the "#" key the return flag is set to "false" and program control is returned to the place in the program from which the Display DEN subroutine was called. If the service was not changed and the # key was not pressed the return flag is set to "true" and program control is returned to the place in the program from which the Display DEN subroutine was called.

Figure 21:
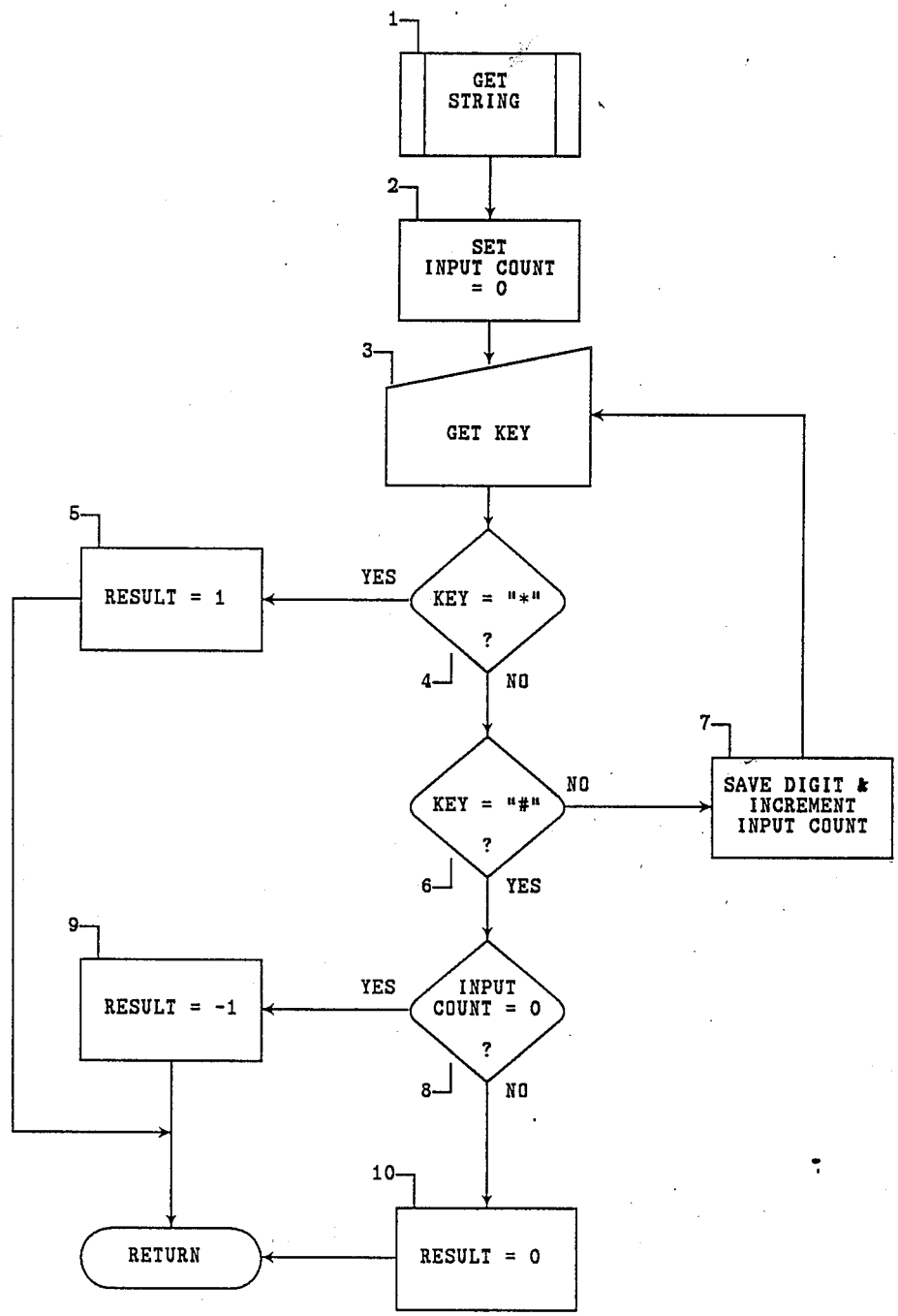
FIG. 21 is a flow chart showing the Get String Subroutine which analyzes the information entered by the user in the Verify Mode (FIG. 12)

Get String (FIG. 21)

The Get String subroutine is called by the Verify Mode (FIG. 12) when a keyboard entry needs to be evaluated.

At Step 2 the program sets the number of digits entered to zero and the program advances to Step 3 where it waits for a key to be pressed, at which time the program reads the key pressed and advances to Step 4.

At Step 4, if the * key was pressed the program goes to Step 5 which generates a "result=1" flag and returns program control to the place in the program from which the Get String subroutine was called; otherwise the program goes to Step 6 which determines whether the # key was pressed.

At Step 6, if the # key was pressed the program goes to Step 8; otherwise (i.e. if neither the * key nor the # key has been pressed) to Step 7 which saves the digit and increments the input count from Step 2 by one. At Step 8, if the number of digits entered is equal to zero the program proceeds to Step 9 where the "result=−1" is generated and program control is returned to the place in the program from which the Get String subroutine was called; otherwise the program proceeds to Step 10.

At Step 10, if the key pressed was the # key and the number of digits entered is greater than zero, the result flag is set to zero and program control is returned to the place in the program from which the Get String subroutine was called.

We claim:

1. A self-contained device for determining and displaying information relating to the cost of a telephone call from a calling telephone having a calling area code and a calling exchange associated therewith to a called telephone having a called telephone number including a called exchange number and which may include a called area code number, comprising:

a keyboard having a plurality of keys;

a display;

means for placing the device in a number entry state wherein a called telephone number may be entered by pressing selected keys of the keyboard;

rate data memory means containing stored information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers;

service designation means for selecting from said rate data memory means the cost parameters corresponding to a desired one of said long distance carriers in response to the pressing of a corresponding key of said keyboard; and verify means coupled to said rate data memory means and said service designation means, said verify means being operative in a Verify mode of said device for determining and displaying the actual cost of a telephone call having a duration entered into the keyboard, from a telephone in the calling exchange to a called telephone having a called telephone number entered via the keyboard when said device is in the number entry state thereof.

2. The device according to claim 1, further comprising clock means for determining the date and time of day, and clock control means for changing the date and time of day settings of said clock means.

3. The device according to claim 1, further comprising means operative in the Verify mode after the called telephone number has been entered for displaying a request for entry of the duration of the telephone call to the called telephone, and for thereafter entering said duration in response to the pressing of keys of the keyboard.

4. The device according to claim 1, 2 or 3, further comprising means operative in the Verify mode after the called telephone number has been entered for displaying a request for entry of the date and time of the telephone call to the called telephone, and for thereafter entering said date and time in response to the pressing of keys of the keyboard.

5. A self-contained device for determining and displaying information relating to the cost of a telephone call from a calling telephone having a calling area code and a calling exchange associated therewith to a called telephone having a called telephone number including a called exchange number and which may include a called area code number, comprising:

a keyboard having a plurality of keys;

a display;

clock means for determining the date and time of day;

clock control means for changing the date and time of day settings of said clock means;

means for placing the device in a number entry state wherein a called telephone number may be entered by pressing selected keys of the keyboard;

rate data memory means containing stored information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers;

service designation means for selecting from said rate data memory means the cost parameters corresponding to a desired one of said long distance carriers in response to the pressing of a corresponding key of said keyboard; and telephone cost timing means coupled to said clock means, said rate data memory means and said service designation means, said timing means being operative in a Timer mode of said device for determining and displaying the current cost of a telephone call from a telephone in the calling exchange to a called telephone having a called telephone number entered into the keyboard when said device is in the number entry state thereof, said timing means being responsive to the pressing of a start key of the keyboard for commencing the timing of the telephone call based on the time elapsed after the pressing of the start key, said timing means being responsive to the pressing of a stop key of the keyboard for terminating the timing of the call and displaying the actual cost of the call.

6. The device according to claim 5, further comprising means for determining and displaying cost parameters associated with the telephone call to the called telephone.

7. The device according to claim 6, wherein said cost parameters comprise the initial period cost and additional period cost as well as the corresponding initial period duration and additional period duration of the telephone call to the called telephone.

8. A self-contained device for determining and displaying information relating to the cost of a telephone call from a calling telephone having a calling area code and a calling exchange associated therewith to a called telephone having a called telephone number including a called exchange number and which may include a called area code number, comprising:

a keyboard having a plurality of keys;
a display;
clock means for determining the date and time of day;
clock control means for changing the date and time of day settings of said clock means;
means for placing the device in a number entry state wherein a called telephone number may be entered by pressing selected keys of the keyboard;
rate data memory means containing stored information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers;
service designation means for selecting from said rate data memory means the cost parameters corresponding to a desired one of said long distance carriers in response to the pressing of a corresponding key of said keyboard; and
discount rate display means coupled to said rate data memory means and said service designation means, said discount rate display means being operative in a D.E.N. mode of said device for determining and displaying the initial period cost and additional period cost as well as the corresponding initial period duration, additional period duration, discount type and applicable discount period for each time-of-day discount period applicable to the date determined by said clock means, of a telephone call from a telephone in the calling exchange to a called telephone having a called telephone number entered into the keyboard when said device is in the number entry state thereof.

9. The device according to claim 1, 5 or 8, wherein said cost parameters comprise initial period cost, additional period cost, initial period duration, additional period duration, time-of-day discount and applicable discount period, day of week discount and applicable discount period, holiday discount and applicable discount period.

10. The device according to claim 1, 5 or 8, further comprising rate center name memory means containing stored information as to the name of the exchange associated with each of a multiplicity of called telephone numbers, and rate center name display means coupled to said rate center name memory means and operative in at least one of said modes for determining and displaying the name of the exchange of a called telephone number entered into the keyboard when said device is in the number entry state thereof.

11. The device according to claim 1, 5 or 8 wherein said device has one or more additional modes of operation, further comprising mode control means operative when said device is in the number entry state thereof for placing the device in a desired mode in response to the pressing of a mode selection key and a key corresponding to the desired mode, said device defaulting to a predetermined mode when in the number entry state prior to the pressing of the mode selection key.

12. A self-contained device for determining and displaying information relating to the cost of a telephone call from a calling telephone having a calling area code and a calling exchange associated therewith to a called telephone having a called telephone number including a called exchange number and which may include a called area code number, comprising:

a keyboard having a plurality of keys;
a display;
idle state routine means for placing the device in an idle state wherein a called telephone number may be entered by pressing selected keys of the keyboard;
rate data memory means containing stored information as to cost parameters for telephone calls from a calling telephone in the calling exchange to a multiplicity of called local and non-local telephone numbers including long distance telephone numbers, said cost parameters comprising initial period cost, additional period cost, initial period duration, additional period duration, time-of-day discount and applicable discount period, day of week discount and applicable discount period, holiday discount and applicable discount period, said information including information as to the cost parameters for long distance telephone calls using the services of a number of long distance carriers;

rate center name memory means containing stored information as to the name of the exchange associated with each of a multiplicity of called telephone numbers;

mode control means operative when said device is in the idle state thereof for placing the device in a desired one of a number of modes of operation in response to the pressing of a mode selection key and a key corresponding to the desired mode, said device defaulting to a predetermined one of said modes when in the idle state prior to the pressing of the mode selection key;

service designation means operative in each of said modes for selecting from said rate data memory means the cost parameters corresponding to a desired one of said long distance carriers in response to the pressing of a corresponding key of said keyboard;

rate center name display means coupled to said rate center name memory means and operative in at least one of said modes for determining and displaying the name of the exchange of a called telephone number entered into the keyboard when said device is in the idle state thereof;

clock means for determining and displaying the date and time of day;

clock control means for changing the date and time of day settings of said clock means; and telephone cost information means for determining and displaying information relating to the cost of a telephone call from a telephone in the calling exchange to a called telephone having a called telephone number entered into the keyboard when said device is in the idle state thereof.

13. The device according to claim 12, wherein said device has a Timer mode, a Verify mode and a D.E.N. mode of operation.

14. The device according to claim 12, wherein said device has a Timer mode of operation and wherein said telephone cost information means comprises telephone cost timing means coupled to said clock means, said rate data memory means and said service designation means, said timing means being operative in said Timer mode for determining and displaying the initial period cost and additional period cost as well as the corresponding initial period duration and additional period duration of a telephone call from a telephone in the calling exchange to a called telephone having a called telephone number entered into the keyboard when said device is in the idle state thereof, said timing means being responsive to the pressing of a start key of the keyboard for commencing the timing of the telephone call and for displaying the total cost of the call based on the time elapsed after the pressing of the start key, said timing means being responsive to the pressing of a stop key of the keyboard for terminating the timing of the call and displaying the actual cost of the call.

15. The device according to claim 12, wherein said device has a Verify mode of operation and wherein said telephone cost information means comprises verify means coupled to said rate data memory means and said service designation means, said verify means being operative in said Verify mode for determining and displaying the actual cost of a telephone call at a date and time of day entered into the keyboard, said telephone call having a duration entered into the keyboard, from a telephone in the calling exchange to a called telephone having a called telephone number entered into the keyboard when said device is in the idle state thereof.

16. The device according to claim 15, further comprising means for displaying a request for entry of the duration of said telephone call after the called telephone number has been entered.

17. The device according to claim 15 or 16, further comprising means for displaying a request for entry of the date and time of day of said telephone call after the called telephone number has been entered.

18. The device according to claim 12, wherein said device has a D.E.N. mode of operation and wherein said telephone cost information means comprises discount rate display means coupled to said rate data memory means and said service designation means, said discount rate display means being operative in said D.E.N. mode for determining and displaying the initial period cost and additional period cost as well as the corresponding initial period duration, additional period duration, discount type and applicable discount period of a telephone call from a telephone in the calling exchange to a called telephone having a called telephone number entered into the keyboard when said device is in the idle state thereof, for each time-of-day discount period applicable to the date determined by said clock means.

19. A self-contained device for determining and displaying information relating to the cost of a telephone call from a calling telephone having a calling area code and a calling exchange associated therewith to a called telephone having a called telephone number including a called exchange number and which may include a called area code number, comprising:

a keyboard having a plurality of keys;

a display;

idle state routine means for placing the device in an idle state wherein a called telephone number may be entered by pressing selected keys of the keyboard;

rate data memory means containing stored information as to cost parameters for telephone calls from a calling telephone in the calling exchange to a multiplicity of called local and non-local telephone numbers including long distance telephone numbers, said cost parameters comprising initial period cost, additional period cost, initial period duration, additional period duration, time-of-day discount and applicable discount period, day of week discount and applicable day of week, holiday discount and applicable holidays, said information including information as to the cost parameters for long distance telephone calls using the services of a number of long distance carriers;

rate center name memory means containing stored information as to the name of the exchange associated with each of a multiplicity of called telephone numbers;

mode control means operative when said device is in the idle state thereof for placing the device in a Timer mode or a Verify mode of operation in response to the pressing of a mode selection key and a key corresponding to the desired mode, said device defaulting to a predetermined one of said modes when in the idle state prior to the pressing of the mode selection key;

service designation means operative in each of said modes for selecting from said rate data memory means the cost parameters corresponding to a desired one of said long distance carriers in response to the pressing of a corresponding key of said keyboard;

rate center name display means coupled to said rate center name memory means and operative in at least one of said modes for determining and displaying the name of the exchange of a called telephone number entered into the keyboard when said device is in the idle state thereof;

clock means for determining and displaying the date and time of day;

clock control means for changing the date and time of day settings of said clock means;

telephone cost timing means coupled to said clock means, said rate data memory means and said service designation means, said timing means being operative in said Timer mode for determining and displaying the initial period cost and additional period cost as well as the corresponding initial period duration and additional period duration of a telephone call from a telephone in the calling exchange to a called telephone having a called telephone number entered into the keyboard when said device is in the idle state thereof, said timing means being responsive to the pressing of a start key of the keyboard for commencing the timing of the telephone call and for displaying the total cost of the call based on the time elapsed after the pressing of the start key, said timing means being responsive to the pressing of a stop key of the keyboard for terminating the timing of the call and displaying the actual cost of the call; and verify means coupled to said rate data memory means and said service designation means, said verify means being operative in said Verify mode for determining and displaying the actual cost of a telephone call from a telephone in the calling exchange to a called telephone having a called telephone number entered into the keyboard when said device is in the idle state thereof, having a duration and corresponding to a date and time of day entered into the keyboard in response to corresponding requests displayed on said display.

20. The device according to claim 19, wherein said device also has a D.E.N. mode of operation, further comprising discount rate display means coupled to said rate data memory means and said service designation means, said discount rate display means being operative in said D.E.N. mode for determining and displaying the initial period cost and additional period cost as well as the corresponding initial period duration, additional period duration, discount type and applicable discount period of a telephone call from a telephone in the calling exchange to a called telephone having a called telephone number entered into the keyboard when said device is in the idle state thereof, for each time-of-day discount period applicable to the date determined by said clock means.

21. A method for determining and displaying information relating to the cost of a telephone call from a calling telephone having a calling area code and a calling exchange associated therewith to a called telephone having a called telephone number including a called exchange number and which may include a called area code number, comprising the steps of:

providing a device having a keyboard with a plurality of keys and a display;

placing the device in an idle state wherein a called telephone number may be entered by pressing selected keys of the keyboard;

storing in a rate data memory means information as to cost parameters for telephone calls from a calling telephone in the calling exchange to a multiplicity of called local and non-local telephone numbers including long distance telephone numbers, said cost parameters comprising initial period cost, additional period cost, initial period duration, additional period duration, time-of-day discount and applicable discount period, day of week discount and applicable discount period, holiday discount and applicable discount period, said information including information as to the cost parameters for long distance telephone calls using the services of a number of long distance carriers;

storing in a rate center name memory means information as to the name of the exchange associated with each of a multiplicity of called telephone numbers;

placing the device in a desired one of a number of modes of operation in response to the pressing of a mode selection key of said keyboard and a key of said keyboard corresponding to the desired mode, and causing said device to default to a predetermined one of said modes when in the idle state prior to the pressing of the mode selection key;

selecting from said rate data memory means the cost parameters corresponding to a desired one of said long distance carriers in response to the pressing of a corresponding key of said keyboard;

determining and displaying the name of the exchange of a called telephone number entered into the keyboard when said device is in the idle state thereof;

determining and displaying the date and time of day; and determining and displaying information relating to the cost of a telephone call from a telephone in the calling exchange to a called telephone having a called telephone number entered into the keyboard when said device is in the idle state thereof.

22. A method for determining and displaying information relating to the cost of a telephone call from a calling telephone having a calling area code and a calling exchange associated therewith to a called telephone having a called telephone number including a called exchange number and which may include a called area code number, comprising the steps of:

providing a device including a keyboard having a plurality of keys and a display;

placing the device in a number entry state wherein a called telephone number may be entered by pressing selected keys of the keyboard;

storing in rate data memory means information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers;

selecting from said rate data memory means the cost parameters corresponding to a desired one of said long distance carriers in response to the pressing of a corresponding key of said keyboard; and determining and displaying the actual cost of a telephone call having a duration entered into the keyboard, from a telephone in the calling exchange to a called telephone having a called telephone number entered via the keyboard when said device is in the number entry state thereof.

23. A method for determining and displaying information relating to the cost of a telephone call from a calling telephone having a calling area code and a calling exchange associated therewith to a called telephone having a called telephone number including a called exchange number and which may include a called area code number, comprising the steps of:

providing a device including a keyboard having a plurality of keys and a display;

determining the date and time of day;

placing the device in a number entry state wherein a called telephone number may be entered by pressing selected keys of the keyboard;

storing in rate data memory means information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers;

selecting from said rate data memory means the cost parameters corresponding to a desired one of said long distance carriers in response to the pressing of a corresponding key of said keyboard;

determining and displaying the current cost of a telephone call from a telephone in the calling exchange to a called telephone having a called telephone number entered into the keyboard when said device is in the number entry state thereof, in response to the pressing of a start key of the keyboard, based on the time elapsed after the pressing of the start key; and thereafter displaying the actual cost of the call in response to the pressing of a stop key of the keyboard.

24. A method for determining and displaying information relating to the cost of a telephone call from a calling telephone having a calling area code and a calling exchange associated therewith to a called telephone having a called telephone number including a called exchange number and which may include a called area code number, comprising the steps of:

providing a device including a keyboard having a plurality of keys and a display;

determining the date and time of day;

placing the device in a number entry state wherein a called telephone number may be entered by pressing selected keys of the keyboard;

storing in rate data memory means information as to cost parameters for telephone calls from a calling telephone in the calling exchange to a multiplicity of called local and non-local telephone numbers including long distance telephone numbers, said information including information as to the cost parameters for long distance telephone calls using the services of a number of long distance carriers;

selecting from said rate data memory means the cost parameters corresponding to a desired one of said long distance carriers in response to the pressing of a corresponding key of said keyboard; and determining and displaying the initial period cost and additional period cost as well as the corresponding initial period duration, additional period duration, discount type and applicable discount period for each time-of-day discount period applicable to the date determined by said clock means, of a telephone call from a telephone in the calling exchange to a called telephone having a called telephone number entered into the keyboard when said device is in the number entry state thereof.

* * * * *